United States Patent [19]

Struger et al.

[11] 4,293,924

[45] Oct. 6, 1981

[54] PROGRAMMABLE CONTROLLER WITH HIGH DENSITY INTELLIGENT I/O INTERFACE

[75] Inventors: Odo J. Struger, Chagrin Falls; Ronald A. Brown, Willowick; Craig A. Black, Lyndhurst, all of Ohio

[73] Assignee: Allen-Bradley Company, Milwaukee, Wis.

[21] Appl. No.: 43,886

[22] Filed: May 30, 1979

[51] Int. Cl.³ .............................................. G06F 9/22
[52] U.S. Cl. .................................................. 364/900
[58] Field of Search ... 364/200 MS File, 900 MS File, 364/104, 107

[56] References Cited

U.S. PATENT DOCUMENTS

| | | | |
|---|---|---|---|
| 4,104,731 | 8/1978 | Grudowski et al. | 364/900 |
| 4,118,792 | 10/1978 | Struger et al. | 364/900 |
| 4,122,519 | 10/1978 | Bielawski et al. | 364/200 |
| 4,165,534 | 8/1979 | Dummermuth et al. | 364/900 |
| 4,178,634 | 12/1979 | Bartlett | 364/900 |
| 4,180,862 | 12/1979 | Seipp | 364/900 |
| 4,215,396 | 7/1980 | Henry et al. | 364/200 |

*Primary Examiner*—Leo H. Boudreau
*Attorney, Agent, or Firm*—Quarles & Brady

[57] ABSTRACT

A programmable controller has a high density I/O module for interfacing eight analog input devices to a main processor module. The high density I/O module has a microcomputer for reading, storing and updating eight words of input data. The microcomputer also communicates with the main processor of the main processor module to transfer the eight words of input status data to a main memory. The main processor is programmed to communicate with the microcomputer in two alternate modes. In one mode the main processor is directed by an applications control program to individually couple words of the status data; in the other mode the main processor is directed by firmware instructions to alter the input/output scan and couple a block of input data.

13 Claims, 23 Drawing Figures

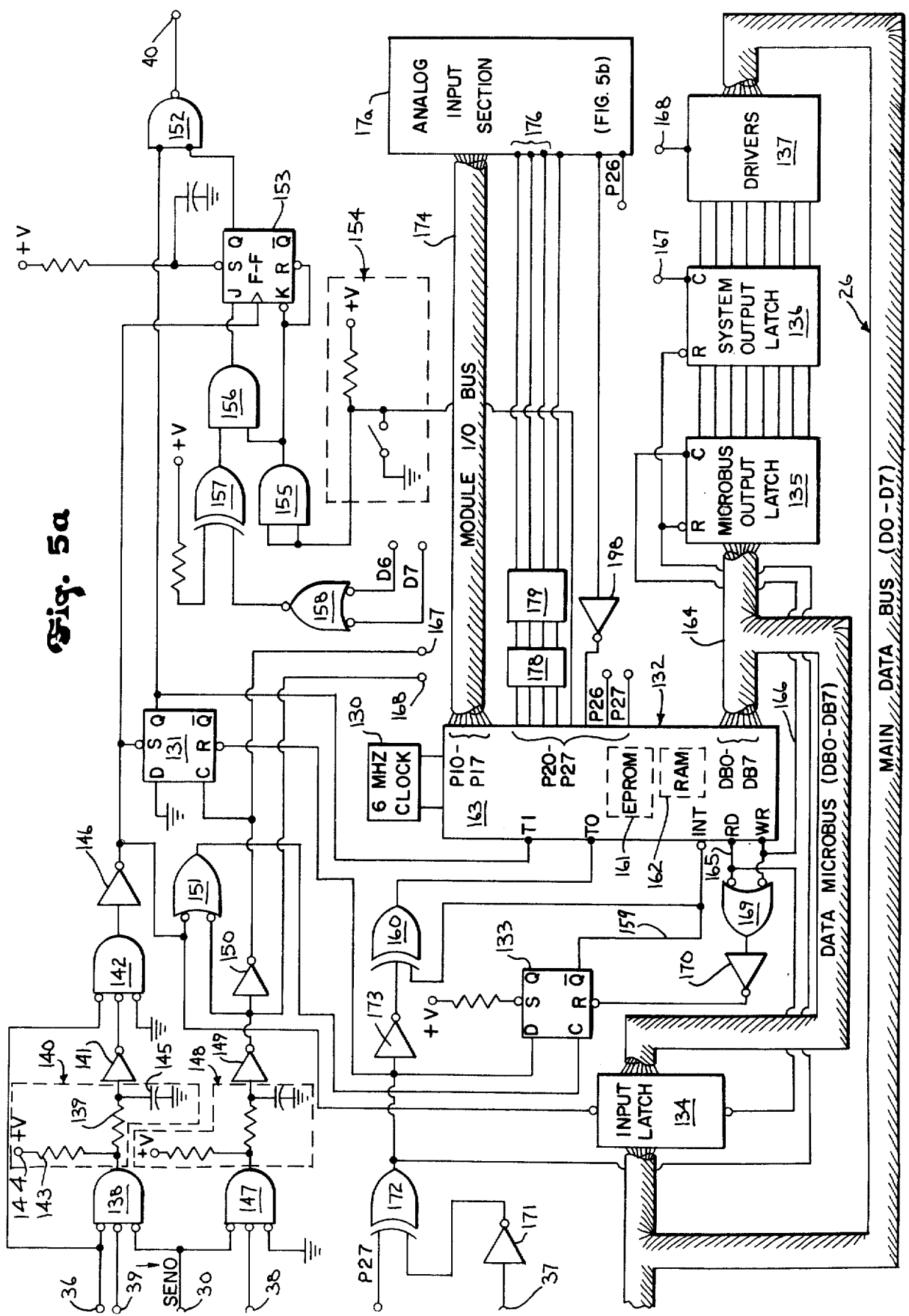

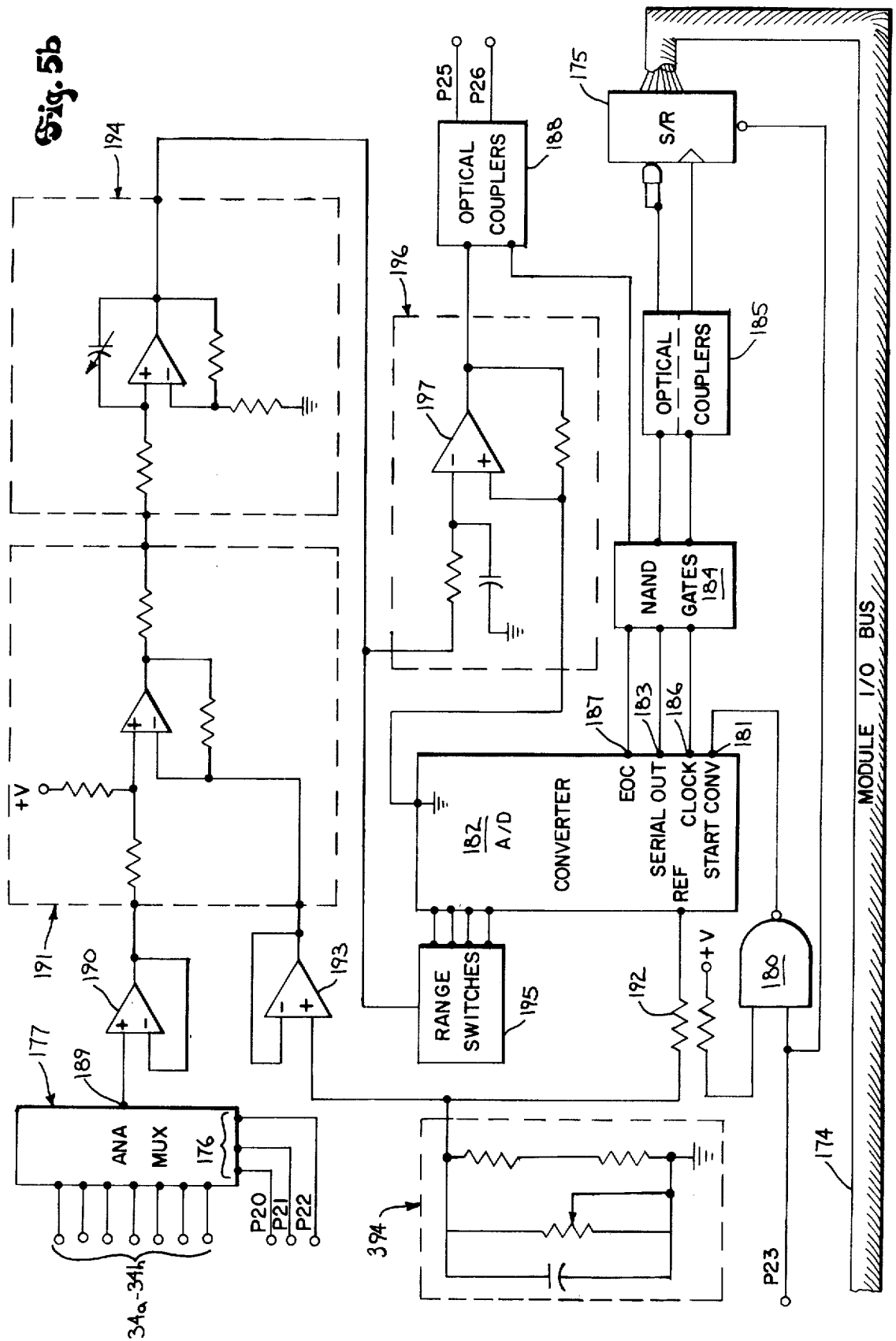

161

| | |
|---|---|
| 199 | BLOCK TRANSFER ROUTINE |
| 200 | SINFR I/O ROUTINE |
| 201 | A-TO-D ROUTINE |
| 203 | BCD LOOKUP TABLE & SUBROUTINE (PAGE 2) |
| 204 | MSW LOOKUP TABLE (PAGE 3) |

Fig. 8

BANK 0

| R0 | POINTER TO DATA STORAGE |
|---|---|
| R1 | OUTPUT POINTER |
| R2 | CHANNEL COUNTER |
| R3 | |
| R4 | BCD BYTE |
| R5 | BYTE COUNTER/ ROLLOVER REGISTER |
| R6 | MUX MASK REGISTER |
| R7 | SAVE ACCUMULATOR REGISTER |

BANK 1

| R0 | |
|---|---|
| R1 | POINTER TO DATA STORAGE |
| R2 | |
| R3 | BYTE COUNTER |
| R4 | READ FLAG MASK |
| R5 | |
| R6 | |
| R7 | |

Fig. 10

| HIGH BYTE BITS | | | | | | | | LOW BYTE BITS | | | | | | | |
|---|---|---|---|---|---|---|---|---|---|---|---|---|---|---|---|
| 17 | 16 | 15 | 14 | 13 | 12 | 11 | 10 | 07 | 06 | 05 | 04 | 03 | 02 | 01 | 00 |
| ROLL-OVER BIT | CHANNEL CODE | | | | | BCD DIGIT | | BCD DIGIT | | | | BCD DIGIT | | | |

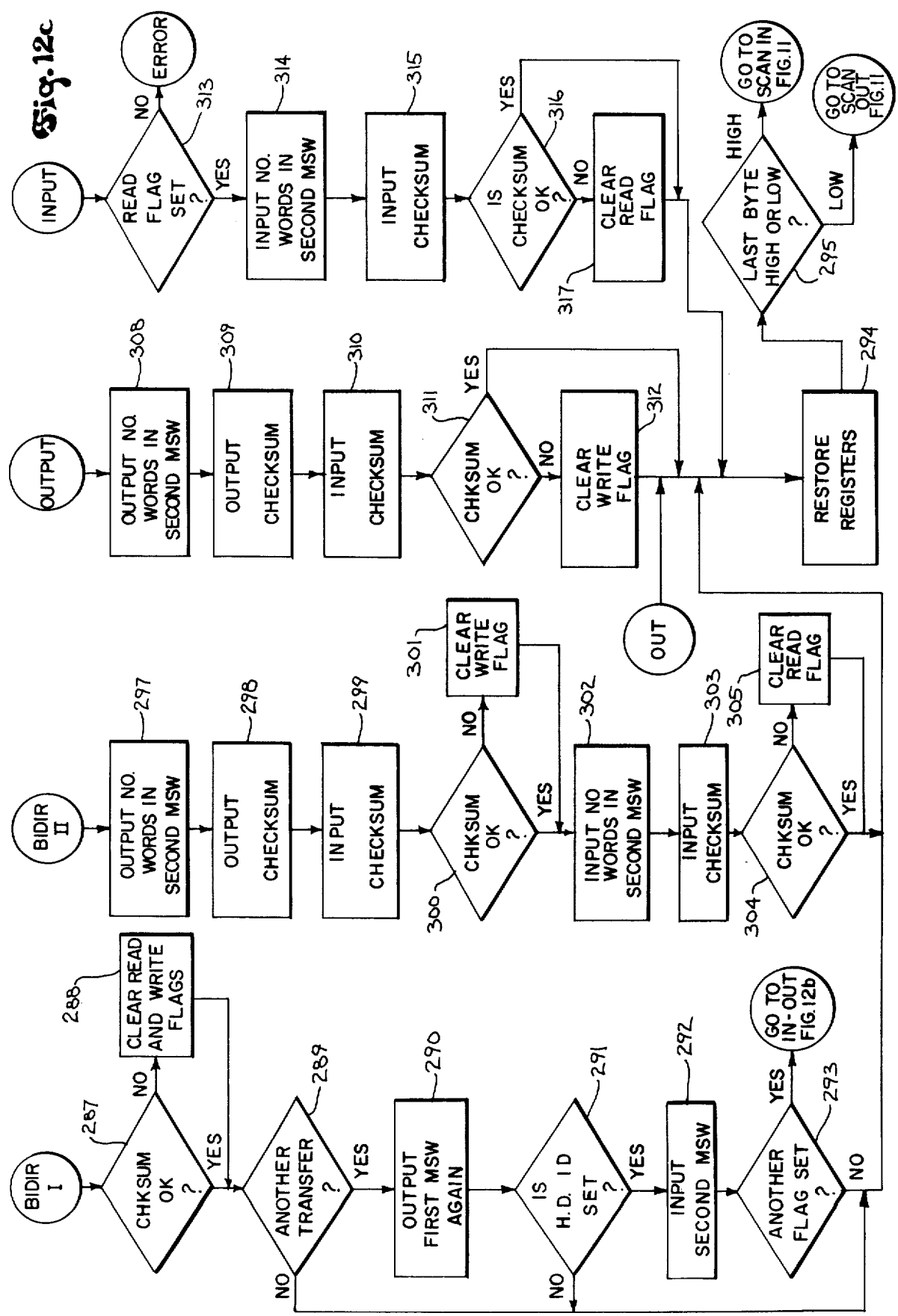

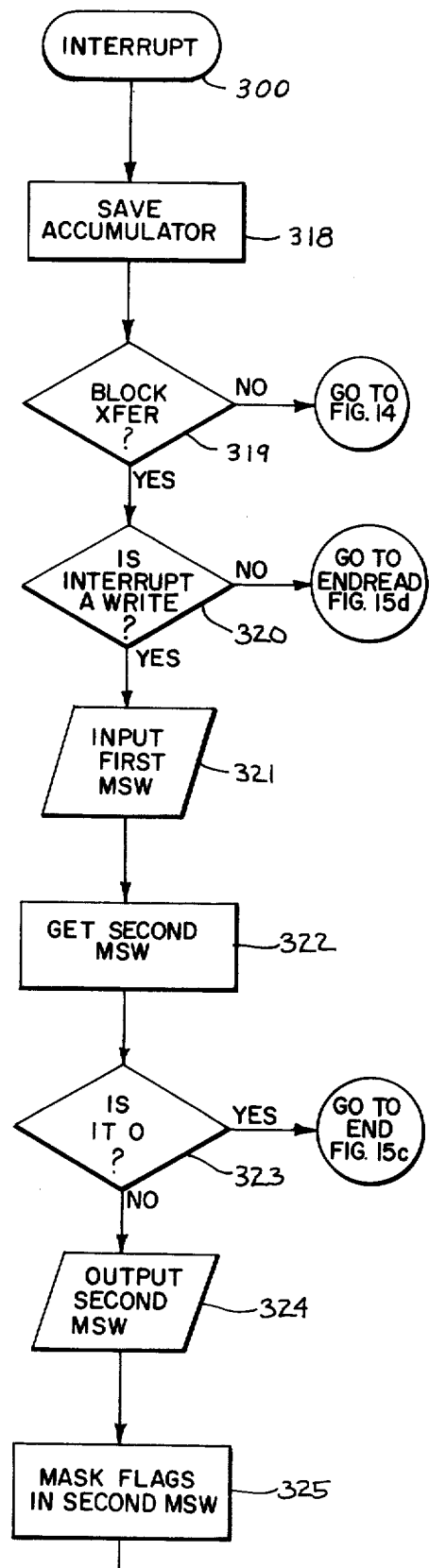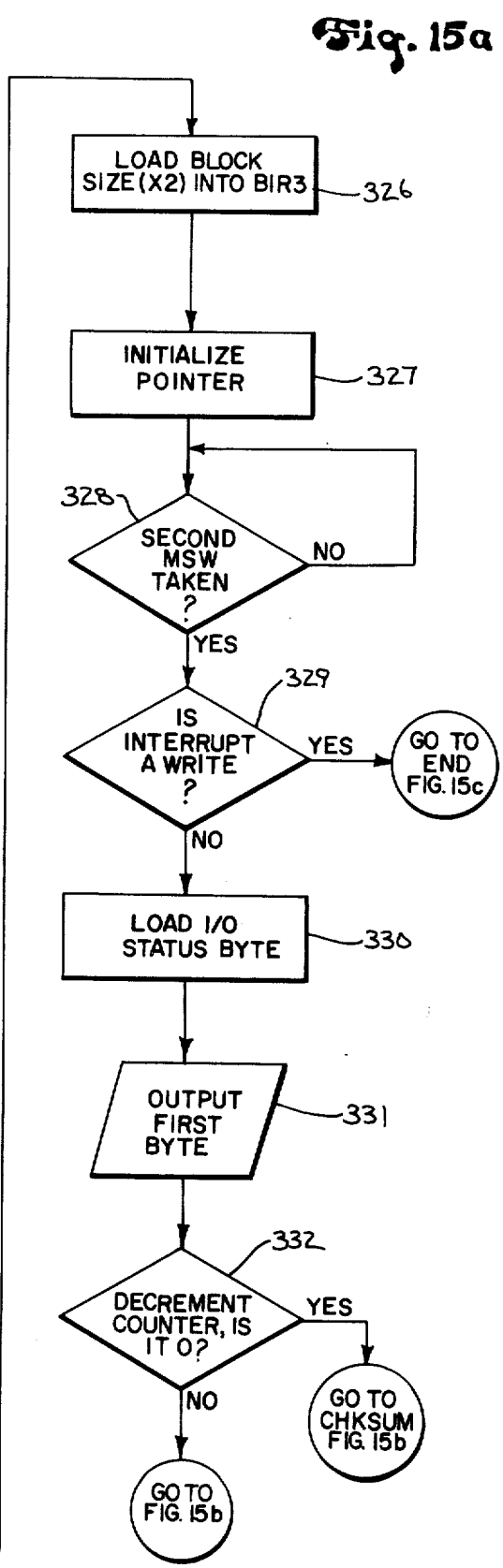
Fig. 15a

PROGRAMMABLE CONTROLLER WITH HIGH DENSITY INTELLIGENT I/O INTERFACE

BACKGROUND OF THE INVENTION

1. Field of the Invention

The field of the invention is digital controllers, and more particularly, programmable controllers in which a controller processor is coupled through I/O interface modules to a plurality of input/output control devices that control an industrial machine or process.

2. Description of the Prior Art

Programmable controllers are typically connected to industrial machines and assembly line conveyors to sequentially operate such equipment according to a stored control program. In programmable controllers such as that disclosed in U.S. Pat. No. 3,942,158, issued Mar. 2, 1976, and entitled "Programmable Logic Controller," the control program is stored in a random-access memory. Program instructions are executed by a controller processor to examine selected sensing devices on the controlled equipment, and to energize or deenergize selected operating devices on the controlled equipment, depending upon the status of the sensing devices and the logic contained in the control program instructions.

Programmable controllers, as described in the patent cited above, have usually included processors of smaller capacity than have digital controllers that employ general purpose digital computers. The larger, more complex and more expensive, computer-based controllers are often used where a number of analog output devices must be operated. Programmable controllers built with processors comprised of discrete components or built around a microprocessor are ordinarily used to monitor and control large numbers of digital I/O devices. The status of digital input devices can be determined by single bits of data, and the status of digital output devices can be controlled by single bits of data. The digital I/O devices are typically connected in groups of four, eight or sixteen to I/O interface modules which have special circuitry for interfacing the devices with the controller processor. The coupling of a multibit word of data senses or controls a group, if not all, of the I/O devices connected to a respective I/O module. The control of analog input/output devices, in contrast to digital devices, usually requires the coupling of at least eight bits of data, or a byte of data, between an I/O interface module and the controller processor. In some cases, the coupling of ten or twelve bits of data, plus an identification code of several more bits, is required. Therefore, the capacity of standard I/O modules for handling analog I/O devices has been limited.

In Grudowski et. al., U.S. Pat. No. 4,104,731, issued Aug. 1, 1978, a programmable controller is disclosed in which sixteen-bit data words are coupled asynchronously from a main memory to word-oriented I/O devices. The data words contain both output or command data and a four-bit identification code. The identification code is necessary to match the data in memory to circuits on the I/O module that drive the word-oriented output devices. In one embodiment, an analog output I/O module is connected to four analog devices and the operation code identifies which device should receive an analog signal synthesized from twelve bits of data. In another embodiment, a pulse output module couples position and rate data through different circuits to drive a stepper motor. Considerable hardware and program instructions are required to transfer a relatively moderate amount of word-oriented data in this programmable controller. The applications program of controller instructions for this module is part of the control program that is stored in the RAM memory of the controller.

With the continuing development of microelectronics and microcomputers, the potential of programmable controllers for controlling analog input/output devices has been expanded, due to the increased computing power available in a small package. As in some other control systems, however, a bottleneck persists at the interface between the controller processor and the operating device, viz., at the I/O interface. The application of programmable controllers to industrial control tasks can be greatly expanded if the density of I/O transfer between controller processors and I/O interfaces can be increased without adding to the cost of I/O interface circuitry.

SUMMARY OF THE INVENTION

The invention relates to a digital controller having a main processor and I/O interface modules that couple the main processor to I/O devices on a controlled system. The invention provides a programmed, high density I/O module with a greater interface capacity than the unprogrammed I/O modules of the prior art. With its own processor and memory, the high density I/O module transforms the input/output lines of prior modules into a module I/O bus for coupling up to sixty-four words of I/O status data between the high density I/O module and the I/O devices.

The high density processor communicates in two directions to couple I/O status data between the main processor and circuits in the I/O devices. The high density processor performs a peripheral I/O scan to couple words of I/O status data between an image table in the high density memory and the I/O devices. This data is coupled through a sequencing means, which connects multiple I/O device circuits to the module I/O bus, and which can include multiplexing/demultiplexing means and analog-digital conversion means. The high density processor also couples I/O status data between the high density memory and a bidirectional data port. Data is coupled through the data port between the main processor and the high density processor as part of a main I/O scan routine that provides inter-processor communication.

There are two different modes of inter-processor communication between the main processor and the high density processor. In the first mode, the main processor is directed by a user applications program, which is part of the control program stored in an associated RAM memory. While this utilizes the physical capacity of the high density I/O module, it consumes valuable space in RAM memory, and it uses processing time otherwise reserved for program instructions that examine the I/O status data. Therefore, a further aspect of the invention is the provision of two communicating processors that execute a block transfer of I/O status data under the direction of machine instructions stored in memories on their respective modules. This block transfer is faster than the applications program transfer, and block transfer instructions can be stored in ROM memory, which is currently much less expensive than RAM memory. The block transfer is carried out automatically as part of each execution cycle of an I/O scan routine. If the high density processor is "busy" executing its peripheral I/O scan, the main processor waits a short time until the block transfer can be synchronized.

Normally, during an I/O scan sequence, each addressable portion of the I/O interface is coupled to a single multibit word of data. In the controller to be described, the main I/O scan is modified so that a plurality of multibit words of I/O status data are coupled between the main memory and a high density I/O module that resides at a single I/O address. The direction and block size of the data transfer are determined by a pair of control words. Each control word contains a read flag, a write flag, or both (in the case of bidirectional transfer), and a block size number.

The user stores the first control word in an I/O image table in the main memory at an address where output status data is normally stored. During the main I/O scan this first control word is output with a write signal to the high density I/O interface. The high density I/O interface includes logic control circuitry that is responsive to the write signal to generate a high density ID signal. The main processor detects the high density ID signal on a line connecting it to the logic control circuitry. The main processor then prepares to transfer a block of I/O status data and looks for a second control word from the high density I/O module to define the number of words of I/O status data to be transferred.

The first control word, as well as I/O status data, is coupled between the main memory and the high density I/O interface through the data port, which can be formed with latching circuitry. A microcomputer on the high density I/O module has memory for storing multibit words of I/O status data and for storing the second control word of data. The microcomputer includes a processor portion for coupling the first control word from the data latching circuitry to the high density memory and for reflecting the second control word back to the data latching circuitry in response thereto. The second control word is then coupled back to the main processor to confirm the number of words to be transferred.

The main processor and the high density processor then begin communication of I/O status data. The two processors communicate by alternately coupling data to and from the latching circuitry. The direction of data transfer determines which processor couples data to the latching circuitry, and which processor couples data from the latching circuitry. The latching circuitry allows asynchronous coupling of data between the two processors within the overall time interval for block transfer.

The main I/O scan sequence consumes a relatively minor fraction of processing time compared to the execution of the control program by the main processor. While the control program is being executed by the main processor, the high density processor communicates with I/O devices controlling a machine or process. This communication is interrupted when the main processor executes the main I/O scan sequence and writes a word of data to the high density module. The high density processor then shifts to communication in the other direction to couple I/O status data between the high density memory and the latching circuitry.

In a specific embodiment described herein, a single high density I/O module is capable of coupling eight words of data to a storage area in the memory of the programmable controller. Each word of I/O data represents the status of one of eight analog control devices connected to the high density module. While the high density I/O module described herein is an input module, the high density transfer provided by the invention is equally applicable to high density output modules or to high density modules with both input and output capabilities. And while the I/O devices each have a single analog signal-generating circuit, I/O devices with multiple circuits are also within the scope of the invention.

It is one object of the invention to provide an I/O module with increased capacity for interfacing a main processor with I/O devices.

It is another object of the invention to provide an I/O module that is better suited for monitoring and controlling word-oriented, analog I/O devices.

It is another object of the invention to provide means for high density transfer of I/O data which can be employed in a number of specific high density I/O modules.

It is another object of the invention to provide a high density I/O module that improves the efficiency of transferring input/output status data in a digital controller.

It is another object of the invention to provide a high density I/O module which maintains its own image table of I/O status data.

It is another object of the invention to provide a main processor that can be directed by machine instructions alone, as well as by an applications program of controller-type instructions that is stored in the user program memory.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made to the claims for determining the scope of the invention.

BRIEF DESCRIPTION OF THE DRAWINGS

FIG. 5a is a block and electrical schematic diagram of the analog input high density I/O module in the I/O interface section shown in FIG. 2;

FIG. 5b is a block and electrical schematic diagram of the analog input section of the module in FIG. 5a;

FIG. 8 is a memory map diagram of the organization of the microcomputer EPROM memory shown in FIG. 5a;

FIG. 9 is a memory map diagram of the organization of the microcomputer RAM memory shown in FIG. 5a;

FIG. 10 is a memory map of the working registers of the RAM memory of FIG. 9;

FIGS. 12a–12c provide a flow chart of the high density interrupt routine for the main processor module of FIG. 2;

FIG. 13b is a flow chart of a rollover routine represented in a block in FIG. 13a;

FIGS. 15a–15d are a flow chart of a block transfer routine executed by the high density module of FIGS. 5a and 5b; and FIG. 16 is a diagram showing the composition of a word of I/O status data communicated between the main processor module and the high density module.

DESCRIPTION OF THE PREFERRED EMBODIMENT

Figure 1:
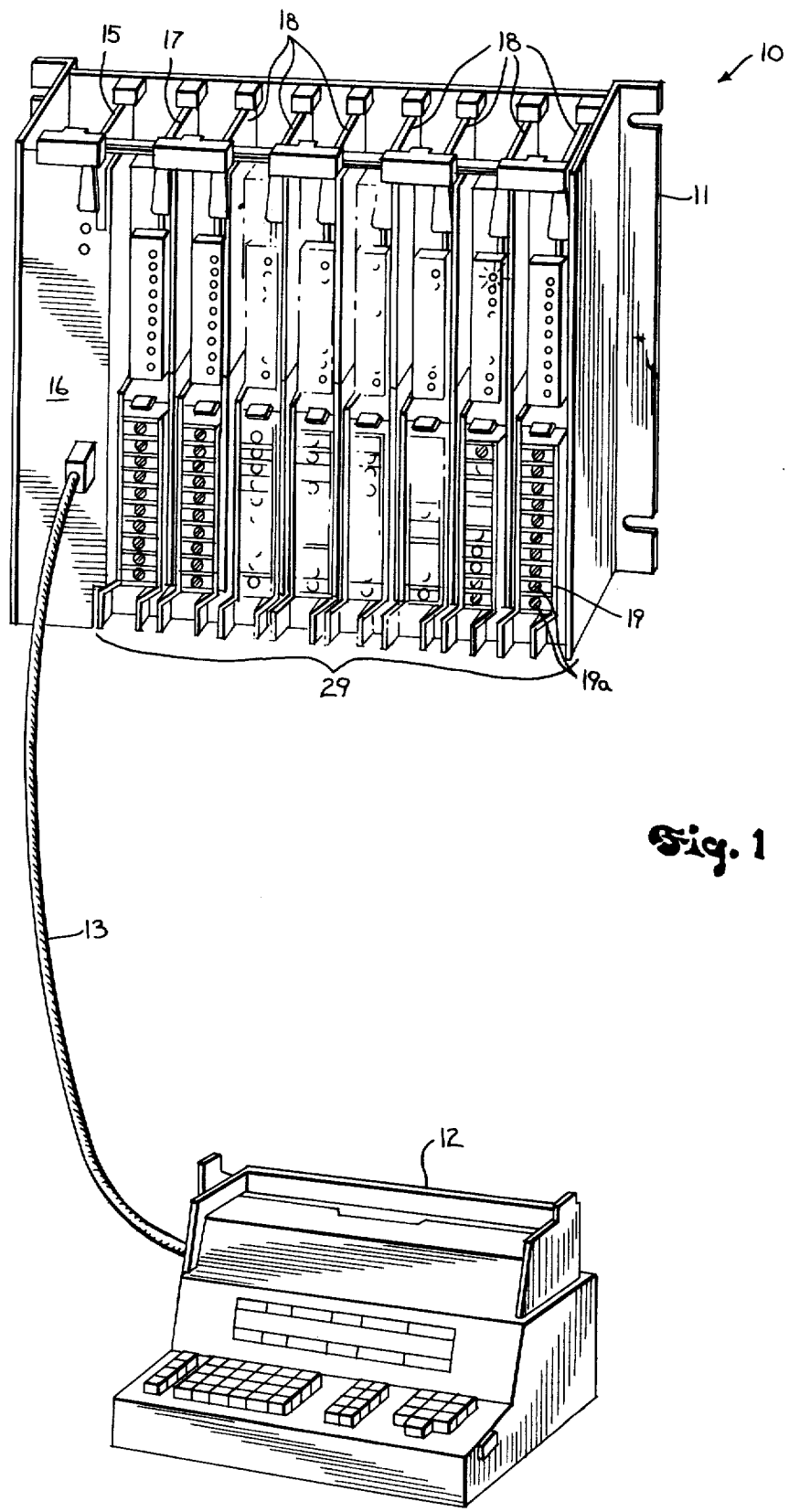
FIG. 1 is a perspective view of a programmable controller that incorporates the present invention.

Referring to FIG. 1, a programmable controller 10 for performing high density I/O transfer is housed in a rack enclosure 11. A detachable program panel 12 is connected through a communication cable 13 to a connector (hidden from view) on the front of the controller 10, when needed, and is unplugged from the controller 10 for storage or use with other programmable controllers.

The rack enclosure 11 holds a plurality of modules, which are printed circuit boards having various components and circuit "chips" mounted thereon. The modules are held in upright, closely spaced and substantially parallel position in the enclosure 11. On the far left is a processor board 15 which has a processor daughter board (not shown) mounted piggyback on it to form a processor module 16. To the right of the processor module 16 are a plurality of I/O modules, including an analog input, high density I/O module 17 and seven standard I/O modules 18. The input/output control capacity of the programmable controller can be increased or decreased by adjusting the size of the rack enclosure 11 to hold a different number of I/O modules 17 and 18. The mix of high density and standard I/O modules 17 and 18 is also optional.

Connections between modules in the rack enclosure 11 are made through a hardwired backplane, (not shown in FIG. 1) on the back of the rack enclosure 11. Connections to control devices are made through swing-arm connectors 19 on the front of the enclosure 11. Further information on the construction of the rack enclosure 11 is provided in Struger et al, U.S. Pat. No. 4,151,580, issued Apr. 24, 1979.

Figure 2:
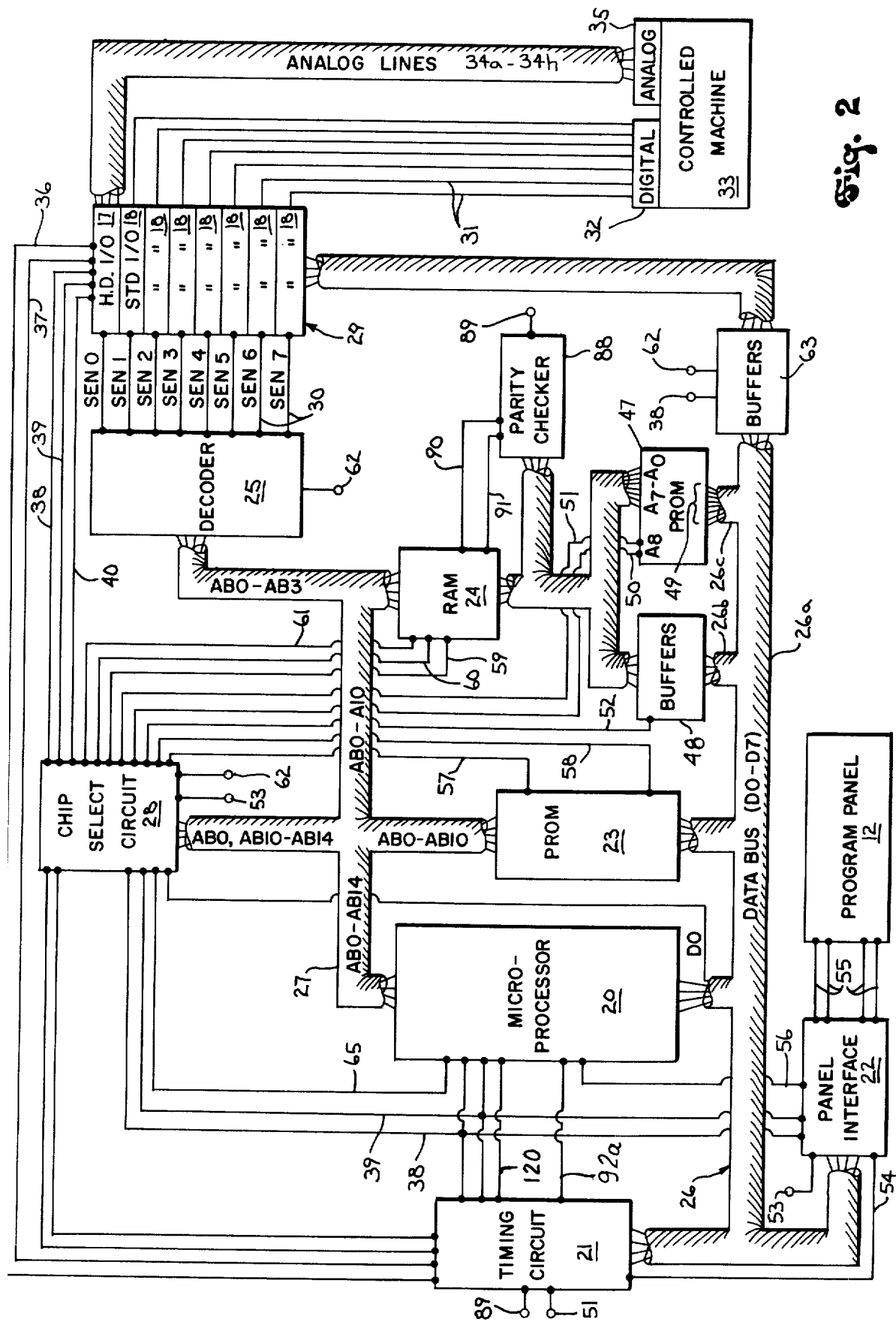
FIG. 2 is a block diagram of the programmable controller of FIG. 1.

Referring to FIG. 2, the processor module 16 includes a main microprocessor 20, a timing circuit 21, a program panel interface circuit 22, a programmable read-only memory (PROM) 23, and a random access memory (RAM) 24, which are interconnected through lines D0–D7 of an eight-bit main data bus 26. The microprocessor 20 is also connected through lines AB-0–AB14 of a fifteen-bit address bus 27 to the memories 23 and 24 and to a chip select circuit 28. The main microprocessor 20 is connected through lines AB-0–AB10 to both the PROM 23 and the RAM 24, and through lines AB0 and AB10–AB14 to the chip select circuit 28. Signals on lines AB0 and AB10–AB14 are decoded by the chip select circuit 28 to selectively enable other circuitry. The main microprocessor 20 is also connected through lines AB0–AB3 of the address bus 27 to the decoder circuit 25. Signals on these lines are decoded by the decoder circuit 25 to selectively enable the I/O modules 17 and 18 in the I/O interface section 29. Each of these modules 17 and 18 is connected through a slot enable line (SEN 0–SEN 7) 30 to the decoder 25 to receive the enabling signals.

The I/O modules 17 and 18 are connected to the data bus 26 to receive bytes of data when enabled through a respective slot enable line 30. The standard I/O modules 18 are connected by lines 31 (only some of which are shown in FIG. 2) to single-bit digital devices 32 on a controlled machine 33. A standard I/O module 18 can be an input module that is connected to eight single-bit sensing devices, such as photocells or limit switches, or it can be an output module that is connected to eight single-bit output devices, such as solenoids or relays. The analog input high density module 17 is connected through eight analog signal lines 34a–34h to eight analog input devices 35, such as valve position transducers and temperature transducers, on the controlled machine. Lines 31 and 34a–h from the I/O devices 32 and 35 connect to terminals 19a on the swing arms 19 in FIG. 1. Referring again to FIG. 2, the analog input module 17 is connected through the backplane to a strobe line 36 and an I/O reset line 37 coming from the timing circuit 21, and to a read line 38, a write line 39 and a high density ID line 40 coming from the chip select circuit 28. Through the high density ID line 40 the main microprocessor 20 identifies an I/O module as a high density module 17 during an I/O scan.

Figure 6:
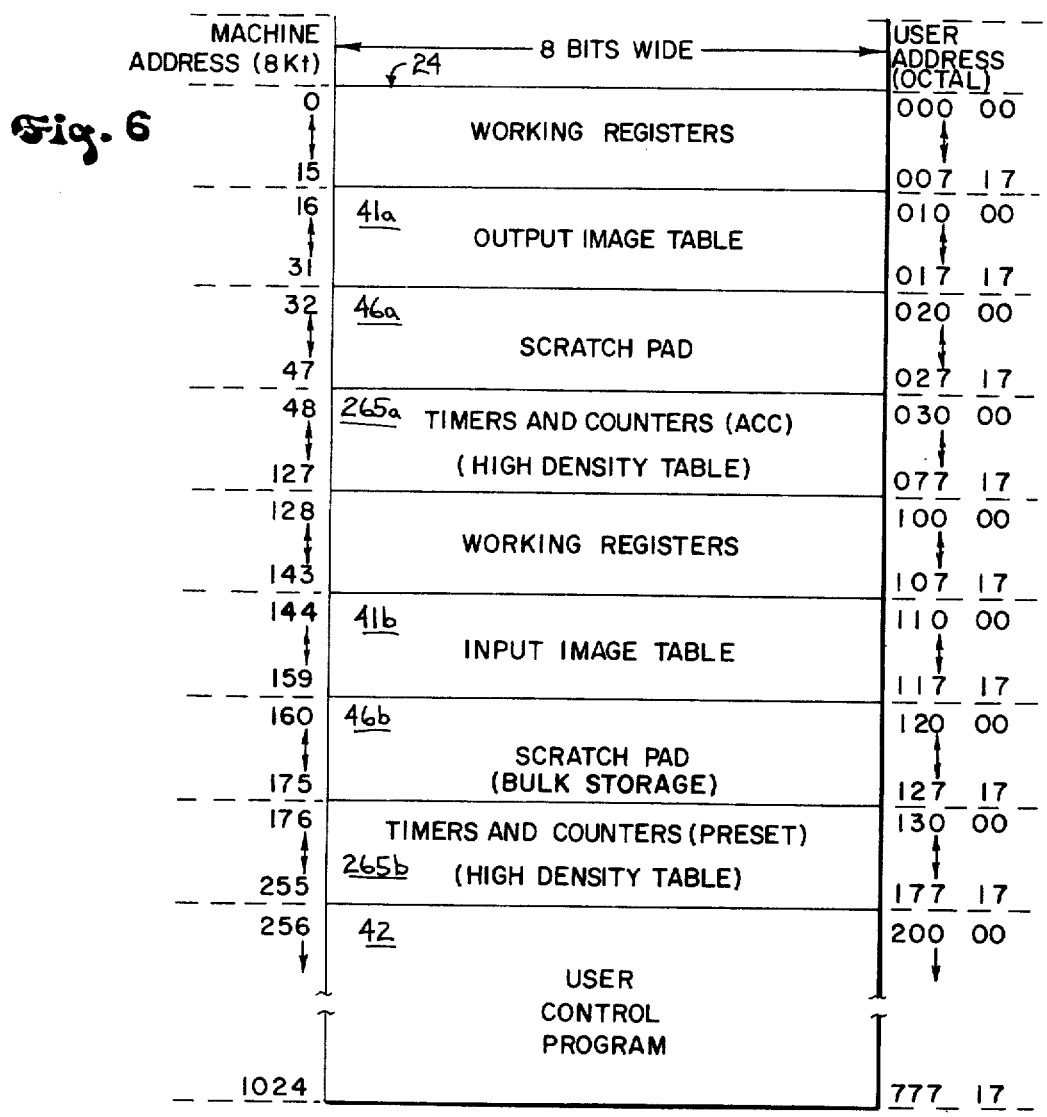
FIG. 6 is a memory map diagram of the contents of the main RAM memory in FIG. 2.

As in several prior controllers, input status data and output status data are coupled between the RAM 24 and the I/O modules 17 and 18 during an I/O scan. Input status data represents the condition of digital and analog sensing devices 32 and 35, while output status data will operate digital output devices 32. Although no analog output devices are present in this example, it should be apparent that the data transfer techniques explained herein are equally applicable to such devices, and are therefore within the scope of the invention. During each I/O scan, input status data is coupled to an input image table 41b stored in lines 144–159 (octal) of the RAM 24, as seen in FIG. 6. This data is examined by program instructions in a control program 42, which is stored in lines 256 and above. During execution of the control program 42, output status data is generated and stored in the output image table 41a in lines 16–31 for coupling to output modules during the next I/O scan.

The control program instructions stored in the RAM 24 are instructions that are familiar to users of programmable controllers. These instructions have been developed with the art into a relatively standard set of program instructions. These instructions perform operations which are known by mnemonics such as XIC, XIO, BST, BND, GET, PUT and TON 0.1, to name a few. These instructions are not directly recognized by microprocessors, because each microprocessor has its own instruction set devised by its respective manufacturer. In this example, the main microprocessor 20 is a Z80-A microprocessor available from Zilog, Inc. For the instruction set of this microprocessor 20, as well as a description of its architecture and operation, reference is made to the Z80-CPU Technical Manual, copyright 1976 by Zilog, Inc.

The I/O image table 41a and 41b and the control program 42 of FIG. 6 are stored in a read/write RAM memory 24 of FIG. 2, so that image table data and program instructions can be easily updated and revised.

Instructions for the microprocessor 20, on the other hand, are not ordinarily altered in the field and nonvolatile storage of such instructions is desirable. Therefore, microprocessor instructions are stored in the PROM 23, which has capacity for storing 4K data words of eight bits each in separately addressable lines.

Figure 7:
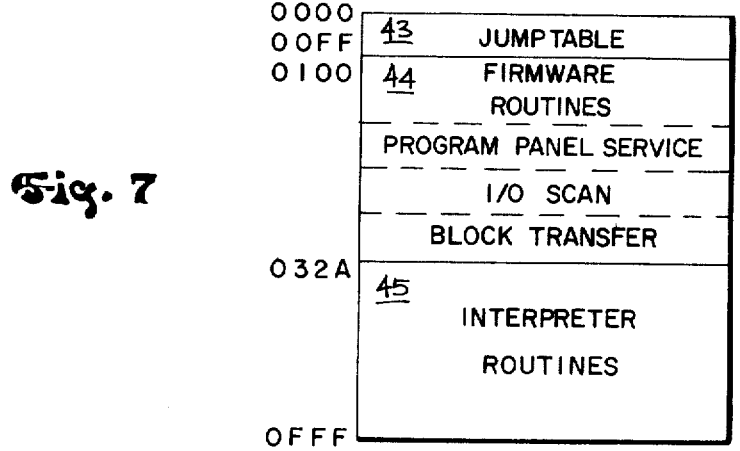
FIG. 7 is a memory map diagram of the organization of the interpreter PROM memory in FIG. 2.

The organization of the PROM 23 is seen in FIG. 7. A jump table 43 is stored in the lowest address lines of the PROM 23, followed by a group of firmware routines 44. The firmware routines 44 include an I/O scan routine and a program panel service routine. Following the basic firmware routines 44 are a group of macro-instruction interpreter routines 45, which are stored in the highest address lines in the PROM 23. Each of these routines corresponds to a distinct control program instruction, or macro-instruction, in the set of macro-instructions used in programming the controller 10. Each macro-instruction in the control program 42 is linked to one of the interpreter routines 45 in the PROM 23, as further explained below.

To read a control program instruction, the main microprocessor 20 executes a FETCH routine of microprocessor instructions. Most of the control program instructions include both an eight-bit operand address and an eight-bit operation code which are stored on even and odd lines, respectively, in the RAM 24. These must be loaded into certain internal registers in the main microprocessor 20 during the FETCH routine before execution of the control program instruction. The FETCH routine is as follows:

TABLE 1

| FETCH ROUTINE | |
|---|---|
| Instruction Mnemonic | Comment |
| POP HL | Get next instruction; store the operand address in the L register; and store the operation code in the H register. |
| LD E,L | Load operand address (the low byte of the control program instruction) into the E register. |
| LD L,H | Form the address in HL which specifies a location in the jump table 43 in the ROM 23. |
| LD H,C | |
| JP (HL) | Jump indirect via the jump table 43 in the ROM 23. |

The main microprocessor 20 makes use of a number of internal registers in executing the FETCH routine, and these registers are described in the Z80-CPU Technical Manual cited above. These registers include:

| PC | - | a 16-bit program counter |
| SP | - | a 16-bit stack pointer |
| B&C | - | 8-bit registers arranged as a pair |
| D&E | - | 8-bit registers arranged as a pair |
| H&L | - | 8-bit registers arranged as a pair |

The program counter PC stores the memory address of the current microprocessor instruction to be read from the PROM 23. While this instruction is being read from the PROM 23, the program counter PC is incremented for addressing the next line in the PROM 23. The stack pointer SP stores the memory address of the programmable controller-type instruction to be read from the RAM 24. It is initialized to point at the first instruction in a control program 42, and, as each sixteen-bit instruction is fetched, the stack pointer SP is incremented two counts to address the next control program instruction.

The operation code that is read by the main microprocessor 20 is, in fact, an address in the jump table 43 in the PROM 23. The jump table 43 contains statements for jumping to an address of a first instruction in one of the interpreter routines 45. The last portion of each interpreter routine includes the FETCH routine, which is executed to fetch the next control program macro-instruction.

Where control program instructions are used to manipulate single bits of data, eight distinct interpreter routines corresponding to the bits of data to be manipulated are required; e.g., XIC0, XIC1, XIC2, XIC3, XIC4, XIC5, XIC6, and XIC7. Each bit-oriented instruction has a five-bit operation code and a three-bit bit pointer code that are coupled through the jump table 43 to a respective interpreter routine. A typical interpreter routine for XIC2 is given below in Table 2. This interpreter routine examines bit 2 of an input status byte in the I/O image table 41. Bit 2 in this instance represents the status of some relay contacts (not shown).

TABLE 2

| XIC2 INTERPRETER ROUTINE | |
|---|---|
| Instruction Mnemonic | Comment |
| LD A,(DE) | Load operand in the A register. |
| BIT 2,A | Test the specified bit. |
| JR NZ,FETCH | Jump to fetch next macro-instruction if bit 2 equals 1 (which represents closed contacts). |
| RES O,B | Reset rung status if bit 2 equals 0 (which represents open contacts). |
| FETCH: | Execute FETCH routine |

There are three general types of controller instructions: bit-oriented instructions, logic instructions, and word-oriented instructions. The XIC2 instruction explained above is a bit-oriented instruction because the operand is bit 2 in a word of input status data. BST, on the other hand, is a logic instruction without an operand. BST directs the controller to begin a new branch within a rung of a ladder diagram of the type well known in the art. A timer instruction such as TON 0.1 is a word-oriented instruction; it compares an accumulated data word to a preset data word and determines whether a timer has "timed out." If it has, the output is turned on. Other word-oriented instructions are GET and PUT which exchange words of data between a scratch pad area in the RAM 24 and the accumulator of the main microprocessor 20. As seen in FIG. 6, the scratch pad area is divided into two areas 46a and 46b, the first residing at lines 32–47 and the second residing at lines 160–175 in the RAM 24.

Referring again to FIG. 2, the control program instructions in the RAM 24 have eight bits of coded data that cannot be mapped directly to the interpreter routines 49 through the jump table 43 in the PROM 23. Instead, the control program instructions in the RAM 24 use operation codes and bit pointer codes which are assigned by the program panel 12, and which shall be referred to as untranslated codes. This allows the program panel 12 to be used with other programmable controllers that recognize the untranslated codes. To relate the untranslated codes to operation codes and bit pointer codes recognized by the main microprocessor 20, a translator PROM 47 is used.

The data bus 26 is divided into a main branch 26a, an input branch 26b and an output branch 26c, the latter two of which stem from the main branch 26a and connect through a two-way branch 26d to the RAM 24. A set of buffers 48 is connected in the input branch 26b, and the translator PROM 47 is connected in the output branch 26c. The translator PROM 47 is a 512-line by eight-bit mask programmable read-only memory with nine address inputs, $A_8$–$A_0$, and eight data outputs 49. The upper address input $A_8$ is connected by a translating line 50 to the chip select circuit 28. An enable input on the translator PROM 47 is connected by a translator PROM enable line 51 to the chip select circuit 28. The lower eight address inputs $A_7$–$A_0$ of the PROM 47 are coupled to the RAM 24 through branch 26d of the data bus 26, and the eight data outputs 49 on the PROM 47 are coupled to the main branch 26a of the data bus 26.

In the RAM 24 bit-oriented and word-oriented instructions are each stored on two lines, one line containing an operand address and a succeeding line containing an untranslated operation code, and an untranslated bit pointer code, if applicable. Logic instructions in the control program have only an untranslated operation code. Operand addresses are stored on even-numbered lines while the operation codes are stored on odd-numbered lines in the RAM 24.

In the translator PROM 47, the upper 256 lines contain all possible eight-bit operand addresses arranged in sequence so that a one-to-one mapping data occurs when data is read into the address inputs $A_7$–$A_0$ of the PROM 47. The translated operation codes, which are recognized by this controller, are stored on the lower 256 lines. When the main microprocessor 20 reads translated control program instructions, it generates an address from 12K +256 to 13K +999 on the address bus 27. First, an even address is generated and a logic low signal is transmitted on the AB0 address line. The chip select circuit 28 responds to this signal to generate a logic high signal on the translating line 50 so that an operand address is read from the upper half of the PROM 47. The stack pointer SP in the main microprocessor 20 is then incremented to an odd-numbered address so that a logic high signal is transmitted on the AB0 address line. A logic low signal is generated on the translating line 50 and a translated code is read from the lower half of the PROM 47. Data other than control program instructions is read at addresses between 8K and 10K in the RAM 24. In this address range the translating line 50 is held high regardless of the signal on the AB0 address line, so that a one-to-one mapping of data through the translator PROM 47 occurs. This will be more apparent from the more detailed explanation below of the chip select circuit 28.

The program instructions with untranslated codes are loaded into the RAM 24 through the program panel 12, the program panel interface 22, the data bus 26, and the input buffers 48. The buffers 48 are enabled through a buffer enable line 52 connecting them to the chip select circuit 28. The program panel interface 22 is enabled through a CS USART line 53 connecting it to the chip select circuit 28. In addition, the interface 22 is connected through a two-megahertz clock line 54 to the timing circuit 21, and through the read and write lines 38 and 39 to the microprocessor 20. The program panel 12 is connected to the interface 22 through two pairs of conductors 55, which are contained in the transmission cable 13 of FIG. 1. When data is entered through the program panel 12, an interrupt signal is transmitted to the microprocessor 20 through an interrupt line 56, and the program panel service routine is executed to control communication between the program panel 12 and the RAM 24.

In controlling the flow of data between the memories 23 and 24 and the I/O interface section 29, the main microprocessor 20 is assisted by the timing circuit 21 and the chip select circuit 28. As seen in FIG. 2, the microprocessor 20 is connected to the timing circuit 21 and the chip select circuit 28 by the read and write control lines 38 and 39 to control read and write operations. The chip select circuit 28 is connected by the PROM 1 and PROM 2 enable lines 57 and 58 to enable 2K blocks of the PROM 23. Similarly, the chip select circuit 28 is connected by RAM 1 and RAM 2 enable lines 59 and 60 to enable 1K ×8-bit sections of the RAM 24. In addition, the chip select circuit 28 is connected by a RAM enable line 61 to enable a 4K ×1-bit section of the RAM 24 which stores the parity of data in the 2K ×8-bit section. The chip select circuit 28 is connected by a CS I/O line 62 to the decoder 25, and by both the CS I/O line 62 and the read line 38 to a set of bidirectional buffers 63. The buffers 63 couple two sections of the main branch 26a of the data bus 26 to enable the coupling of data to the I/O modules 17 and 18.

Figure 3:
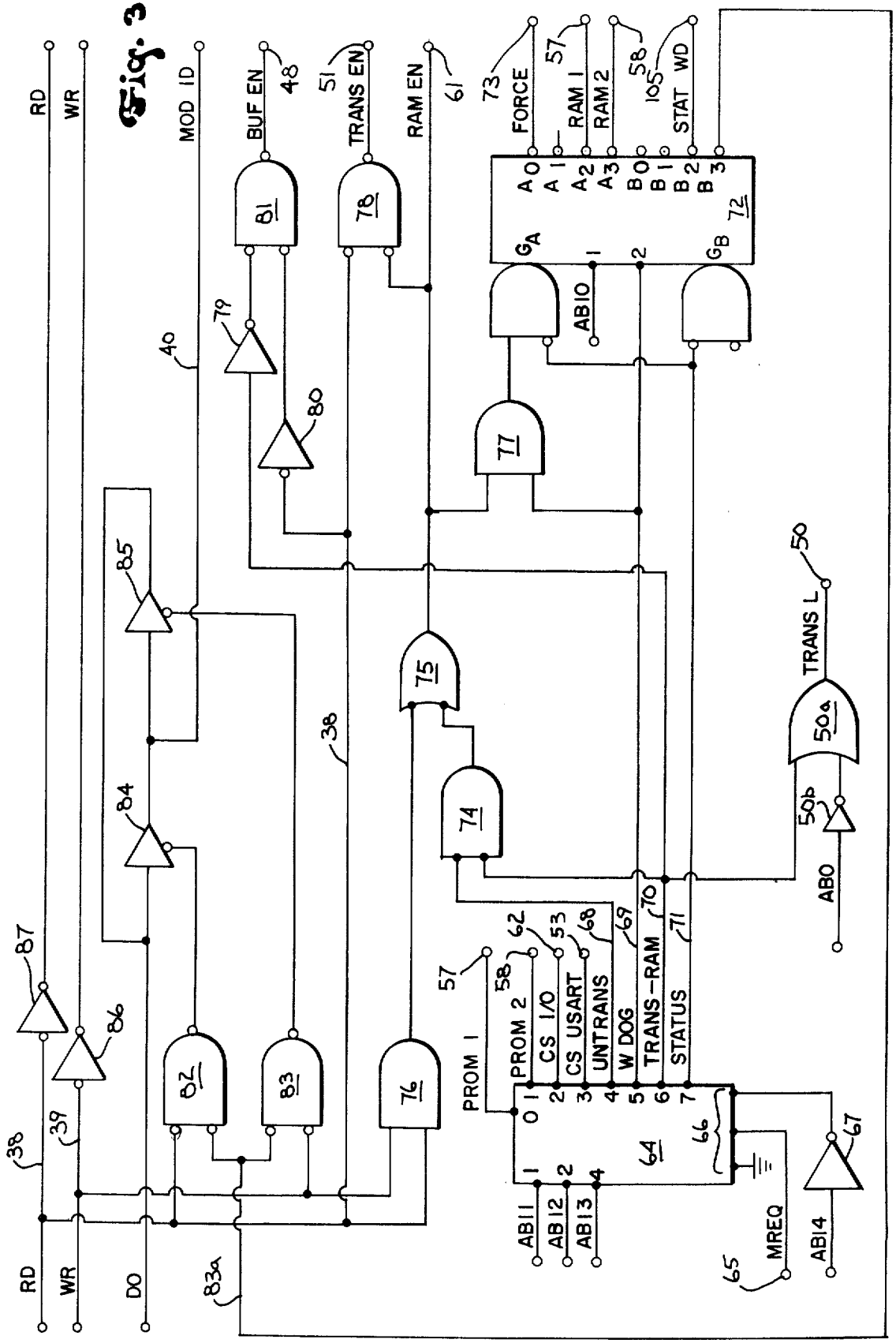
FIG. 3 is an electrical schematic diagram of the chip select circuit shown in FIG. 2.

The chip select circuit 28 is seen in more detail in FIG. 3. Signals on lines AB11–AB14 of the address bus 27 are decoded by a three-line-to eight-line decoder 64 in the chip select circuit 28. Lines AB11, AB12 and AB13 connect to the "1," "2" and "4" inputs, respectively, on the decoder 64. A memory request (MREQ) line 65 connects the main microprocessor 20 to one of the three enable inputs 66 on the decoder 64. One of the other enable inputs 66 is grounded, and the AB14 line is connected through an inverter 67 to the other enable input 66. The PROM 1 and PROM 2 lines 57 and 58 are connected to the "0" and "1" outputs of the decoder 64. The main microprocessor 20 addresses the PROM 23 at addresses below 4K. When an address below 2K appears on the address bus 27, lines AB11–AB14 carry logic low or binary "0" signals and cause a low true signal to be output on the PROM 1 line 57 to enable the lower 2K block of the PROM 23. When the upper 2K block of the PROM 23 is addressed, a logic high true signal is present on the AB11 address line and a logic low true signal is present on the PROM 2 line 58 to enable the upper 2K block of the PROM 23.

Similarly, signals on the address lines AB11–AB14 and the MREQ line 65 will produce enabling signals on other enable lines connected to outputs "2"–"7" of the decoder 64. The CS I/O line 62 connects to the "2" output on the decoder 64, and when an address between 4K and 6K is decoded, it carries an enabling signal to the decoder 25 and the buffers 63 to couple data to and from the I/O modules 17 and 18. The CS USART line 53 is connected to the "3" output and carries an enabling signal when an address from 6K to 8K appears on the address bus 27 to address the program panel 12. An UNTRANS line 68 connects to the "4" output; a watchdog-parity (WDOG) line 69 connects to the "5" output; a TRANS-RAM line 70 connects to the "6" output; and a STATUS line 71 connects to a "7" output. It will be apparent from the remaining description of the chip select circuit 28 that the main microprocessor 20 addresses memory locations in the RAM 24 beginning at 2000 (hexadecimal), that it addresses the watchdog and parity circuitry when the number 2800 (hexadecimal) is generated on the address bus 27, and that it addresses locations in the RAM 24 beginning at 3000 (hexadecimal) to read translated control program instructions. The timing circuit 21 can be addressed to read a processor status word when a 3800 (hexadecimal) address is present on the address bus 27.

Outputs "4"–"7" on the decoder 64 are coupled to a dual two-to-four-line decoder 72 having gate enable inputs $G_A$ and $G_B$. Two other inputs "1" and "2" are coupled to one of two sets of outputs, either $A_0$–$A_3$ or $B_0$–$B_3$, depending on which gate input $G_A$ or $G_B$ is enabled. The watchdog-parity line 69 connects the three-to-eight-line decoder 64 to the "2" input on the two-to-four-line decoder 72, and when gate input $G_A$ is enabled, generates an enabling signal on one of the RAM enable lines 57 and 58, which are connected to the $A_2$ and $A_3$ outputs, respectively. A signal on the AB10 address line connected to the "1" input on the two-to-four-line decoder 72 selects which of these RAM enable lines 57 and 58 receives the enabling signal. The gate input $G_A$ also receives an enabling signal when a watchdog error or parity error is forced through a FORCE line 73 connected to the $A_0$ output on the decoder 72. The other gate $G_B$ receives an enabling signal on the STATUS line 71 when the processor status word address 14K is generated on the address bus 27.

The UNTRANS line 68 and the TRANS-RAM line 70 are coupled through several gates with the read and write lines 38 and 39 to control signals on the buffer enable (BUF EN) line 48, the translator PROM enable (TRANS EN) line 51 and the RAM enable (RAM EN) line 61. The UNTRANS line 68 and the TRANS-RAM line 70 are coupled through an AND gate 74 to an input on an OR gate 75. The read and write lines 38 and 39 are also coupled through an AND gate 76 to another input on this OR gate 75, the OR gate 75 having its output connected to the RAM enable line 61. The output is this OR gate 75 and the watchdog-parity line 69 are coupled through another AND gate 77 to one of the dual inputs $G_A$. The output of this OR gate 75 and the read line 38 are also coupled through a low true OR gate 78 to the translator PROM enable line 51. The TRANS-RAM line 70 and the read line 38 are also coupled through inverters 79 and 80 of two inputs on another low true AND gate 81, and the output of this AND gate 81 is connected to the buffer enable line 48. And, the TRANS-RAM line 70 and the AB0 address line are coupled through an OR gate 50a to control the translating (TRANSL) line 50.

The read and write lines 38 and 39 are, in addition, each coupled to an input on one of two low true OR gates 82 and 83, each gate having another input connected to the $B_3$ output of the two-to-four-line decoder 72 through a module ID coupling line 83a. The outputs of these two OR gates 82 and 83 are connected to enable inputs on two other gates 84 and 85 which couple the D0 line to the module ID line 40. One gate 84 couples signals from the D0 line to the module ID line 40 while the other gate 85 couples signals from the module ID line 40 to the D0 line. Besides being coupled to various enable lines through the gates just described, the read and write lines 38 and 39 are connected through respective drivers 86 and 87 to outputs on the chip select circuit 28. From this description it will be apparent how the chip select circuit decodes signals on lines AB1-0–AB14 of the address bus and the other control lines coming from the microprocessor to enable various circuits on the processor module 16.

Other control circuitry is included in the timing circuit 21 represented in FIG. 2. The timing circuit 21 provides timing signals, senses parity and other communication errors, and controls the mode of operation of the controller. Actual parity error checking is performed by a parity checker 88, also seen in FIG. 2. The parity checker 88 is connected to branch 26d of the data bus 26 and receives a stored parity bit through a parity out line 90 when data is read from the RAM 24. The stored parity is compared with the parity calculated for data read out on the data bus 26. When data is read into the RAM 24, the parity checker 88 calculates its parity and transmits it to the proper storage location in the RAM 24 through a parity in line 91. Parity errors are reported to the timing circuit 21 through the parity line 89 connecting the parity checker 88 and the timing circuit 21.

Figure 4:
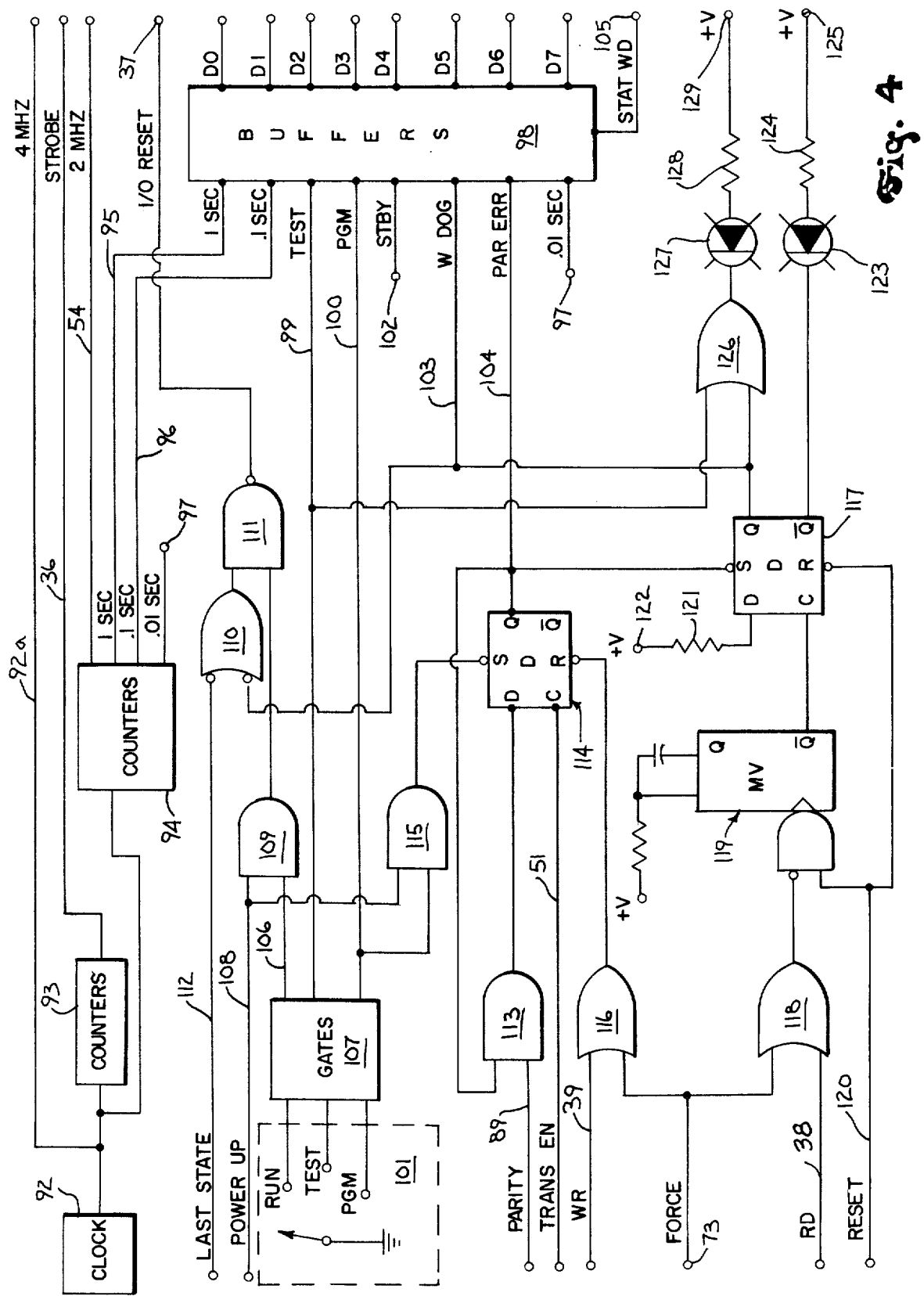
FIG. 4 is an electrical schematic diagram of the timing circuit shown in FIG. 2.

As seen in FIG. 4, the timing circuit 21 includes a clock 92 and two sets of counters 93 and 94. The clock 92 outputs a four-megahertz signal to the main microprocessor 20 and to both sets of counters 93 and 94 on a four-megahertz line 92a. The output of the first set of counters 93 is connected to the strobe line 36. The second set of counters 94 has four outputs connected to the two-megahertz line 54, a 1-second time base line 95, a 0.1-second time base line 96 and a 0.01-second time base line 97. The 1-second time base line 95 is connected through a set of output buffers 98 to line D0 in the main data bus 26. Similarly, the 0.1-second time base line 96 and the 0.01-second time base line 97 are connected through line output buffers 98 to lines D1 to D7, respectively. Other lines coupled through the buffers 98 include a TEST line 99 and a PROGRAM line 100 that couple a three-position mode switch 101 to lines D2 and D3 of the main data bus 26, respectively. A standby battery sensing (STBY) line 102 is coupled to line D4 of the main data bus. Finally, a watchdog (WDOG) status line 103 and a parity error (PAR ERR) status line 104 are coupled to lines D5 and D6, respectively, of the main data bus 26. The buffers 98 are enabled through a status word (STAT WD) line 105 originating at the B2 output of the decoder 72 in FIG. 3. When the status word address, 14K, appears on the main address bus 27, the address is decoded by the chip select circuit 28, as explained previously, and eight bits of status data can be read by the microprocessor 20.

The mode switch 101 can be set for RUN, TEST or PROGRAM modes of operation. Lines 106, 99 and 100 corresponding to these three positions are coupled through a set of low true AND gates 107 to the buffers 98 and several other gates. The RUN mode line 106, which is active in the logic high state, is couples with a power-up (POWR UP) sensing line 108 to an AND gate 109. The output of this AND gate 109 is coupled with the output of a low true NAND gate 110 through a high true NAND gate 111 to the I/O reset line 37. The watchdog status line 103 and a LAST STATE line 112 are connected to the inputs of the low true NAND gate 110.

The gates 109–111 condition the state of the I/O reset line 37 as follows. When the processor module 16 is operating in the TEST mode or the PROGRAM mode and power is lost, the last state option cannot be selected. The LAST STATE line 112, which is usually connected to a switch to determine its logic state, permits a user to choose between deenergizing the I/O devices (I/O reset) or leaving them in their "last state," before operation is interrupted. The LAST STATE line 112 is also ignored when an error is reported on the watchdog status line 103.

The other circuitry in FIG. 4 monitors watchdog timer errors and parity errors which are reported on the watchdog and parity error status lines 103 and 104. The parity line 89 is coupled through an AND gate 113 to a D input on a D-type, parity error flip-flop 114. The translator PROM enable line 51 is connected to a clock input on this flip-flop 114. The power-up sensing line 108 and the PROGRAM line 100 are coupled through another AND gate 115 to a set terminal on the flip-flop 114, while the write line 39 and the FORCE line 73 are coupled through an OR gate 116 to a reset terminal on the flip-flop 114. The Q output of the flip-flop 114 is coupled back through an input of the AND gate 113, is connected to the parity error status line 104 and is connected to a set terminal on a D-type, watchdog status flip-flop 117.

The remaining circuitry pertains to the watchdog timer and includes an OR gate 118 that couples the FORCE line 73 and the read line 38 to one of the dual clock inputs on a watchdog timer 119. The timer 119 includes a monostable multivibrator and an RC coupling circuit for determining the timing constant. A reset line 120 coming from the microprocessor 20 is connected to the other clock input of the timer 119 and to a reset terminal on the watchdog status flip-flop 117. The D input of the watchdog flip-flop 117 is pulled high through a resistor 121 by a source of positive d-c voltage 122. The clock (C) input of the watchdog flip-flop 117 is connected to the Q output of the multivibrator. When the multivibrator is clocked by a logic low clock signal, it is set. If allowed to time out without receiving another clock pulse, it becomes reset and the watchdog flip-flop 117 is set. This turns on the watchdog error LED 123, which is connected to the Q output of the watchdog flip-flop 117, and which is supplied by current through a pull-up resistor 124 from a source of positive d-c voltage 125. The Q output of the watchdog flip-flop 117 and the TEST line 99 are coupled through an OR gate 126 to a RUN LED 127. This LED 127 is supplied by a positive d-c voltage source 129 through another pull-up resistor 128. The LED 127 conducts when the watchdog flip-flop is reset to indicate a satisfactory or "go" condition, and is turned off when the watchdog flip-flop is set.

Referring to FIGS. 2 and 5a, the analog input high density module (H.D.) 17 is located in the first I/O module slot of the I/O interface section 29 and is connected to the timing circuit 21, the chip select circuit 28 and the decoder 25 through several control lines 30, 36-40 described above. The control lines 30, 36-40 connect to circuitry on the high density module 17, which circuitry can be grouped according to one of four general functions performed on the module 17.

The first of these functions is the high density module identification function. Logic circuitry, including a high density ID flip-flop 131 in FIG. 5a, is provided for receiving a control signal from the main microprocessor 20 and for generating a high density ID signal in response thereto. This signal is sensed by the main microprocessor 20 to detect the presence of the high density I/O module 17.

Another group of circuitry forms a high density processing section. This section includes an Intel 8748 microcomputer 132 that provides the processing, control and storage functions that are necessary in a high density module 17. The microcomputer 132 includes on-board memory which will be described in more detail below. A six-megahertz clock 130 is connected to a pair of clock inputs on the microcomputer 132 to provide timing signals. Also associated with the microcomputer 132 is interrupt circuitry including an interrupt flip-flop 133 that generates interrupt signals to the microcomputer 132 in response to read/write control signals from both the main microprocessor 20 and the high density module 17.

A third group of circuitry includes a system input latch 134, a microbus output latch 135, a system output latch 136, and a set of drivers 137. This latching circuitry temporarily holds data as it is coupled between the main processor module 16 and the high density module 17 in response to control signals originating on the respective modules 16 and 17.

A fourth group of circuitry forms an analog input section 17a of the high density module 17. This section is coupled to the high density processing section, and particularly to the microcomputer 132, to provide an I/O function between the high density module 17 and the controlled analog devices 35 on the machine 33 shown in FIG. 2.

A more detailed description of these four sections shall begin with a description of the high density ID logic circuitry. Referring again to FIG. 5a, the strobe line 36, the write line 39, and the SEN 0 line 30 are coupled through a first three-input, low true NOR gate 138. The output of this NOR gate 138 is connected through a series resistor 139 in a noise suppression circuit 140 and through an inverter 141 to an input on a second three-input, low-true NOR gate 142. The noise suppression circuit 140 also includes a pull-up resistor 143 connected between the output of the first NOR gate 138 and a positive d-c voltage source 144, and a capacitor 145 connected between the input on the inverter 141 and ground. The strobe line 36 connects to another input on the second NOR gate 142, the third input of this gate 142 being grounded. The output of the second NOR gate 142 is connected through an inverter 146 to a set terminal on the module ID flip-flop 131.

In a parallel branch of this logic circuitry, the read line 38 and the SEN 0 line 30 are coupled through a three-input, low true NOR gate 147, a second noise suppression circuit 148 of the type described above, and two inverters 149 and 150 to the clock input on the module ID flip-flop 131. The D input on this D-type flip-flop 131 is grounded so that signals recorded at the clock input can control the resetting of the flip-flop 131.

The high density ID logic circuitry is coupled to the high density processing circuitry as follows. The outputs of the inverters 146 and 149 are coupled through a low true NAND gate 151 to a clock (C) input on the interrupt flip-flop 133, which is a D-type flip-flop. This flip-flop 133 has a Q output connected to an INT input on the microcomputer 132 to generate a logic low interrupt signal when the flip-flop 133 is set. The flip-flop 133 is set when the main microprocessor 20 executes a read or write operation. Signals on the read line 38 or the write line 39 coming from the chip select circuit 28 generate a pulse at the output of the NAND gate 151, and this pulse sets the interrupt flip-flop 133.

When an interrupt occurs, it can be determined whether it was caused by a read or write signal from the chip select circuit 28. A write signal will set the high density ID flip-flop 131. The Q output of this flip-flop 131 is connected to a T1 input on the microcomputer 132. The status of the high density ID flip-flop 131 can therefore be tested at the T1 input with a conditional jump instruction. If the high density flip-flop 131 is set, the microcomputer 132 continues its I/O scan routine. On the other hand, a read signal from the processor module 16 will reset the high density ID flip-flop 131, and the same conditional jump instruction will then direct the microcomputer 132 to jump from its I/O scan routine to the high density transfer routine.

The Q output of the high density ID flip-flop 131 is coupled with an enable line through a NAND gate 152 to the high density ID line 40. A J-K flip-flop 153 has its Q output connected through the enable line to one input of the NAND gate 152. This J-K flip-flop 153 is set when a switch 154 is closed and a module status word is written to the high density I/O module 17. The closing of the switch 154 selects the block transfer mode of communication between the main processor module 16 and the high density I/O module 17, while the opening of the switch 154 selects a mode of communication to be directed by a user applications program stored as part of the control program 42 in the RAM 24, seen in FIG. 6.

The switch 154 is coupled through an AND gate 155 to the K input and the reset terminal on the flip-flop 153. The output of the AND gate 155 is also coupled through another AND gate 156 with the output of an EX OR gate 157. Lines D6 and D7 of the main data bus 26 are coupled through a low true AND gate 158 to an input of the EX OR gate 157, while the other input of the EX OR gate 157 is pulled high. When either bit 6 or bit 7 of a word is low, indicating a module status word with a read or write flag, the switch 154 is closed, and a signal is coupled through the AND gate 156 to the J input on the J-K flip-flop 153. When a clock signal is coupled at the clock input of the flip-flop 153, it is also coupled to the set terminal on the high density ID flip-flop 131. Thus the module ID line 40 goes low, when enabled through the NAND gate 152, as a module status word is written to the high density I/O module 17. The microcomputer 132 senses the condition of the module ID line 40 indirectly by sensing the switch 154 through line P24 and by sensing the Q output of the module ID flip-flop 131.

The set or reset condition of the interrupt flip-flop 133 can be sensed by the microcomputer 132 at T0 input. An interrupt line 159 connecting the interrupt flip-flop 133 to the INT input is also connected to one input on an XOR gate 160, which has its output connected to the T0 input. When the interrupt flip-flop 133 is set, the T0 input will receive a logic low signal which can be detected with a conditional jump instruction. The interrupt flip-flop 133 is reset when the microcomputer 132 executes a read or write operation—for example, the writing of a word of data to the microbus output latch 135. The interrupt flip-flop 133 is set when the main microprocessor 20 reads this word of data. By sensing the conditions described above at its T1 and T0 inputs and on line P24, the microcomputer 132 can engage in a communication sequence with the main microprocessor 20.

Activity on the high density module 17 is controlled by the microcomputer 132, which in this embodiment is the Intel 8748 Microcomputer commercially available from the Intel Corporation. While the application of this microcomputer to the high density module 17 will be described, reference is made to a Microcomputer Users Manual, copyright 1976 by the Intel Corporation, for full details of the architecture, operation and instruction set of this microcomputer.

The 8748 Microcomputer 132 includes a 1K ×8-bit EPROM (erasable, programmable read-only memory) 161, a 64-line ×8-bit RAM 162, and a processing and control portion which shall be referred to as the high density processor 163. This high density processor 163 includes an eight-bit CPU and internal timing, interrupt and reset circuitry. The T0 and T1 inputs on the processor portion 163 can be tested with conditional jump instructions, while a logic signal at the INT input initiates a jump to a specified program routine. When this latter jump occurs, the interrupt circuitry in in the microcomputer 132 is disabled, and it is not re-enabled until an instruction is executed to return from the interrupt routine. The high density processor 163 also tests signals on individual lines in one of two quasi-bidirectional I/O ports P1 and P2. Each of these I/O ports is eight bits wide, and individual input/output lines are designated P10–P17 and P20–P27 in ports P1 and P2, respectively. The ports are called quasi-bidirectional because output data is latched in the ports until written over, while input data must be present on lines connected to the ports to be read. Input lines and output lines can be mixed in either or both of these I/O ports, P1 and P2.

As distinguished from ports P1 and P2, a data bus port DB is a true bidirectional I/O port through which eight bits of data can be input from a data microbus 164 or output of the data microbus 164. The eight lines of the data microbus 164 are designated DB0–DB7 and correspond to bits of data coupled through the data bus port DB. The data microbus 164 couples the DB port to the latching circuitry on the high density module 17 including the system input latch 134 and the microbus output latch 135. The microbus output latch 135 is coupled through the system output latch 136 and the drivers 137 to the main data bus 26 (lines D0–D7). The data microbus 164 is thus coupled by both input and output latching circuitry to the main data bus 26 of the main processor module 16.

When the high density processor 163 executes read and write operations, it generates strobe signals on a read line 165 and a write line 166 connected to control outputs RD and WR, respectively, on the high density processor 163. The read line 165 is connected to an enable input on the input latch 134. Data is clocked into the input latch 134 by a signal generated by the main microprocessor 20 through the low true NOR gate to a clock input on the latch 134. When a logic low signal is generated on the high density read line 165, the data is coupled to the data microbus 164. The high density write line 166 is connected to a clock input on the microbus output latch 135, so that a logic low signal on the write line 166 will latch data from the microbus 156. The output of inverter 150 in the logic circuitry discussed above is connected by an enable line 167 to a clock input on the system output latch 136, and the output of the preceding inverter 149 is connected by an enable line 168 to an enable input on the drivers 137. The system latch 136 and the drivers 137 are thus enabled by signals generated in response to an active logic signal on the system read line 38, so that data is coupled to the main data bus 26.

An active signal on either the read line 165 or the write line 166 coming from the high density processor 163 resets the interrupt flip-flop 133. The two lines 165 and 166 are coupled through a low true OR gate 169 and an inverter 170 to the reset terminal on the interrupt flip-flop 133 for this purpose. (The set terminal on the flip-flop 133 is pulled high.) When data is written to the microbus output latch 135, the interrupt flip-flop 133 is reset, and when data is read by the main microprocessor 20, the interrupt flip-flop 133 is set. Conversely, when data from the main microprocessor 20 is written into the input latch 134, the interrupt flip-flop 133 is set, and when the data is read by the high density processor 163, the interrupt flip-flop 133 is reset.

Besides the logic circuitry described above, additional circuitry is provided to couple the I/O reset line 37 to the high density module 17. The I/O reset line 37 operates in a manner well understood in the art to deenergize the I/O devices on a machine. Although the function of the I/O reset line 37 is limited in an analog input module, the application of the I/O reset line 37 to other high density modules will be apparent to those skilled in the art.

In this high density module 17, the I/O reset line 37 is coupled through an inverter 171 and one input of an EX OR gate 172 to the D input on the interrupt flip-flop 133. The I/O reset line 37 is coupled through the EX OR gate 172 to reset terminals on the high density ID flip-flop 131, and the output latches 135 and 136. These circuits can be reset by the main microprocessor 20 through the I/O reset line 37, or by the high density processor 163 through the P27 line, which is connected to another input of the EX OR gate 172. The main microprocessor 20 resets these circuits after it executes a read operation. This reset also clears output latches 135 and 136 to output zeroes on the main data bus 26. The high density processor 163 senses the reset at its TO input through a second inverter 173 and EX OR gate 160, the high density processor also sensing the status of the interrupt line 159 through this gate 160.

Referring to FIGS. 5a and 5b, the processing section of the high density module 17 is connected to the analog input section 17a through I/O ports P1 and P2 on the high density processor 163. Lines P10–P17 form a module I/O bus 174 that couples parallel data between a shift register 175 and the I/O Port P1. Lines P20–P22 in the second I/O port P2 are coupled to three selector inputs 176 on an eight-channel analog multiplexer 177. These lines P20–P22 are coupled through a set of drivers 178 and two dual optical coupling circuits 179 seen in FIG. 5a that provide physical and electrical isolation between lines P20–P22 and the selector inputs 176. Line P23 couples the high density processor 163 through one of the drivers 178 and one of the dual optical coupling circuits 179 and through a NAND gate 180 in FIG. 5b to a start conversion input 181 on an analog-to-digital converter 182.

The A/D converter 182 is a twelve-bit successive approximation type. Through the P23 line, the high density processor 163 sends a logic high true signal to the A/D converter 182 to begin conversion of analog data to digital data. The digitized data is coupled to the shift register 175 through a serial output 183, one of three NAND gates 184 and one of two optical coupling circuits 185. The transfer of this data is sequenced by signals from a clock output 186 on the A/D converter 182, which is coupled to a clock input on the shift register 175 through one of the NAND gates 184 and one of the optical coupling circuits 185. The end of the data conversion is indicated on line P26 by a logic high true signal from an EOC output 187 on the A/D converter 182, which is coupled to line P26 through another of the NAND gates 184 and through one side of a dual optical coupling circuit 188.

The analog multiplexer 177 has eight inputs connected to the eight analog input lines 34a–34h seen in FIGS. 2 and 5b. An output 189 on the multiplexer 177 is coupled through a buffering operational amplifier 190 to one input of a differential operational amplifier 191. A reference voltage (REF) is coupled from an output on the A/D converter 182 through a series resistor 192 and another buffering operational amplifier 193 to the other input on the differential operational amplifier 191. The level of reference voltage signal can be adjusted through a variable resistance circuit 394 connected between the noninverting input on the second buffering operational amplifier 193 and ground. The output of the differential operational amplifier 191 is coupled through a low-pass filtering operational amplifier 194 to a group of range switches 195 and to a roll-over detector circuit 196. The range select switches 195 couple analog input signals to one of four inputs on the A/D converter 182 according to the level of analog input signals. By adjusting the input signal range according to the level of input signals generated by the analog control devices 35 of FIG. 2, better accuracy in the A/D signal conversion can be obtained.

The roll-over detector 196 detects the condition where the digital count turns over from its highest value, e.g., 255, to zero. The circuit includes an operational amplifier 197 which detects a positive analog signal. Of course, a positive analog signal is not present when a zero digital signal is sensed, unless roll-over has occurred. The output of the roll-over detector 196 is connected through the other side of the dual optical coupling circuit 188 and an inverter 198 (in FIG. 5a) to line P25 in the second I/O port P2. When the output of the roll-over detector is less than 1.5 volts d-c, a positive input signal is present. The output signal becomes a logic low signal which is inverted to a logic high true signal on line P25 to indicate that roll-over has occurred. The reaction of the high density processor 163 to this signal will be explained below.

OPERATION

Figures 9, 16:
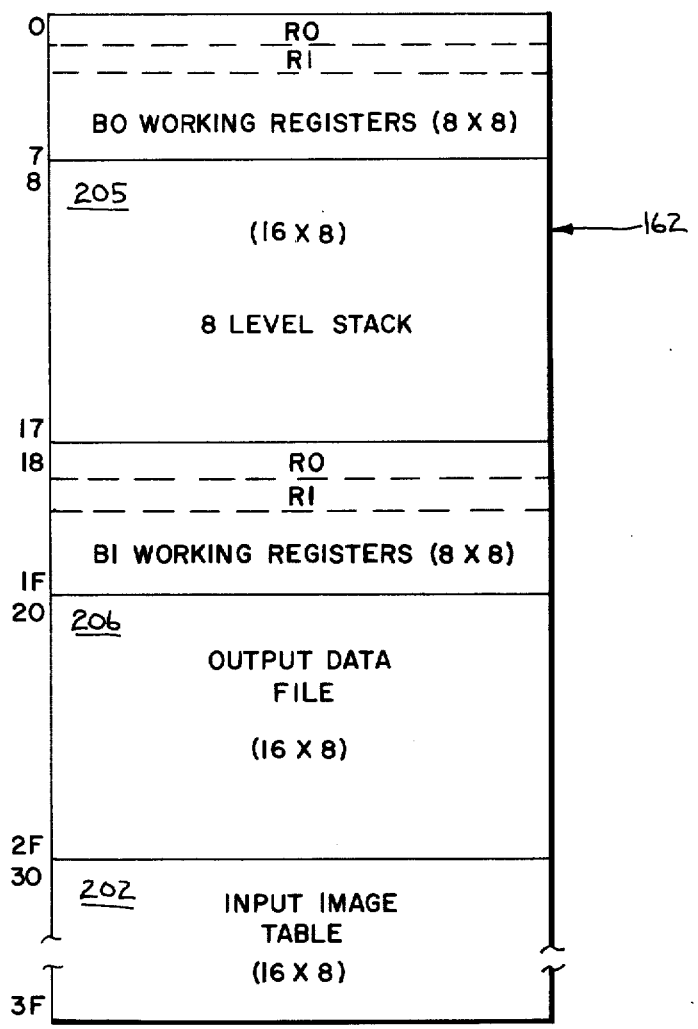

The operation of the high density I/O module 17 is directed by machine instructions that are stored in the EPROM 161 on-board the microcomputer 132 in FIG. 5a. As seen in FIG. 8, the EPROM 161 stores a block transfer routine 199 and a single-word transfer routine 200 for communicating with the main processor module 16. The EPROM 161 also stores an analog-to-digital conversion routine 201 for updating I/O status data. This I/O status data is stored in a data image table 202 in lines 30-3F (hexadecimal) of the on-board RAM 162, as seen in FIG. 9. This data is stored in binary coded decimal (BCD) format. After analog data is converted to binary data, a further conversion to BCD is accomplished through a binary-to-BCD subroutine 203 stored in page two of the EPROM 161, as seen in FIG. 8. A module status word (MSW) look-up table 204 is stored in page three of this memory 161 for reasons which shall become apparent below.

The microcomputer 132 executes the analog-to-digital conversion routine 201 repeatedly until interrupted for communication with the main processor module 16. In executing the various routines 199-201 mentioned herein, the microcomputer 132 uses a group of registers in its on-board RAM 162 as seen in FIG. 9. The first eight registers B0R0–B0R7 form a first register bank B0. The next sixteen registers form an eight-level stack 205 and are followed in address sequence by a second register bank B1 with eight registers B1R0-B1R7. Registers B0R0, B0R1, B1R0 and B1R1 are pointer registers, which can be used to indirectly address four separate areas within the address range of the microcomputer 132. Registers in lines 30-3F (hexadecimal) form the data image table 202, mentioned previously. Registers in lines 20-2F (hexadecimal) form an output data file 206 for data that is coupled between the modules 16 and 17 during a block transfer. Register banks B0 and B1 are mapped in more detail in FIG. 10 to show their functions in the routines 199-201 to be described.

Figure 13A:
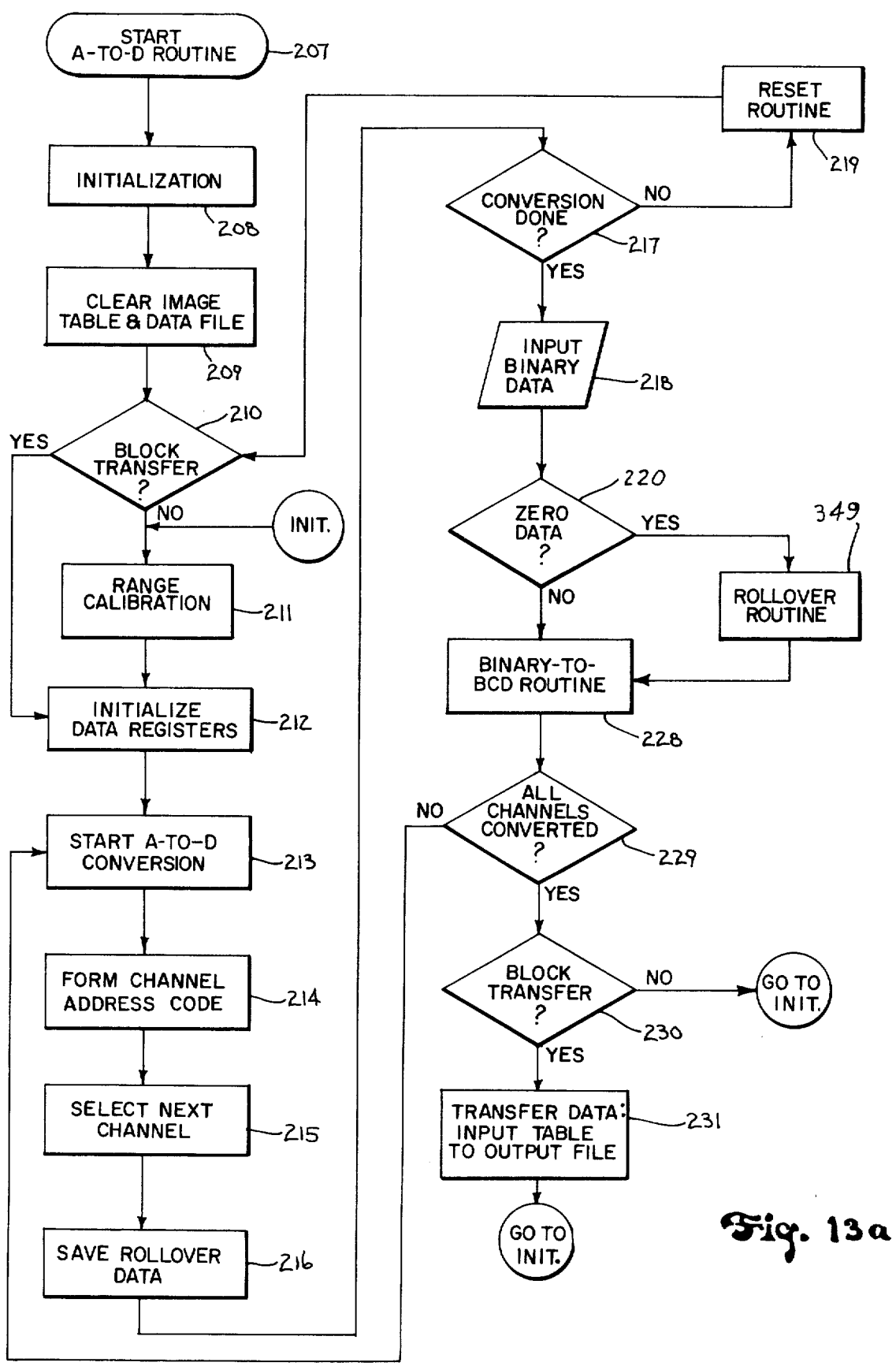
FIG. 13a is a flow chart of an analog-to-digital conversion routine for updating the high density module of FIGS. 5a and 5b.
Figure 13B:
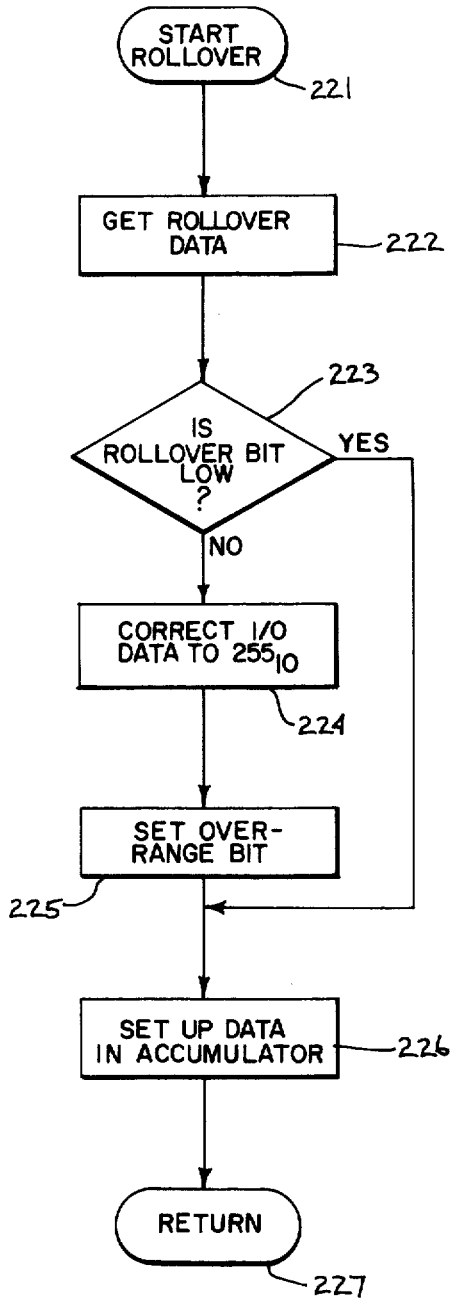

The machine instructions in the analog-to-digital conversion routine 201 are given in Appendix D and a flow chart of the routine is seen in FIGS. 13a and 13b. Referring to Appendix D and FIGS. 5a and 8, the high density processor 163 executes several instructions to jump over the block transfer routine 199 and begin execution of the analog-to-digital conversion routine 201. The start of this routine 201 is represented by start block 207 in FIG. 13a. If an interrupt signal is received at the INT input of the high density processor 163 during this analog-to-digital conversion routine 201, the program counter in the high density processor 163 will be reset to 003 (hexadecimal) to begin execution of the block transfer routine 199. After executing several initialization instructions, represented by process block 208, the high density processor 163 executes further instructions represented by process block 209 to clear the image table 202 and the data file 206 of the RAM 162. The processor 163 then determines whether the high density module 17 is in the block transfer mode or the single transfer mode as shown in decision block 210. The mode is determined by the setting of the switch 154 in FIG. 5a, and if a single transfer mode is detected, the processor 163 delays to allow calibration of the analog-to-digital converter 182 for operation in the lower voltage ranges, as shown by processor block 211. For either mode of transfer, the processor 163 then proceeds, as shown in process block 212, to initialize registers for receiving data from the analog I/O devices 35. The remainder of the analog-to-digital routine 201 is the same regardless of the anticipated mode of communication between the high density module 17 on the main processor module 16.

Analog-to-digital conversion is begun by signalling the A/D converter 182 through its start conversion input 181 seen in FIG. 5b and represented by process block 213 in FIG. 13a. A sixteen-bit word of data is stored in two lines of the image table 202 for each analog device 35 coupled to the high density module 17. Each low byte contains the lower two digits of a BCD value as seen in FIG. 16, and each high byte contains an overflow/underflow bit, a three-bit channel address code and the upper BCD digit. Therefore, as data is received from each analog device corresponding to an analog channel, a channel address code must be formed and stored with the data. This is represented in process block 214 in FIG. 13a. Before the processor 163 checks for the end of conversion in decision block 217, the next analog input (channel) 34a-34h must be addressed, and the port P2 data must be saved for the rollover check, as seen in process blocks 215 and 216. If the end of conversion signal is received through line P26 in FIGS. 5a and 5b, the digitized data from an analog device is input into the accumulator, as represented by I/O block 218. If the conversion is not complete, then conversion has failed, and the routine exits through a reset routine shown by process block 219, and returns to decision block 210 to begin the analog-to-digital conversion again. Assuming the conversion is done, the input data is checked to determine if it is zero data, as shown by decision block 220, and if so, a roll-over routine is executed as represented by process block 349.

The rollover routine is executed to insure that rollover has not occurred before the data from the I/O devices is stored in the data image table 202. As seen in FIG. 13b and Appendix D, the status of line P25 in FIGS. 5a and 5b is checked to determine if rollover has occurred. After the start of the rollover routine represented by start block 221 in FIG. 13b, the rollover data is fetched as represented by process block 222 and the rollover bit is tested as represented by decision block 223. If the rollover bit from line P25 is not low, rollover has occurred and the data in the accumulator is corrected to its highest number as represented in process block 224. An overrange bit is then set up in the high byte of the channel data as represented in process block 225. The input data is returned to the accumulator as shown by process block 226 for storage in the data image table 202. The processor then returns to the main portion of the analog-to-digital routine in FIG. 13a as represented in return block 227.

After any correction for zero data in FIG. 13a, a binary-to-BCD conversion routine is called up as represented in process block 228. This routine is given in Appendix D and converts eight bits of binary data to ten bits of BCD data. A check is made as shown by decision block 229 to determine whether all eight channels have been converted from analog data to BCD data. If not, the routine returns to process block 213 to start the analog-to-digital conversion for the next channel. If all channels have been converted, another check is made, as seen in decision block 230, to determine the mode of communication between the high density module 17 and the main processor module 16. If the high density module 17 is operating in a single-word transfer mode, it returns to begin the analog-to-digital conversion routine 201 at process block 211. If the high density module 17 is in the block transfer mode, the data in the image table 202 in FIG. 9 is transferred to the data file 206. After this is accomplished the routine loops back to process block 211 to continually update the status of the analog devices 35 coupled to the analog input high density module 17.

SINGLE-WORD TRANSFER MODE

The single-word transfer mode of communication is directed on the main processor module 16 by a user applications program stored as part of the control program 42 in FIG. 6. At the other end, the high density I/O module 17 is directed by the single-word transfer (SINXFR) I/O routine 200 stored in the on-board EPROM 161. The user applications program is presented in Appendix A in the ladder diagram format well understood by those skilled in the art. The interpreter routines for the macro-instructions used in this applications program are given in Appendix B.

Referring to Appendix A, the applications program transfers each of three sixteen-bit words of data from the high density I/O module 17 to the RAM 24 on the main processor module 16. The three data words report the status of analog I/O devices 35 coupled to analog channels 1, 2 and 3 by lines 34a-34c. The input data from the high density I/O module 17 is to be stored at user addresses 040, 041 and 042, respectively, in the timers and counters storage area of the RAM 24. Locations 035 and 036 in the timers and counters storage area are used to temporarily store data as it is input to the main processor module 16, and user address locations 03100 and 03101 are used for a high byte control bit and an update control bit, respectively. A channel pointer is stored in a location in the output image table corresponding to the position of the high density I/O module 17 in the I/O interface section 29. The high density module is located at the user address 0100. As seen in Table X below, bit 7 of the output image byte at this address controls the upper/lower byte selection of the data input to the main processor module 16. Bits 0-6 control the selection of channels from 2-8 with channel 1 being selected when bits 0-6 are all zero.

TABLE X

| Output Byte Format | |
| --- | --- |
| Bit (Condition) | Selects |
| 7 (ON/OFF) | Upper/lower byte. |
| 6 (ON) | Channel 8. |
| 5 (ON) | Channel 7. |
| 4 (ON) | Channel 6. |
| 3 (ON) | Channel 5. |
| 2 (ON) | Channel 4. |
| 1 (ON) | Channel 3. |
| 0 (ON) | Channel 2. |

Note:
all bits OFF selects Channel 1; multiple channel select bits (0-6) ON is invalid channel code.

Referring again to Appendix A, rungs 1, 2 and 3 of the applications program start a scan counter upon the occurrence of an event represented by the energization of a bit at user address 02000. The scan counter provides delay periods during the user applications program to insure that valid data is transferred between the main processor module 16 and the high density I/O module 17. Rungs 4, 5 and 6 latch the update select bit, the channel select bit, and the high byte select bit in the word of the output image table corresponding to the location of the high density module. Rungs 7 and 8 unlatch the channel 3 control bit and the high byte control bit. These conditions plus the delay of nine scan counts are required for the program to proceed beyond rung 9. This assures a sufficient delay from the last data transfer in the last cycle of the applications program before beginning a data transfer in a new cycle of the applications program.

The first data transfer step in each cycle of the applications program is performed by rung 15 after the update select, channel select and high byte select bits are deenergized in rungs 10, 11 and 12, and after the update control bit is deenergized and the channel control bit is energized in rungs 13 and 14. The first byte of data received is the low byte of a sixteen-bit data word such as shown in FIG. 16. In rung 18 the high byte of this data word is received in the lower byte of user address location 036. In rungs 19-26 this byte of data is transferred to the high byte in user address location 035 to form a sixteen-bit word of I/O status data such as shown in FIG. 16. In rung 27 a check is made of the channel address code, and if valid, the word of status data is stored in user address location 040. This single-word transfer sequence is repeated in rungs 29-45 to store channel 2 input data in user address location 041. The sequence is repeated for channel 3 data in rungs 47-65. In this way a user's applications program can transfer eight words of input data representing the status of the eight analog input devices 35.

Figure 14:
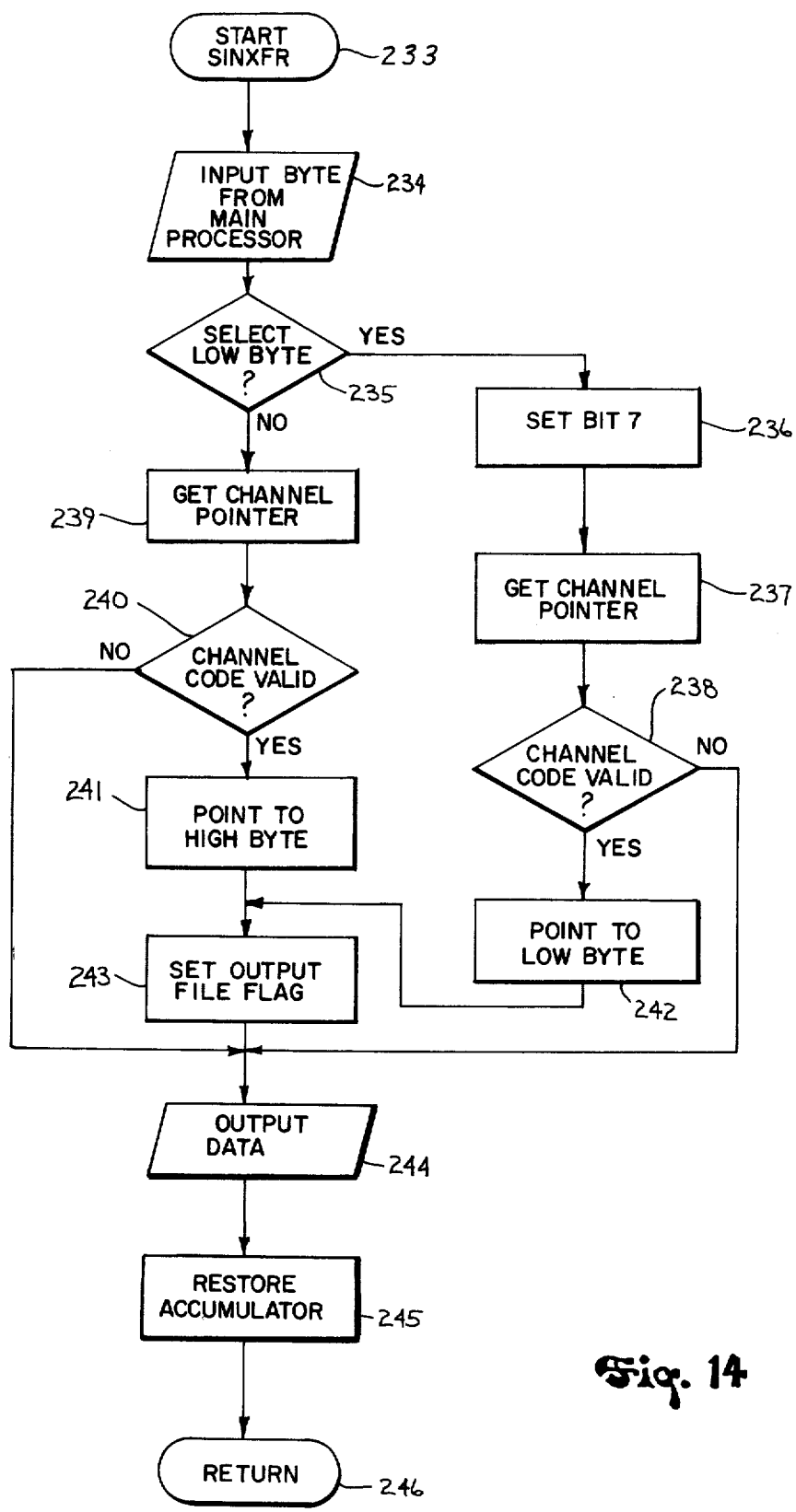
FIG. 14 is a flow chart of a single word transfer routine for directing the high density module of FIGS. 5a and 5b.

While the main microprocessor 20 is executing the user applications program, the high density processor 163 executes a single transfer (SINXFR) routine given in Appendix E and represented in FIG. 14. The main microprocessor communicates with the high density module 17 by transferring an output byte of data from the output image table 41a in the RAM 24 (FIG. 6) during each scan of the input/output routine (FIG. 7). The user applications program is executed over a number of scans of the control program 44, so that several output bytes are received by the high density I/O module 17 from its output image table location. The high density processor 163 tests bit 7 in the output byte to determine whether the high byte or the low byte of an I/O status word is to be sent back to the main processor module 16. The high density processor 163 also examines the channel control bits in each output byte to determine which channel has been selected by the main processor module 16. When more than one channel select bit is set, the channel selection is invalid. This condition is read by the high density processor 163, together with valid channel select bits in other output bytes, to control the timing of the communication sequence between the two modules 16 and 17.

Each time an output byte is written to the high density I/O module 17 an interrupt occurs and the high density processor 163 jumps to the first instruction in the block transfer routine in Appendix D. As represented by start block 350 and process block 318 in FIG. 15a, the high density processor 163 saves the accumulator data. It then checks a communication mode flag as represented by decision block 319 and jumps to the single transfer routine, also given in Appendix D.

After the start of this routine, represented by start block 233 of FIG. 14, a byte of data from the main microprocessor 20 is received as shown by I/O block 234. This data is tested as shown by decision block 235 to determine whether the low byte or the high byte of a word of status data is requested. If a low byte is requested, bit 7 is set in the process block 236 and the channel pointer is obtained from a channel address lookup table as represented in process block 237. The validity of the channel pointer is then checked as shown in decision block 238. Similarly, if a low byte is selected in decision block 235, the channel pointer is obtained and tested as shown by process blocks 239 and 240. In either case, when the channel pointer is valid, the routine proceeds as seen in blocks 241 and 242, to point to the next byte. A flag is set as represented by process block 243 to prevent the updating of the output data file 206 while the byte of data is being sent back to the main processor module 16. A byte is then output as represented in I/O block 244, and the accumulator is restored as shown by process block 245. A cycle of the single-word transfer routine 200 is then completed and the high density processor 163 returns to the main analog-to-digital conversion routine 201 until the next interrupt, as represented by return block 246.

During each single-word transfer, the output file flag remains set. Data will still be received in the image table 202, but it will not be transferred to the output data file 206. The output file flag will be cleared when an output byte from the main microprocessor includes more than one channel select bit. Then high density processor 163 will skip the process block 243 and the output file 206 will be updated during the next cycle of the main analog-to-digital conversion routine 201.

While the single-word transfer mode of communication between the main processor module 16 and the high density module 17 utilizes the physical capacity of the high density I/O module 17, communication is faster and more efficient with a block transfer of eight words of I/O status data. The main microprocessor 20 is directed by instructions to perform a main I/O scan routine and a block transfer routine, which are two of the firmware routines 44 stored in the PROM 23 in FIG. 7. The instructions for the I/O scan routine are given in Appendix C. The I/O scan routine is regularly executed between scans of the control program 42, while the block transfer routine will be executed only when a high density module 17 is present in the I/O interface section 29.

BLOCK TRANSFER MODE

Figure 11:
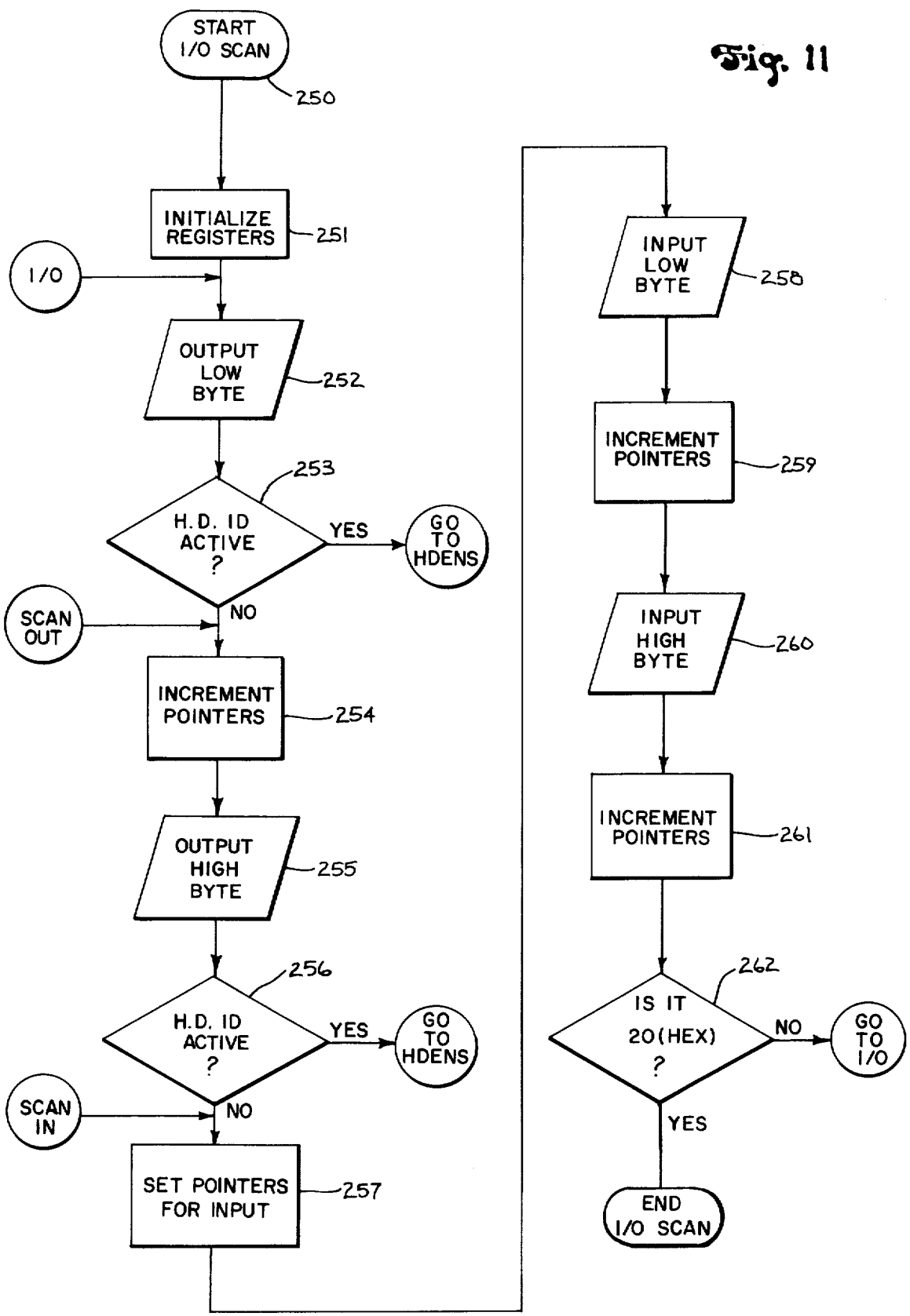
FIG. 11 is a flow chart of the I/O scan routine for the main processor module of FIG. 2.

The main microprocessor 20 "sees" four I/O slots "0–3" with sixteen I/O circuits each in its I/O interface section 29 rather than eight I/O with eight I/O circits each. Each of the four slots is addressed to couple two bytes of data between the processor module 16 and two I/O modules 18. As seen in Appendix C and in FIG. 11, the main microprocessor executes two output or write operations to two I/O modules 18 (FIG. 11, blocks 250–256), and then executes two input or read operations from two I/O modules 18 (FIG. 11, blocks 257–262). One module is coupled by a low byte address while the other module is coupled by a high byte address. After each loop, the address in the E register is tested to see if all of the slots have been scanned (FIG. 11, block 262). In two loops through the I/O scan routine, the main microprocessor 20 scans all eight I/O modules 17 and 18 in the I/O interface section 29.

A high density I/O module 17 is detected when either a low byte or high byte of output data is coupled from the I/O image table 41 to an address slot in the I/O interface section 29 in FIG. 2. If standard I/O modules 18 are present, data is coupled to them; however, if a high density I/O module 17 is present, the accompanying signal on the write line 39 will generate a return signal on the high density ID line 40. The high density ID line 40 is checked by the main microprocessor 20 (FIG. 11, decision blocks 253 and 256) after each byte is written to a respective I/O module 17 and 18 to detect any high density module 17 that may be present. If a standard input module 18 is present, the write operation will be an ineffective or "dummy" operation preceding the input of two bytes of data from two standard input I/O modules 18. If a high density I/O module 17 is detected after one of the write operations, the main microprocessor 20 jumps to the block transfer routine 199 chartered in FIGS. 12a –12c.

When a high density I/O module 18 is placed in an I/O interface section 29, the user stores a first module status word (MSW) in the output image table 41a at the address of the module 17. The module status word contains a read flag or write flag depending on whether the high density module 17 is an input module or an output module. If the high density module is both an input module and an output module, flag bits 6 and 7 of the module status word are both set to signal a bidirectional transfer of data. The other six bits of the module status word define the size of the block transfer, which can be from one to sixty-four bytes.

A high density table is formed in areas 265a and 265b of the RAM 24, as seen in FIG. 6, which are normally used for preset and accumulated values of timers and counters. For an input high density module 17, the image table address of the module is stored in the area for accumulated values 256a. For example, for the first rack slot the number 111 (octal) could be stored at user address 030 (octal). The address of the first location in a bulk storage area in the RAM 24 is loaded into the corresponding preset value for the same timer. For example, if the second scratch pad area 46b in the RAM 24 is used as a bulk storage area, the user address 120 (octal) is stored at location 130 (octal) in the second timers and counters area 256b. This starting address could also be a location in the area normally reserved for the user control program 42, however, a check must be made to insure that the user control program 42 is not written over in executing the block transfer.

Figure 12A:
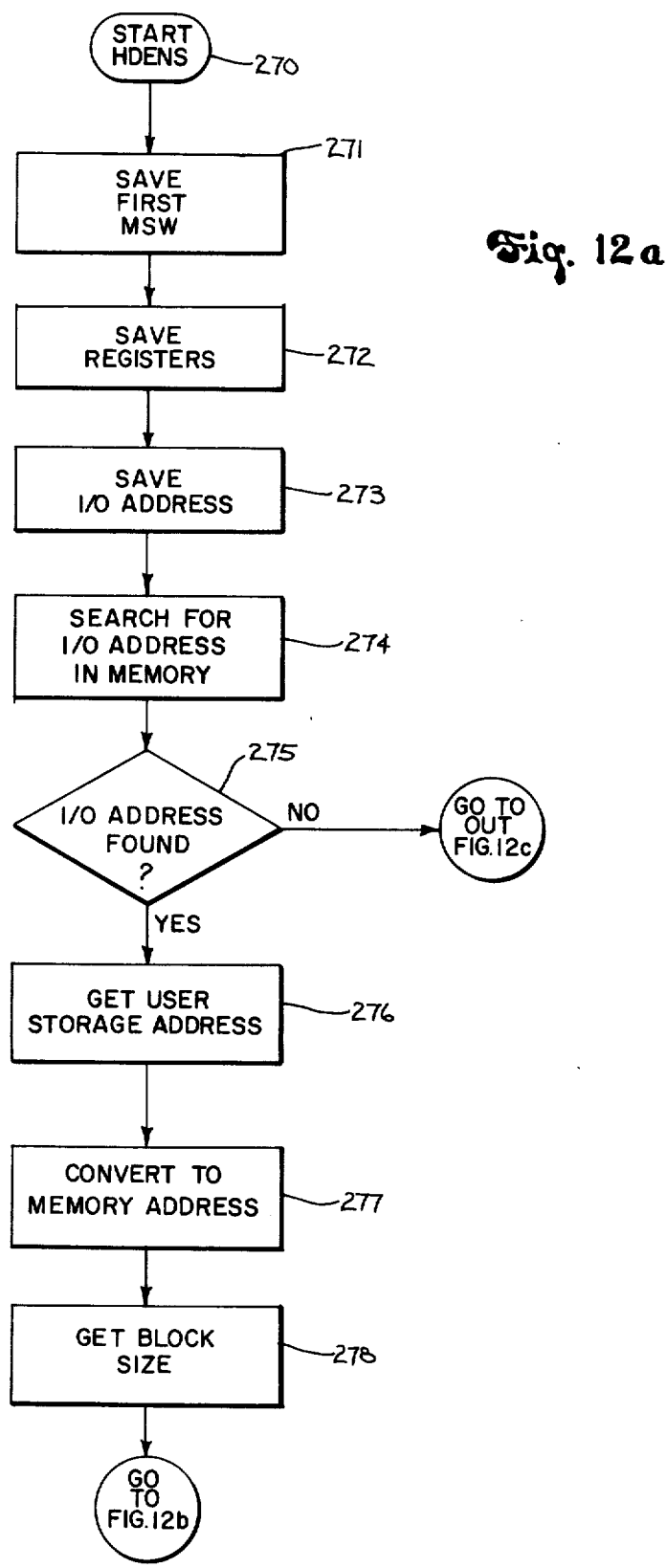

Referring now to FIG. 12a, when the main microprocessor 20 determines that the high density ID line 40 is low, it jumps to the high density (HDENS) routine as represented by start block 270. The module status word is saved as represented in process block 271 as well as the contents of the other registers as shown in process block 272. The output image table address is also saved as shown by process block 273 and the microprocessor 20 begins a search of the timers and counters area 265a and 265b to find the location where this output image table address is stored. This search is represented by process block 274. The result of this search is represented in decision block 275, and if the I/O address is not found, the microprocessor 20 jumps to an END portion of the routine shown in FIG. 12c. If the output image table address is found, however, the microprocessor 20 can form the address of the starting location in the bulk storage area as shown by process block 276. This address is stored in octal format by the user, and must be converted to a memory address recognized by the microprocessor 20, as represented by process block 277. The module status word is examined to get the size of the block transfer as shown by process block 278.

Figure 12B:
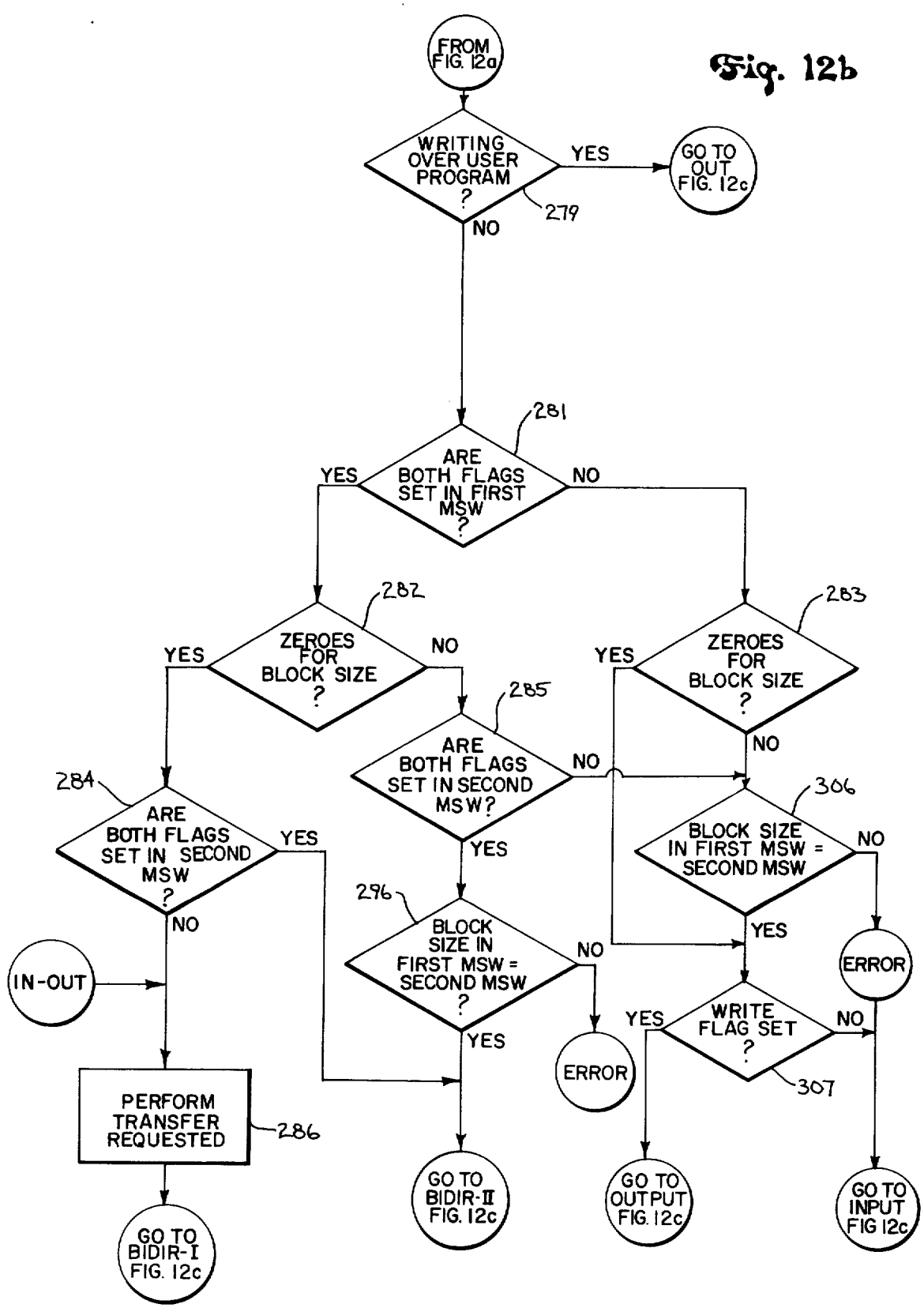

Referring now to FIG. 12b, a check is then made for writing over the user program as shown in decision block 279. Rather than write over the user program the microprocessor 20 will jump to the OUT portion of the HDENS routine in FIG. 12c. The main microprocessor 20 then checks the read and write flags in the module status word originating in the output image table 41a, as shown by decision block 281, to determine whether a bidirectional data transfer is requested by the processor module 16. The block size number in the processor module status word is then examined, as represented by decision blocks 282 and 283.

The high density routine enables the main microprocessor 20 to perform four different types of block transfers, and one of these is applicable to the analog input module 17. These include two types of bidirectional transfers, one where different numbers of words are transferred in appropriate directions, and the other where the same number of words is transferred in both directions. The other two types of block transfers are a block input transfer to the processor module 16, and a block output transfer to the high density module 17. The analog input module 17, of course, operates during the block input portion of the high density routine to couple words to the processor module 16. From the description herein it will be apparent to those skilled in the art how a bidirectional block transfer is accomplished with a high density module 17 having different circuitry than analog input circuitry for interfacing the peripheral scanning high density processor 163 to I/O devices.

As shown by decision blocks 284 and 285, a bidirectional transfer is confirmed by checking the flags in the module status word received from the high density module 17. The module status word from the high density module 17 is stored in the input image table 41b at an address corresponding to the address of the processor status word in the output image table 41a. The block size portion of the module status word is then checked, as represented by decision blocks 282 and 283. Zeroes are stored for the block size in the module status word when a bidirectional transfer of two differently sized blocks is to be performed. This is called a "special case." When zeroes are the block size in a module status word with one flag set for one-way transfer, the block size is interpreted to be the maximum, which in this example is eight words. So, when zeroes are detected in decision block 282 the routine branches to the "special case" sequence. When zeroes are not detected in decision block 282, the block size in the module status words on both the processor module 16 and the high density module 17 must agree, as shown by decision block 296. When zeroes are the block size number found in decision block 283, the main microprocessor 20 will be anticipating either an input or an output of the maximum number of words on the high density module 17. When a specific block size number other than zero is detected in block 283, the block size numbers in the module status words on both module 16 and 17 must agree, as represented by the decision block 306, or an error will result.

The "special case" of bidirectional transfer shall be the first to be followed to its conclusion. Only one flag is set in the module status word received from the high density module 17, in the special case, as represented by decision block 284. That is because the high density module 17 stores two module status words in the MSW lookup table 204 (FIG. 8), one corresponding to each of the transfers in opposite directions. If both flags are set, the main microprocessor 20 branches over to the "same size" bidirectional transfer sequence. In the special case transfer, the first transfer is performed, as represented by process block 286. As the words are transferred, a checksum is updated with each word, as represented in decision block 287 in FIG. 12c, and the checksum is sent from the main microprocessor 20 to the high density processor 163, where it is checked against a checksum calculated from the received data. The high density processor 163 also sends its calculated checksum back to the main microprocessor 20. If the checksums do not agree, the flags in the module status word received earlier from the high density processor 163 are cleared, to provide a record of the error that can be checked through a user program. The main microprocessor 20 then checks to see if a second transfer is to be performed, as shown by decision block 289. If not, the microprocessor 20 jumps to an OUT portion of the routine where its working registers are restored as represented by process block 294 and where the microprocessor 20 returns to the main I/O scan routine, as shown by decision block 295. Assuming a second transfer is called for, the main microprocessor 20 transmits the module status word from the output image table 41a for a second time, as shown by process block 290. This generates an interrupt that is detected through the high density I.D. line 40, as represented by decision block 291. A second module status word is received from the high density module 17 as shown by process block 292, and a check is made for flags, as represented by decision block 293. The sequence loops back to the IN-OUT portion beginning in FIG. 12b to perform the requested transfer. When the second transfer is done, the sequence transfers from decision block 289 to restore registers, as shown by process block 294 and explained above.

For a bidirectional transfer of two blocks of equal size, the high density routine continues from decision block 296 in FIG. 12b to process block 297 in FIG. 12c. For the output transfer the number of words are sent, and the checksums checked as shown by process blocks 297-299 and decision block 300. The write flag is cleared, as shown by process block 301, if the checksum is not correct, and the input transfer is performed as shown by blocks 302-305.

Referring again to block 283 in FIG. 12b if the transfer is not bidirectional then zeroes in the block size portion of the module word will mean that a certain number of words, e.g. eight, are to be input or output from the processor module 16. If a block size number is specified in the processor MSW it must agree with the block size number in the MSW from the high density module 17, or else an error results as shown by decision block 306. Assuming either zeroes in the block size number or agreement between block size numbers, the write flag is examined as represented by decision block 307. If the write flag is set, an OUTPUT sequence follows, otherwise an INPUT sequence follows. In the OUTPUT sequence the number of words in the module status word received from the high density module 17 is output to that module 17, as shown in process block 308 in FIG. 12c. A checksum sequence as described for the bidirectional transfers is then executed as represented by blocks 309-312.

For the analog input module 17, the main microprocessor 20 executes the last block transfer sequence, the INPUT sequence, represented by blocks 313-317 in FIG. 12c. The read flag will be set in the module status word on the analog input module 17 and detected as shown by decision block 313. The block size number will also be obtained from the module status word received from the analog input module 17 and that number of words will be transferred to the processor module 17 with the aid of the hardware described earlier herein. In this embodiment, eight words are transferred and therefore the block size number can be either zeroes or eight as seen from an examination of the MSW lookup table in Appendix D. The checksum is examined as before in blocks 315-317. As seen in blocks 294 and 295 the main microprocessor 20 then restores the data in its working registers which was saved when it jumped from the main I/O scan routine and returns to either the SCAN IN or SCAN OUT portion of that routine, to couple data with the next I/O module 18. If the last byte was low, the microprocessor 20 returns to a SCAN OUT portion of the I/O scan routine to look for another output. If the last byte scanned was a high byte, the microprocessor 20 returns to a SCAN IN portion of the I/O scan routine to scan the low byte for an input.

Figure 15C:
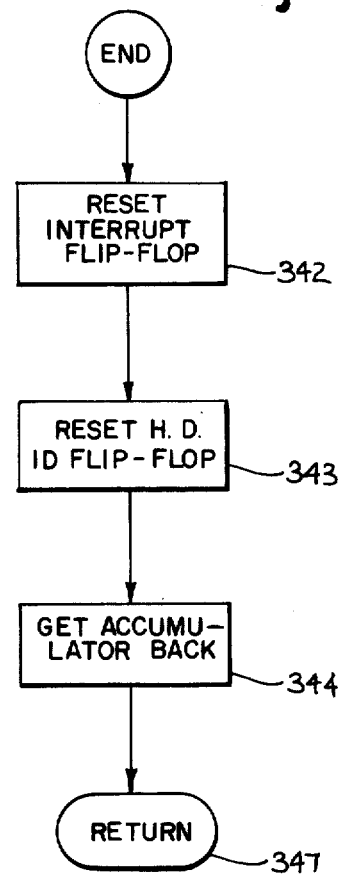
Figure 15D:
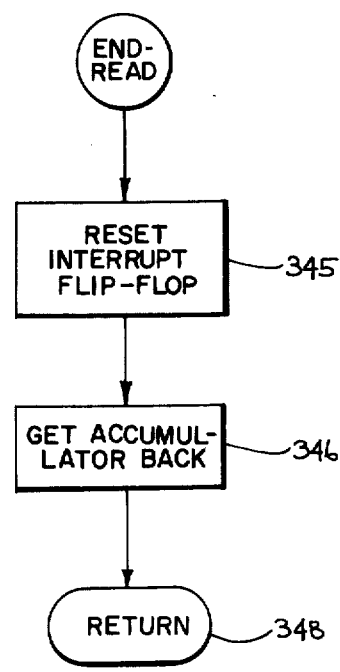
Figure 15B:
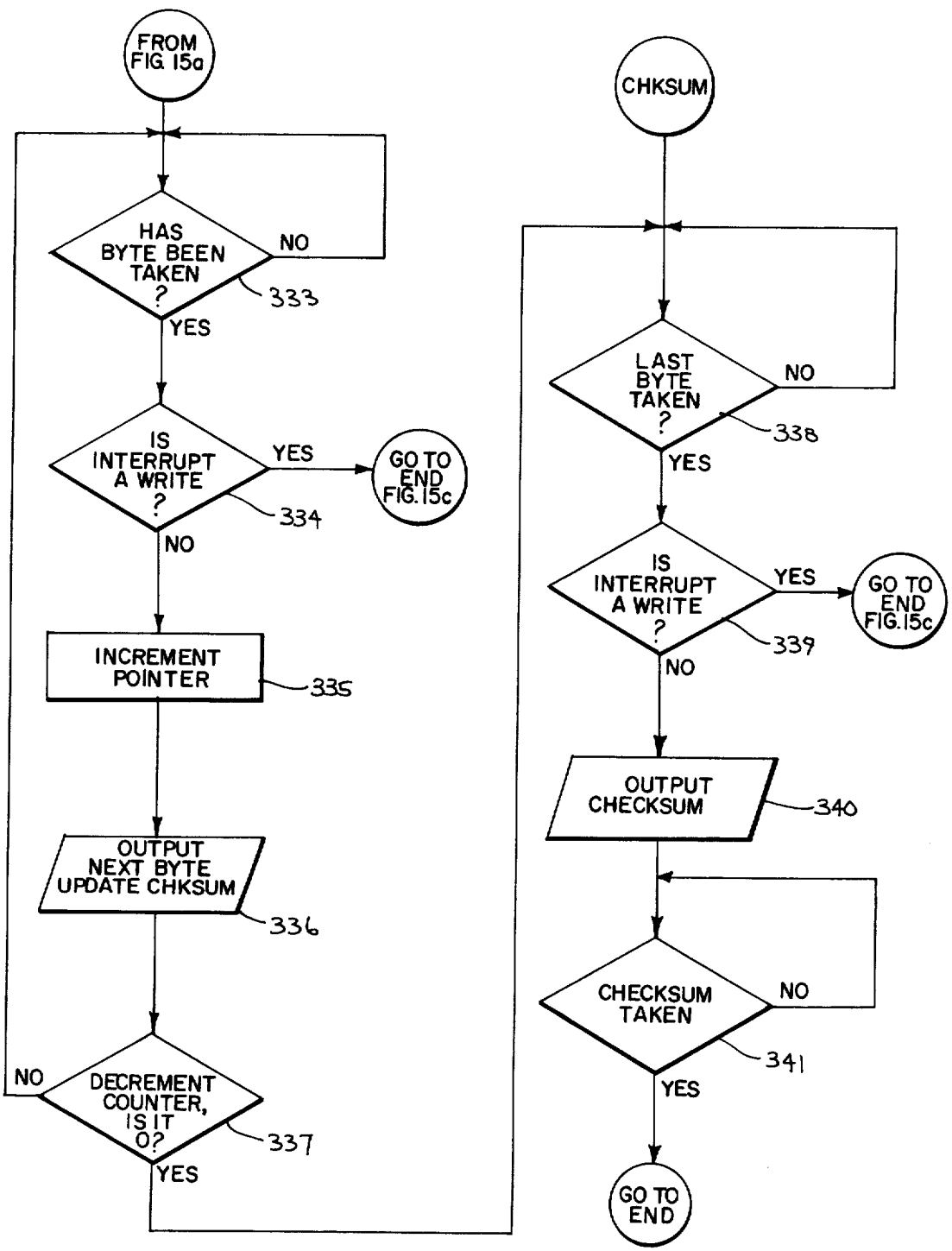

Meanwhile, on the high density I/O module 17, the high density processor 163 executes the interrupt routine charted in FIGS. 15a and 15b in response to the interrupt signal associated with receipt of the module status word. When the interrupt is received, the contents of the accumulator are saved in block 318 and operation in the block transfer mode is confirmed in decision block 319. Next, a check must be made to assure that the interrupt was caused by a write operation from the main processor module 16, and this is represented in decision block 320. In this particular type of high density module 17, an interrupt caused by a read from the main processor module 16 will be disregarded, and the high density processor 163 will execute an ENDREAD routine charted in FIG. 15d. If the interrupt was caused by a write signal from the main processor module 16, a first module status word is input as shown by I/O block 321. This module status word is read from the input latch 134 seen in FIG. 5a and is used in forming an address in page three of the on-board EPROM 161 where the MSW look-up table 204 is stored. A second module status word is obtained from this table and is loaded into the accumulator as represented by process block 322. If the number obtained is zero, the check represented by decision block 323 will direct the high density processor 163 to jump to the END routine charted in FIG. 15c. A valid module status word signals that one to eight words of data are to be transferred. Such a valid module status word is then output to the main processor module 16 as shown by I/O block 324. The high density processor 163 then masks the read flag, as represented in process block 325, and loads the number of bytes (words X2) to be transferred into register B1R3 as shown by process block 326.

Preparation for the transfer continues as represented in process block 327. The pointer register B1R1 is initialized to point at the register in line "20" of the output data file 206. A check is then made, as shown by decision block 328, to determine when the module status word has been taken by the processor module 16, thereby resetting the interrupt flip-flop 133 in FIG. 5a. When the second module status word has been taken, another check must be made as shown by decision block 329 to insure that the interrupt was not a write. Otherwise, the high density processor 63 jumps to the END routine in FIG. 15c.

The first byte to be transferred is then loaded into the accumulator as shown by process block 330 and is output as shown by I/O block 331. The counter is decremented as shown by decision block 332 and is tested to see if further bytes are to be transferred. If not, the processor 163 jumps to a checksum portion of the routine to be explained below. If the counter is not zero, the T0 input is examined as shown by decision block 333 in FIG. 15b to determine whether the byte has been taken by the processor module 16. After each interrupt, it must be determined that the interrupt was not a write, and this check is represented in decision block 334. The pointer to the output file is then incremented as shown by process block 335 and the next byte, which is a high byte of a word of status data, is output to the main processor module 16 as represented by I/O block 336. The counter is again decremented and checked as shown in decision block 337, the high density processor 163 looping until the proper number of bytes have been transferred.

After the transfer of status data, the high density processor 163 proceeds to the CHKSUM portion of the routine and loops through decision block 338 until the last byte of status data has been taken. After the type of interrupt is checked as shown by decision block 339, the checksum is output as represented by I/O block 340. The processor 163 loops through decision block 341 until the check sum is taken, and then proceeds to the END routine in FIG. 15c.

Referring to FIGS. 5a and 15c, the interrupt flip-flop 133 is cleared to begin the END routine and zeroes are output on the data microbus 164 as represented by process block 342. The high density ID flip-flop 131 is then reset as shown by process block 343, and the accumulator is stored as shown by process block 344. This should be compared with the ENDREAD routine in FIG. 15d where only the interrupt flip-flop 133 is reset before the accumulator is restored, as shown by process blocks 345 and 346. After one of these ending routines, the block transfer routine 199 for the high density module is complete, and the high density processor 163 returns as represented in blocks 347 and 348 to the main analog-to-digital conversion routine 201 until another interrupt occurs.

APPENDIX A

USER APPLICATIONS PROGRAM

Initial Conditions

1. H. D. Module at location 0100 (user program designation-octal).

2. Data from channels 1, 2 and 3 to be stored at octal addresses 040, 041 and 042, respectively.

3. Channel control bits stored at 032.

4. Temporary storage at 035 and 036.

5. High byte control bit at 031 00.

6. Update control bit at 031 01.

7. Program start bit is at 020 00.

Legend

```
| | = XIC                              ----------+
|/| = XIO                                        :  = BND
(L) = OTL                                        :
(U) = OTU                              ----------+
( ) = OTE                              (CTR) = CTR
+----------                            (CTU) = CTU
         :                             [G]   = GET
         :  = BST                      (PUT) = PUT
         :
+----------
```

Rung
No.

```
         :02000                                              030    :
  1     +-|/[-------------------------------------------------(CTR)-+
         :                                                          :
         :                                                   PR 999 :
         :                                                   AC 576 :
         :
         :02000                                              030    :
  2     +-| [-------------------------------------------------(CTU)-+
         :                                                          :
         :                                                   PR 999 :
         :                                                   AC 576 :
         :
         :                                                   030    :
  3     +        +------------------------------------------(CTU)-+
         :        :                                                 :
         :                                                   PR 999 :
         :                                                   AC 576 :
         :
         :02000                                              01002  :
  4     +-|/[-------+---------------------------------------(L)--+
         :          :                                         OFF  :
         :03100 03202:                                              :
         +-| [---| [-+
         :
         :01002                                              01001  :
  5     +-| [---------------------------------------------------(L)--+
         :                                                     OFF   :
         :01002                                              01007  :
  6     +-| [---------------------------------------------------(L)--+
         :                                                     ON    :
         :01007 01002 01001                                   03202  :
  7     +-| [---| [---| [-----------------------------------(U)--+
         :
         :01007 01002 01001                                   03100  :
  8     +-| [---| [---| [-----------------------------------(U)--+
         :
         :01007 01002 01001 03000 03003                       03101  :
  9     +-| [---| [---| [---| [---| [-------------------------(L)--+
         :                                                     OFF   :
         :03101                                               01002  :
 10     +-| [---------------------------------------------------(U)--+
         :
         :03101 01002                                         01001  :
 11     +-| [---|/[----------------------------------------------(U)--+
         :
         :03101 01002 01001                                   01007  :
 12     +-| [---|/[---|/[---------------------------------------(U)--+
         :
```

```
                              31                                        32
         :01007 01001 01002                                      03101  :
   13    +-|/|---|/|---|/|------------------------------(U)--+
         :01000 01001 01002 01006 01007 03000 03003            03200    :
   14    +-|/|---|/|---|/|---|/|---|/|---|/|---| |------(L)--+
         :                                                             OFF
         :03200 01007   110                                      035    :
   15    +-| |---|/|---|G|---------------------------------(PUT)-+
         :               000                                     000    :
         :03200 03100                                            01007  :
   16    +-| |---|/|----------------------------------------(L)--+
         :                                                              ON
         :01007 03200 03000 03001 03002 03003                    03100  :
   17    +-| |---| |---| |---| |---| |---|/|--------------(L)--+
         :                                                             OFF
         :03100 03200   110                                      036    :
   18    +-| |---| |---|G|---------------------------------(PUT)-+
         :               000                                     080    :
         :03600                                                  03510  :
   19    +-| |--------------------------------------------( )--+
         :                                                              :
         :03601                                                  03511  :
   20    +-| |--------------------------------------------( )--+
         :                                                              :
         :03602                                                  03512  :
   21    +-| |--------------------------------------------( )--+
         :                                                              :
   22    +-| |--------------------------------------------( )--+
         :03604                                                  03514  :
   23    +-| |--------------------------------------------( )--+
         :                                                              :
         :03605                                                  03515  :
   24    +-| |--------------------------------------------( )--+
         :                                                              :
         :03606                                                  03516  :
   25    +-| |--------------------------------------------( )--+
         :                                                              :
         :03607                                                  03517  :
   26    +-| |--------------------------------------------( )--+
         :03200 03100 03514 03515 03516   035   043             04400  :
   27    +-| |---| |---|/|---|/|---|/|---|G|--|=|--------( )--+
         :                                     000   000              :
         :04400 03517 03200 03100   035                          040    :
   28    +-| |---| |-+-| |---| |---|G|---------------------(PUT)-+
         :           :                 000                       000   :
         :04400      :
         +-|/|-------+
         :03200 03100                                            01007  :
   29    +-| |---| |----------------------------------------(U)--+
         :                                                              :
         :03100 01007 03200                                      01000  :
   30    +-| |---|/|---| |------------------------------------(L)--+
         :                                                              ON
         :01000 03200                                            03100  :
   31    +-| |---| |----------------------------------------(U)--+
         :                                                              :
         :01000                                                  03200  :
   32    +-| |------------------------------------------------(U)--+
         :                                                              :
```

```
        :01000 03000 03001 03002 03003                 03201  :
33    +-| |---|/|---| |---| |---|/|------------------(L)--+
      :                                                 ON    
        :01000 03201 01007   110                        035   :
34    +-| |---| |---|/|---|G|-------------------------(PUT)-+
      :                    000                         000   :
        :03201 03100                                    01007 :
35    +-| |---|/|-------------------------------------(L)--+
      :                                                 ON    
        :01007 03201 03000 03001 03002 03003            03100 :
36    +-| |---| |---| |---|/|---| |---|/|--------------(L)--+
      :                                                 OFF   
        :03100 03201   110                              036   :
37    +-| |---| |---|G|------------------------------(PUT)-+
      :              000                               080   :
        :03600                                          03510 :
38    +-| |-------------------------------------------( )--+
      :                                                      
        :03601                                          03511 :
39    +-| |-------------------------------------------( )--+
      :                                                      
        :03602                                          03512 :
40    +-| |-------------------------------------------( )--+
      :                                                      
        :03603                                          03513 :
41    +-| |-------------------------------------------( )--+
      :                                                      
        :03604                                          03514 :
42    +-| |-------------------------------------------( )--+
      :                                                      
        :03605                                          03515 :
43    +-| |-------------------------------------------( )--+
      :                                                      
        :03606                                          03516 :
44    +-| |-------------------------------------------( )--+
      :                                                      
        :03607                                          03517 :
45    +-| |-------------------------------------------( )--+
      :                                                      
        :03201 03100 03516 03515 03514   035            041   :
46    +-| |---| |---|/|---|/|---| |---|G|-------------(PUT)-+
      :                                                000   :
        :03201 03100                                    01007 :
47    +-| |---| |-------------------------------------(U)--+
      :                                                      
        :03201 03100                                    01000 :
48    +-| |---| |-------------------------------------(U)--+
      :                                                      
        :03100 01007 03201                              01001 :
49    +-| |---|/|---| |-------------------------------(L)--+
      :                                                 OFF  
        :01001 03201                                    03100 :
50    +-| |---| |-------------------------------------(U)--+
      :                                                      
        :01001                                          03201 :
51    +-| |-------------------------------------------(U)--+
      :                                                      
        :01001 03000 03001 03002 03003                  03202 :
52    +-| |---|/|---|/|---| |---|/|--------------------(L)--+
      :                                                 OFF  
        :01001 03202 01007   110                        035   :
53    +-| |---| |---|/|---|G|-------------------------(PUT)-+
      :                    000                         000   :
```

```
        :03202 03100                                  01007  :
 54   +-| |---|/|------------------------------------(L)--+
                                                       ON   :
        :01007 03202 03000 03001 03002 03003         03100  :
 55   +-| |---| |---| |---| |---|/|---|/|------------(L)--+
                                                       OFF  :
        :03100 03202  110                             036   :
 56   +-| |---| |---[G]-------------------------------(PUT)-+
                     000                              080   :
        :03600                                       03510  :
 57   +-| |-------------------------------------------( )--+
        :
        :03601                                       03511  :
 58   +-| |-------------------------------------------( )--+
        :
        :03602                                       03512  :
 59   +-| |-------------------------------------------( )--+
        :
        :03603                                       03513  :
 60   +-| |-------------------------------------------( )--+
        :
        :03604                                       03514  :
 61   +-| |-------------------------------------------( )--+
        :
        :03605                                       03515  :
 62   +-| |-------------------------------------------( )--+
        :
        :03606                                       03516  :
 63   +-| |-------------------------------------------( )--+
        :
        :03607                                       03517  :
 64   +-| |-------------------------------------------( )--+
        :
        :03202 03100 03516 03515 03514   035          042   :
 65   +-| |---| |---]/|---| |---]/[---[G]-------------(PUT)-+
                                       000            000   :
                                                     02000  :
 66   +-------------------------------------------------( )--+
        :
        : 040  04017  041   04117   042   04217
 67   +-[G]---] [---[G]---] [---[G]---] [-- END 0362
        : 000         000         000
```

APPENDIX B

INTERPRETER JUMP TABLE AND
MACRO-INSTRUCTION INTERPRETER ROUTINES

| Location | Contents | Machine Instruction |
|----------|----------|---------------------|
| 0000 | C30001 | JP INIT |
| 0003 | C3380B | JP NOPY |
| 0006 | C3CE40 | JP TOF01 |
| 0009 | C3C940 | JP TOF10 |
| 000C | C36740 | JP TON01 |
| 000F | C36240 | JP TON10 |
| 0012 | C33B41 | JP RTO01 |
| 0015 | C33641 | JP RTO10 |
| 0018 | C37B41 | JP CTU |
| 001B | C3D641 | JP CTD |
| 001E | C3980A | JP GET |

| Location | Contents | Machine Instruction |
|---|---|---|
| 0021 | C3AD0A | JP PUT |
| 0024 | C3CA0A | JP EQL |
| 0027 | C3E90A | JP LES |
| 002A | C35741 | JP CTR |
| 002D | C35741 | JP CTR |
| 0030 | C3830B | JP SCAN |
| 0033 | C35B0B | JP ZCL |
| 0036 | FF | DEFB 0FFH |
| 0037 | FF | DEFB 0FFH |
| 0038 | C36602 | JP INTR |
| 003B | 00 | NOP |
| 003C | C3B30B | JP II |
| 003F | C30040 | JP IOT |
| 0042 | C33D0B | JP MCR |
| 0045 | C3270B | JP BND |
| 0048 | C30D0B | JP BST |
| 004B | C32A03 | JP XIC0 |
| 004E | C33603 | JP XIC1 |
| 0051 | C34203 | JP XIC2 |
| 0054 | C34E03 | JP XIC3 |
| 0057 | C35A03 | JP XIC4 |
| 005A | C36603 | JP XIC5 |
| 005D | C37203 | JP XIC6 |
| 0060 | C37E03 | JP XIC7 |
| 0063 | C38A03 | JP XIO0 |
| 0066 | C39603 | JP XIO1 |
| 0069 | C3A203 | JP XIO2 |
| 006C | C3AE03 | JP XIO3 |
| 006F | C3BA03 | JP XIO4 |
| 0072 | C3C603 | JP XIO5 |
| 0075 | C3D203 | JP XIO6 |
| 0078 | C3DE03 | JP XIO7 |
| 007B | C30008 | JP OTL0 |
| 007E | C31708 | JP OTL1 |
| 0081 | C32E08 | JP OTL2 |
| 0084 | C34508 | JP OTL3 |
| 0087 | C35C08 | JP OTL4 |
| 008A | C37308 | JP OTL5 |
| 008D | C38A08 | JP OTL6 |
| 0090 | C3A108 | JP OTL7 |
| 0093 | C3B808 | JP OTU0 |
| 0096 | C3CF08 | JP OTU1 |
| 0099 | C3E608 | JP OTU2 |
| 009C | C3FD08 | JP OTU3 |
| 009F | C31409 | JP OTU4 |
| 00A2 | C32B09 | JP OTU5 |
| 00A5 | C34209 | JP OTU6 |
| 00A8 | C35909 | JP OTU7 |
| 00AB | C37009 | JP OTE0 |
| 00AE | C39509 | JP OTE1 |
| 00B1 | C3BA09 | JP OTE2 |
| 00B4 | C3DF09 | JP OTE3 |
| 00B7 | C3040A | JP OTE4 |
| 00BA | C3290A | JP OTE5 |
| 00BD | C34E0A | JP OTE6 |
| 00C0 | C3730A | JP OTE7 |
| 00C3 | C3930B | JP BYTE |
| 00C6 | C39C0B | JP LIMIT |
| 00C9 | C3C240 | JP TOF001 |
| 00CC | C35B40 | JP TON001 |

| Location | Contents | Machine Instruction |
|----------|----------|---------------------|
| 00CF | C32F41 | JP RTO001 |
| 00D2 | C30B42 | JP ADDD |
| 00D5 | C33A42 | JP SBTR |
| 00D8 | C3DD42 | JP MULT |
| 00DB | C3E042 | JP DIV |
| 00DE | C3380B | JP NOPY |
| 00E1 | C3380B | JP NOPY |
| 00E4 | C3380B | JP NOPY |
| 00E7 | C3380B | JP NOPY |
| 00EA | C3380B | JP NOPY |
| 00ED | C3380B | JP NOPY |
| 00F0 | C3380B | JP NOPY |
| 00F3 | C3380B | JP NOPY |
| 00F6 | C3380B | JP NOPY |
| 00F9 | C3380B | JP NOPY |
| 00FC | C3380B | JP NOPY |
| 00FF | 76 | HALT |

Generalized XIC Macro-Instruction
Interpreter Routine for Bit N

| Machine Instruction | Comment |
|---------------------|---------|
| XIC N: LD A,(DE) | Load operand in A. |
| BIT N,A | Test the specified bit. |
| JR NZ, FETCH | Do nothing if closed. |
| RES 0,B | Reset rung status if open. |
| FETCH: POP HL | L = operand address; H = op code. |
| LD E,L | Low byte of operand address in E. |
| LD L,H | Form address of |
| LD H,C | jump statement in HL. |
| JP (HL) | Jump via jump table. |

| Location | Machine Instruction | Comment |
|----------|---------------------|---------|
| 032A | XIC 0 : LD A,(DE) | Location of first machine instruction in XIC 0 macro-instruction. |
| 0336 | XIC 1 : LD A,(DE) | |
| 0342 | XIC 2 : LD A,(DE) | |
| 034E | XIC 3 : LD A,(DE) | |
| 035A | XIC 4 : LD A,(DE) | |
| 0366 | XIC 5 : LD A,(DE) | |
| 0372 | XIC 6 : LD A,(DE) | |
| 037E | XIC 7 : LD A,(DE) | |

Generalized XIO Macro-Instruction Interpreter Routine for Bit N

|  | Machine Instruction | Comment |
|---|---|---|
| XIO N : | LD A,(DE) | |
|  | BIT N,A | |
|  | JR Z, FETCH | Do nothing if open. |
|  | RES 0,B | |
| FETCH : | POP HL | |
|  | LD E,L | |
|  | LD L,H | |
|  | LD H,C | |
|  | JP (HL) | |

| Location | Machine Instruction | Comment |
|---|---|---|
| 038A | XIO 0 : LD A,(DE) | First machine instruction |
| : | : | in XIO 0 macro-instruction. |
| 0396 | XIO 1 : LD A,(DE) | |
| : | : | |
| 03A2 | XIO 2 : LD A,(DE) | |
| : | : | |
| 03AE | XIO 3 : LD A,(DE) | |
| : | : | |
| 03BA | XIO 4 : LD A,(DE) | |
| : | : | |
| 03C6 | XIO 5 : LD A,(DE) | |
| : | : | |
| 03D2 | XIO 6 : LD A,(DE) | |
| : | : | |
| 03DE | XIO 7 : LD A,(DE) | |

Generalized OTL Macro-Instruction Interpreter Routine for Bit N

|  | Machine Instruction | Comment |
|---|---|---|
| OTL N : | BIT 4,B | Test master control relay. |
|  | JR Z:NEWFE | If relay off, start new rung. |
|  | BIT 0,B | Test rung status. |
|  | JR Z:NEWFE | If rung status is zero, start new rung. |
|  | LD L,E | Form operand address |
|  | LD H,D | in HL. |
|  | SET N,(HL) | Set bit N in HL. |
| NEWFE : | DI | Disable interrupts. |
|  | LD A,F0(H) | Mask off rung status. |
|  | AND B | Clear rung status. |
|  | LD B,A | |
|  | SET 0,B | |
|  | EI | Enable interrupt. |
| FETCH : | POP HL | L = operand address; H = op code. |
|  | LD E,L | Low byte of operand in E. |
|  | LD L,H | Form address of |
|  | LD H,C | jump statement in HL. |
|  | JP (HL) | Jump via jump table. |

| Location | Machine Instruction | Comment |
|---|---|---|
| 0800 | OTL 0 : BIT 4,B | Location of first machine instruction in OTL 0 macro-instruction. |
| : | : | |
| 0817 | OTL 1 : BIT 4,B | |
| : | : | |
| 082E | OTL 2 : BIT 4,B | |
| : | : | |
| 0845 | OTL 3 : BIT 4,B | |
| : | : | |
| 085C | OTL 4 : BIT 4,B | |
| : | : | |
| 0873 | OTL 5 : BIT 4,B | |
| : | : | |
| 088A | OTL 6 : BIT 4,B | |
| : | : | |
| 08A1 | OTL 7 : BIT 4,B | |

Generalized OTU Macro-Instruction
Interpreter Routine for Bit N

| Machine Instruction | Comment |
|---|---|
| OTU N : BIT 4, B | |
|        JR Z,NEWFE | |
|        BIT O,B | |
|        JR Z,NEWFE | |
|        LD L,E | |
|        LD H,D | |
|        RESET N,(HL) | Reset bit N in HL. |
| NEWFE : DI | |
|        LD A,FO(H) | |
|        AND B | |
|        LD B,A | |
|        SET O,B | |
|        EI | |
| FETCH : POP HL | |
|        LD E,L | |
|        LD L,H | |
|        LD H,C | |
|        JP (HL) | |

| Location | Machine Instruction | Comment |
|---|---|---|
| 08B8 | OTU 0 : BIT 4,B | Location of first machine instruction in OTU 0 macro-instruction. |
| : | : | |
| 08CF | OTU 1 : BIT 4,B | |
| : | : | |
| 08E6 | OTU 2 : BIT 4,B | |
| : | : | |
| 08FD | OTU 3 : BIT 4,B | |
| : | : | |
| 0914 | OTU 4 : BIT 4,B | |
| : | : | |
| 092B | OTU 5 : BIT 4,B | |
| : | : | |
| 0942 | OTU 6 : BIT 4,B | |
| : | : | |
| 0959 | OTU 7 : BIT 4,B | |

Generalized OTE Macro-Instruction Interpreter Routine for Bit N

|  | Machine Instruction | Comment |
|---|---|---|
| OTE N : | LD L,E | Form operand address |
|  | LD H,D | in HL. |
|  | BIT 4,B |  |
|  | JR Z,RESET |  |
|  | BIT 0,B |  |
|  | JR Z,RESET |  |
|  | SET N, (HL) | Set bit N in HL. |
| NEWFE : | DI |  |
|  | LD A,FO(H) |  |
|  | AND B |  |
|  | LD B,A |  |
|  | SET 0,B |  |
|  | EI |  |
| FETCH : | POP HL |  |
|  | LD E,L |  |
|  | LD L,H |  |
|  | LD H,C |  |
|  | JP (HL) |  |
| RESET : | RESET N,(HL) | Reset bit N in HL. |
| NEWFE : | DI |  |
|  | LD A,FO(H) |  |
|  | AND B |  |
|  | LD B,A |  |
|  | SET 0,B |  |
|  | EI |  |
| FETCH : | POP HL |  |
|  | LD E,L |  |
|  | LD L,H |  |
|  | LD H,C |  |
|  | JP (HL) |  |

| Location | Machine Instruction | Comment |
|---|---|---|
| 0970 | OTE 0 : LD L,E | Location of first machine instruction in OTE 0 macro-instruction. |
| ⋮ | ⋮ |  |
| 0995 | OTE 1 : LD L,E |  |
| ⋮ | ⋮ |  |
| 09BA | OTE 2 : LD L,E |  |
| ⋮ | ⋮ |  |
| 09DF | OTE 3 : LD L,E |  |
| ⋮ | ⋮ |  |
| 0A04 | OTE 4 : LD L,E |  |
| ⋮ | ⋮ |  |
| 0A29 | OTE 5 : LD L,E |  |
| ⋮ | ⋮ |  |
| 0A4E | OTE 6 : LD L,E |  |
| ⋮ | ⋮ |  |
| 0A73 | OTE 7 : LD L,E |  |

BST Macro-Instruction
Interpreter Routine

| Location | Contents | Machine Instruction | | Comment |
|---|---|---|---|---|
| 0B0D | F3 | BST:DI | | ;BST INSTRUCTION |
| 0B0E | CB58 | BIT 3,B | | ;TEST STATUS BIT 3 |
| 0B10 | 78 | LD A,B | | ;REPLACING |
| 0B11 | 17 | RLA | | ;     BIT 2 |
| 0B12 | 280D | JR Z,BST2-$ | | ;IF 0, FIRST BST |
| 0B14 | 17 | RLA | | ;     STATUS REG |
| 0B15 | E604 | AND 04H | | ;     OF BIT 0 ORED |
| 0B17 | B0 | BST:OR B | | ;     WITH BIT 2 |
| 0B18 | 47 | LD B,A | | ;PLACE NEW STATUS IN B |
| 0B19 | CBC0 | SET 0,B | | ;PREPARE |
| 0B1B | FB | EI | | ;     FOR |
| 0B1C | E1 | POP HL | | ;L=OPR.ADDR.,H=OP-CODE |
| 0B1D | 5D | LD E,L | | ;OPR,ADDRESS LO-BYTE IN E |
| 0B1E | 6C | LD L,H | | ;FORM THE ADDRESS |
| 0B1F | 61 | LD H,C | | ;   OF JUMP TABLE IN HL |
| 0B20 | E9 | JP (HL) | | ;JUMP INDIRECT VIA JUMP TABLE |
| 0B21 | E602 | BST2:AND 02H | | ;    BIT 1 |
| 0B23 | F608 | OR 8 | | ;    POSITION |
| 0B25 | 18F0 | JR BST1-$ | | ;PREPARE FOR NEXT RUNG |

BND Macro-Instruction
Interpreter Routine

| Location | Contents | Machine Instruction | | Comment |
|---|---|---|---|---|
| 0B27 | F3 | BST:DI | | ;BND INSTRUCTION |
| 0B28 | 78 | LD A,B | | ;REPLACE |
| 0B29 | 17 | RLA | | ;    BIT 0 |
| 0B2A | 17 | RLA | | ;    WITH |
| 0B2B | B0 | OR B | | ;    THE |
| 0B2C | 1F | RRA | | ;    RESULT |
| 0B2D | A0 | AND B | | ;    OF |
| 0B2E | 1F | RRA | | ;    BIT 0 |
| 0B2F | E601 | AND 01H | | ;    ORED |
| 0B31 | CB80 | RES 0,B | | ;    WITH BIT 2, THEN |
| 0B33 | B0 | OR B | | ;    ANDED WITH BIT 1 |
| 0B34 | E6F1 | AND 0F1H | | ;RESET BITS 1, 2 AND 3 |
| 0B36 | 47 | LD B,A | | ; |
| 0B37 | FB | EI | | ; PREPARE FOR |
| 0B38 | E1 | NOPY:POP HL | | ;L=OPR.ADDR.,H=OP-CODE |
| 0B39 | 5D | LD E,L | | ;OPR,ADDRESS LO-BYTE IN E |
| 0B3A | 6C | LD L,H | | ;FORM THE ADDRESS |
| 0B3B | 61 | LD H,C | | ;   OF JUMP TABLE IN HL |
| 0B3C | E9 | JP (HL) | | ;JUMP INDIRECT VIA JUMP TABLE |

CTR Macro-Instruction Interpreter Routine

| Location | Contents | Machine Instruction | | Comment |
|---|---|---|---|---|
| 4157 | F3   | CTR:DI     |            | ; |
| 4158 | CB60 |     BIT    | 4,B        | ;CHECK MASTER CONTROL |
| 415A | 280C |     JR     | Z,CTR1-$   | ; |
| 415C | CB40 |     BIT    | 0,B        | ;CHECK RUNG STATUS |
| 415E | 2808 |     JR     | Z,CTR1-$   | ; |
| 4160 | AF   |     XOR    | A          | ;CLEAR THE |
| 4161 | 12   |     LD     | (DE),A     | ;   ADDRESSED |
| 4162 | 13   |     INC    | DE         | ;   OPERAND |
| 4163 | CB55 |     BIT    | 2,L        | |
| 4165 | 200E |     JR     | NZ,RTR-$   | |
| 4167 | 12   |     LD     | (DE),A     | ; |
| 4168 | F3   | CTR1 DI    |            | ;   RUNG STATUS BIT MUST |
| 4169 | 3EF0 |     LD     | A,0F0H     | |
| 416B | A0   |     AND    | B          | |
| 416C | 47   |     LD     | B,A        | |
| 416D | CBC0 |     SET    | 0,B        | ;   BE SET.  INTERRUPT |
| 416F | FB   |     EI     |            | ;   MUST BE DISABLED WHEN |
| 4170 | E1   |     POP    | HL         | ;L=OPR.ADDR.,H=OP-CODE |
| 4171 | 5D   |     LD     | E,L        | ;OPR,ADDRESS LO-BYTE IN E |
| 4172 | 6C   |     LD     | L,H        | ;FORM THE ADDRESS |
| 4173 | 61   |     LD     | H,C        | ;   OF JUMP TABLE IN HL |
| 4174 | E9   |     JP     | (HL)       | ;JUMP INDIRECT VIA JUMP TABLE |
| 4175 | 1A   |     LD     | A,(DE)     | |
| 4176 | E640 |     AND    | 40H        | ;SAVE CLOCK |
| 4178 | 12   |     LD     | (DE),A     | |
| 4179 | 18ED |     JR     | CTR1-$     | |

CTU Macro-Instruction Interpreter Routine

| Location | Contents | Machine Instruction | | Comment |
|---|---|---|---|---|
| 4178 | F3   | CTU:DI     |            | |
| 417C | 6B   |     LD     | L,E        | ;FORMS OPERAND ADDRESS |
| 417D | 62   |     LD     | H,D        | ;   IN HL |
| 417E | 2C   |     INC    | L          | ;HL=ACC-H ADDRESS |
| 417F | 7E   |     LD     | A,(HL)     | ;A=ACC-H |
| 4180 | E6F0 |     AND    | 0F0H       | |
| 4182 | 4F   |     LD     | C,A        | ;SAVE FLAGS IN C |
| 4183 | CB60 |     BIT    | 4,B        | ;CHECK MASTER CONTROL RELAY |
| 4185 | 2842 |     JR     | Z,CTU6-$   | ;IF FALSE, GO TO CTU6 |
| 4187 | CB40 |     BIT    | 0,B        | ;CHECK DECISION |
| 4189 | 283E |     JR     | Z,CTU6-$   | ;IF FALSE, GO TO CTU6 |
| 418B | CB79 |     BIT    | 7,C        | ;BIT-17 SET ? |
| 418D | 203C |     JR     | NZ,CTU7-$  | ;YES, GO TO CTU7 |
| 418F | CBF9 |     SET    | 7,C        | ;SET BIT-17 |
| 4191 | 1A   |     LD     | A,(DE)     | ;A=ACC-L |
| 4192 | C601 |     ADD    | A,1        | ;  INCREMENT ACC-L |
| 4194 | 27   |     DAA    |            | ;DECIMAL ADJUST |
| 4195 | 12   |     LD     | (DE),A     | ;STORE |
| 4196 | 7E   |     LD     | A,(HL)     | ;A=ACC-H |
| 4197 | CBA7 |     RES    | 4,A        | ;RESET OVERFLOW BIT |
| 4199 | CE00 |     ADC    | A,0        | ;ADD CARRY TO ACC-H |

| Location | Contents | Machine Instruction | Comment |
|---|---|---|---|
| 419B | 27 | DAA | ;DECIMAL ADJUST |
| 419C | CB67 | BIT 4,A | ;OVERFLOW ? |
| 419E | 282C | JR Z,CTU8-$ | ;NO, GO TO CTU8 |
| 41A0 | E60F | AND 0FH | |
| 41A2 | CB69 | BIT 5,C | ;BIT-15 SET ? |
| 41A4 | CBE1 | SET 4,C | ;SET BIT-14 IN C |
| 41A6 | 201C | JR NZ,CTU4-$ | ;YES, GO TO CTU4 |
| 41A8 | CBA9 | RES 5,C | ;RESET BIT-15 IN C |
| 41AA | CBA1 | RES 4,C | |
| 41AC | 77 | LD (HL),A | ;STORE ACC-H DIGIT |
| 41AD | 1C | INC E | |
| 41AE | 1C | INC E | |
| 41AF | 1C | INC E | ;DE=PRST-H ADDRESS |
| 41B0 | 1A | LD A,(DE) | ;A=PRESET-H |
| 41B1 | E60F | AND 0FH | ;MASK OUT UNUSED BITS |
| 41B3 | 1D | DEC E | ;DE=PRST-L ADDRESS |
| 41B4 | BE | CP (HL) | ;ACC-H=PRST-H ? |
| 41B5 | 2B | DEC HL | ;HL=ACC-L ADDRESS |
| 41B6 | 3808 | JR C,CTU2-$ | ;IF ACC-H PRST-H,SET BIT-15 (C) |
| 41B8 | 2008 | JR NZ,CTU3-$ | ;IF NOT 0, RESET BIT-15 (CTU3) |
| 41BA | 1A | LD A,(DE) | ; A=PRST-L |
| 41BB | BE | CP (HL) | ;ACC-L=PRST-L ? |
| 41BC | 2802 | JR Z,CTU2-$ | ;YES, SET BIT-15 (CTU2) |
| 41BE | 3002 | JR NC,CTU3-$ | ;IF ACC PRST,RESET BIT-15(CTU3) |
| 41C0 | CBE9 | CTU2:SET 5,C | ;SET BIT-15 (EQUAL) |
| 41C2 | 2C | CTU3:INC L | ;HL=ACC-H ADDR. |
| 41C3 | 7E | LD A,(HL) | ;A=ACC-H |
| 41C4 | B1 | CTU4:OR C | ;COMBINE ACC-H WITH FLAGS |
| 41C5 | 77 | LD (HL),A | ;STORE ACC-H |
| 41C6 | C39C40 | CTU5:JP TON4 | |
| 41C9 | CBB9 | CTU6:RES 7,C | ;RESET BIT-17 IN C |
| 41CB | 7E | CTU7:LD A,(HL) | ;A=ACC-H |
| 41CC | E60F | CTU8:AND 0FH | |
| 41CE | CB61 | BIT 4,C | ;BIT-14 SET ? |
| 41D0 | 20F2 | JR NZ,CTU4-$ | ;YES, GO TO CTU4 |
| 41D2 | CBA9 | RES 5,C | ;RESET BIT-15 |
| 41D4 | 18D6 | JR CTU1-$ | |

GET Macro-Instruction
Interpreter Routine

| Location | Contents | Machine Instruction | Comment |
|---|---|---|---|
| 0A98 | F3 | GET:DI | |
| 0A99 | 2A1E20 | LD (HL,(TEMP1) | ;SAVE 1ST GET |
| 0A9C | 221C20 | LD (TEMP3),HL | ;   DATA |
| 0A9F | 1A | LD A,(DE) | ;LOW |
| 0AA0 | 6F | LD L,A | |
| 0AA1 | 1C | INC E | ; |
| 0AA2 | 1A | LD A,(DE) | ;HIGH |
| 0AA3 | 67 | LD H,A | |
| 0AA4 | 221E20 | LD (TEMP1),HL | ;SAVE IN TEMP ACCUM |
| 0AA7 | FB | EI | |
| 0AA8 | E1 | POP HL | ;L=OPR.ADDR.,H=OP-CODE |
| 0AA9 | 5D | LD E,L | ;OPR,ADDRESS LO-BYTE IN E |
| 0AAA | 6C | LD L,H | ;FORM THE ADDRESS |
| 0AAB | 61 | LD H,C | ;   OF JUMP TABLE IN HL |
| 0AAC | E9 | JP (HL) | ;JUMP INDIRECT VIA JUMP TABLE |

PUT Macro-Instruction Interpreter Routine

| Location | Contents | Machine Instruction | Comment |
|---|---|---|---|
| 0AAD | CB60 | BIT 4,B | ;CHECK MASTER CONTROL |
| 0AAF | 280D | JR Z,PUT1-$ | ;DO NOTHING IF MASTER OFF |
| 0AB1 | CB40 | BIT 0,B | ;CHECK RUNG STATUS |
| 0AB3 | 2809 | JR Z,PUT1-$ | ;DO NOTHING IF RUNG STATUS ZER |
| 0AB5 | 211E20 | LD HL,TEMP1 | ;TEMP1 SERVES AS ACC |
| 0AB8 | 7E | LD A,(HL) | ;PUT TWO-BYTE ACC |
| 0AB9 | 12 | LD (DE),A | ;   CONTENTS IN |
| 0ABA | 1C | INC E | ;   OPR ADDR. (LO) |
| 0ABB | 2C | INC L | ;   AND |
| 0ABC | 7E | LD A,(HL) | ;   OPR ADDR.+1 (HI) |
| 0ABD | 12 | LD (DE),A | ; |
| 0ABE | F3 | PUT1:DI | ;   RUNG STATUS BIT MUST |
| 0ABF | 3EF0 | LD A,0F0H | |
| 0AC1 | A0 | AND B | |
| 0AC2 | 3C | INC A | ;SET RUNG DECISION TRUE |
| 0AC3 | 47 | LD B,A | |
| 0AC4 | FB | EI | ;   MUST BE DISABLED WHEN |
| 0AC5 | E1 | POP HL | ;L=OPR.ADDR.,H=OP-CODE |
| 0AC6 | 5D | LD E,L | ;OPR.ADDRESS LO-BYTE IN E |
| 0AC7 | 6C | LD L,H | ;FORM THE ADDRESS |
| 0AC8 | 61 | LD H,C | ;   OF JUMP TABLE IN HL |
| 0AC9 | E9 | JP (HL) | ;JUMP INDIRECT VIA JUMP TABLE |

APPENDIX C

MAIN PROCESSOR I/O SCAN ROUTINE

| Location | Contents | Mnemonic | Comment |
|---|---|---|---|
| 016D | F3 | DI | |
| : | | | |
| 0176 | 211820 | LD HL,FLAG | SET INTERRUPT FLAG. |
| : | | | |
| 017E | CBD6 | SET 2,(HL) | |
| : | | | |
| 018D | 210010 | LD HL,IOP | I/O PORT ADDRESS IN HL. |
| 0190 | 112020 | LD DE,IMAG | I/O IMAGE TABLE ADDRESS IN DE. |
| 0193 | FB | SCAN: EI | |
| 0194 | 09 | EXX | |
| 0195 | F3 | DI | |
| 0196 | 09 | EXX | |
| 0197 | 1A | LD A,(DE) | LOAD WORD OF IMAGE TABLE DATA INTO ACCUMULATOR. |
| 0198 | 47 | LD B,A | LOAD LOW BYTE OF I/O DATA INTO REGISTER B. |
| 0199 | 13 | INC DE | LOOK AT NEXT IMAGE TABLE ADDRESS. |
| 019A | 1A | LD A,(DE) | LOAD WORD OF IMAGE TABLE DATA INTO ACCUMULATOR. |
| 019B | 4F | LD C,A | LOAD HIGH BYTE OF I/O DATA IN REGISTER C. |
| 019C | 1B | DEC DE | GET PREVIOUS IMAGE TABLE ADDRESS. |

| Location | Contents | Mnemonic | Comment |
|---|---|---|---|
| 01A9 | 78 | LD A,B | LOAD LOW BYTE INTO ACCUMULATOR. |
| 01AA | 2F | CPL | |
| 01AB | 77 | LD (HL),A | OUTPUT LOW BYTE. |
| 01AC | 3A003C | LD A,(3C00H) | CHECK HIGH DENSITY ID. |
| 01AF | E601 | AND 01(H) | |
| 01B1 | CCE342 | CALL Z,HDEN | CALL HIGH DENSITY ROUTINE. |
| 01B4 | 13 | SCAN OUT: INC DE | ADVANCE POINTERS. |
| 01B5 | 23 | INC HL | |
| 01B6 | 79 | LD A,C | LOAD HIGH BYTE INTO ACCUMULATOR. |
| 01B7 | 2F | CPL | |
| 01B8 | 77 | LD (HL),A | OUTPUT HIGH BYTE. |
| 01B9 | 3A003C | LD A,(3C00H) | CHECK FOR HIGH DENSITY ID. |
| 01BC | E601 | AND 01(H) | |
| 01BE | CCE342 | CALL Z,HDEN | CALL HIGH DENSITY ROUTINE. |
| 01C1 | 13 | SCAN IN: INC DE | POINT TO NEXT IMAGE TABLE ADDRESS. |
| 01C2 | 2B | DEC HL | POINT TO LOW BYTE I/O ADDRESS. |
| 01C3 | 7E | LD A,(HL) | INPUT LOW BYTE. |
| 01C4 | 2F | CPL | |
| 01C5 | 12 | LD (DE),A | STORE IN IMAGE TABLE. |
| 01C6 | 13 | INC DE | INCREMENT POINTERS. |
| 01C7 | 23 | INC HL | |
| 01C8 | 7E | LD A,(HL) | INPUT HIGH BYTE. |
| 01C9 | 2F | CPL | |
| 01CA | 12 | LD (DE),A | STORE IN IMAGE TABLE. |
| 01CB | 23 | INC HL | |
| 01CC | 13 | INC DE | |
| 01CD | CB73 | BIT 6,E | TEST FOR ADDRESS 020. |
| 01CF | 1A9301 | JP Z,SCAN | |
| 01D2 | D9 | EXX | |
| 01D3 | 211820 | LD HL,FLAG | RESTORE INTERRUPT FLAG. |
| 01D6 | CB 96 | RES 2,(HL) | |

APPENDIX D

HIGH DENSITY MICROCOMPUTER FIRMWARE

I/O and Test Pin Assignments

TO :THIS INPUT=SYSTEM READ+WRITE (LOW TRUE) RESET BY RD+WR.IF SW-1 POS-2 IS ON, TO=LOW

INT :SAME AS TO NORMALLY

T1 :THIS INPUT=SYSTEM WRITE/READ L

BUS :I/O BUS INTERFACE TO SYSTEM BUS LOW TRUE

PORT1
 BITS 0-7 :A/D OUTPUT DATA HIGH TRUE

PORT2
 BITS 0-2 :ANALOG MUX ADDRESS, LOW TRUE
 BIT 3 :START CONVERSION OUTPUT, HIGH TRUE

BIT 4 : USED ON PWR-UP AS AN INPUT TO INDICATE THE
         TYPE OF DATA XFER SYSTEM; A HIGH = SINGLE
         XFER, LOW=BLOCK XFER. AS AN OUTPUT USED TO
         ENABLE/DISABLE THE MOD ID ENABLE FLIP FLOP
BIT 5 : INPUT USED TO TEST FOR A/D ROLLOVER
BIT 6 : EOC BIT FROM A/D. IF HIGH, CONV COMPLETE
BIT 7 : RESET. HIGH TRUE OUTPUT USED TO RESET
         FLOPS ETC. ON THE MODULE

| Location | Contents | Mnemonic | Comment |
|---|---|---|---|
|  |  | ORG 0 | ;POWER-UP RESTART |
| 0000 | 35 | DTS TCNTI | ;DISABLE TMR/CNTR INTERRUPT |
| 0001 | 24 00 | JMP START | ;JUMP TO PROGRAM START |

;THE BLOCK TRANSFER ROUTINE FOLLOWS. A ENTRY AT
;LOC 03 OCCURS WITHIN 10US OF A SYSTEM READ+WRITE.
;THE FLAG DEFINITIONS ARE AS FOLLOWS

;F0 :NOT AFFECTED F0=1=SINGLE TRANSFER SYSTEM.
;F1 :USED IN SINGLE TRANSFER SYSTEM TO TELL
;    MAIN PROGRAM TO UPDATE OUTPUT FILE (IF
;    F1=0, UPDATE).

Block Transfer Routine

| Location | Contents | Mnemonic | Comment |
|---|---|---|---|
| 0003 | AF | INTSRV: MOV R7,A | ;SAVE ACC IN R7 |
| 0004 | B6 3B | JF0 PLCRD | ;JUMP TO SINGLE TRANSFER<br>;ROUTINE F0 SET= A SINGLE<br>;TRANSFER SYSTEM |
| 0006 | 46 34 | JNT1 ENDREAD | ;EXIT IF INTERRUPT WAS A<br>;SYSTEM READ |
| 0008 | D5 | SEL RB1 | ;SWITCH TO REGISTER BANK ONE |
| 0009 | 80 | HIDENS: MOVX A,@R0 | ;INPUT LOW TRUE BUS DATA<br>;CHECK FOR VALID MSW=88H TO<br>;8IH FOLLOWS |
| 000A | E3 | MOVP3 A,@A | ;GET LOOKUP TABLE MSW NUMBER |
| 000B | C6 30 | JZ ENDO |  |
| 000D | 90 | MOVX @R0,A | ;OUTPUT MOD STATUS WORD TO<br>;SYS BUS |
| 000E | 5C | ANL A,R4 | ;BIR4=07FH MASK READ FLAG |
| 000F | E7 | RL A | ;SHIFT ACC LEFT MULTIPLY #<br>;OF WORDS BY 2 TO FORM BYTE<br>;COUNTER |
| 0010 | AB | MOV R3,A | ;BIR3 IS THE BYTE COUNTER |
| 0011 | B9 20 | MOV R1,#20H | ;BIR1 IS THE DATA POINTER |
| 0013 | 36 13 | BYTE1: JT0 BYTE1 | ;LOOP TIL SYS HAS MSW |
| 0015 | 56 2D | JT1 END | ;EXIT IF INT WAS A WRITE |
| 0017 | 9A EF | ANL P2,#0EFH | ;RESET MOD ID CONTROL<br>;FLIP FLOP |
| 0019 | F1 | MOV A,@R1 | ;LOAD BYTE 1 INTO ACC |
| 001A | 90 | MOVX @R0,A | ;OUTPUT BYTE1 INTO OUT LATCH |
| 001B | CB | DEC R3 | ;DEC R3, POIN TO SECOND BYTE |
| 001C | 36 1C | BYTEN: JT0 BYTEN | ;LOOP TIL SYS HAS BYTE ONE |
| 001E | 56 2D | JT1 END | ;EXIT IF INT WAS A WRITE |
| 0020 | 19 | INC R1 | ;POINT TO NEXT BYTE |
| 0021 | 21 | XCH A,@R1 | ;ACC HAS THE DATA BYTE, BIR1<br>;POINTS TO CHKSUM TOTAL SO FAR |

| Location | Contents | Mnemonic | | Comment |
|---|---|---|---|---|
| 0022 | 90 | | MOVX @R0,A | ;OUTPUT NEXT BYTE |
| 0023 | 21 | | XCH A,@R1 | ;ACC HAS CHKSUM AGAIN |
| 0024 | 61 | | ADD A,@R1 | ;UPDATE CHKSUM WITH LAST ;DATA BYTE |
| 0025 | EB 1C | | DJNZ R3,BYTEN | ;DEC JMP NOT ZERO |
| 0027 | 36 25 | CHKOUT: | JT0 CHKOUT | ;LOOP TIL SYS HAS NEXT BYTE |
| 0029 | 56 2E | | JT1 END | ;EXIT IF SYS WRITE |
| 002B | 90 | | MOVX @R0,A | ;OUTPUT CHECKSUM |
| 002C | 36 2C | LSTRD: | JT0 LSTRD | ;WAIT FOR SYS TO TAKE CHKSUM |
| 002E | 27 | END: | CLR A | ;CLEAR ACC |
| 002F | 8A 10 | | ORL P2,#10H | ;THIS HOLDS MOD ID OFF TIL ;RDF,WF IS SET |
| 0031 | 90 | ENDO: | MOVX @R0,A | ;OUTPUT ZERO, CLEAR INT FLOP |
| 0032 | C5 | ENDW1: | SEL RB0 | ;GET REG BANK ZERO BACK |
| 0033 | FF | | MOV A,R7 | ;GET ACC BACK |
| 0034 | 93 | | RETR | ;RETURN |
| 0035 | 08 | ENDREAD: | INS A,BUS | ;DO AN INPUT, RESET INT FLOP |
| 0036 | 9A EF | | ANL P2,#0EFH | ;RESET MOD ID CONTROL ;FLIP FLOP |
| 0038 | 8A 10 | | ORL P2,#10H | ;THIS HOLDS MOD ID OFF TIL ;RDF,WF IS SET |
| 003A | FF | | MOV A,R7 | ;GET ACC BACK |
| 003B | 93 | | RETR | ;RETURN |

; END OF BLOCK XFER ROUTINE

General Comments

```
;THE SINGLE TRANSFER ROUTINE FOLLOWS.  A CHANNEL
;BYTE SELECT BYTE IS WRITTEN TO THE MODULE TO
;DETERMINE THE OUTPUT DATA.  ANY NON-VALID
;CHANNEL BYTE SELECT # CAUSES F1 TO BE LEFT
;CLEARED (=0).  THE UPPER PART OF PAGE #0 IS
;USED AS A LOOKUP TABLE FOR VALID CHANNEL BYTE
;SELECT DETERMINATION.  LOW TRUE CHANNEL ID #
;FROM SYS DETERMINES DATA.
```

Single Transfer Routine

| Location | Contents | Mnemonic | | Comment |
|---|---|---|---|---|
| 003C | 80 | PLCRD: | MOVX A,@R0 | ;GET OUTPUT DATA FROM SYS ;PROCESSOR, IT,S LOW TRUE |
| 003D | D5 | | SEL RB1 | ;SWITH TO REGISTER BANK ONE |
| 003E | A5 | | CLR F1 | ;CLEAR UPDATE FLAG |
| 003F | F2 49 | | JB7 LOBYTE | ;JUMP IF LOW BYTE REQUESTED |
| 0041 | 37 | HIBYTE: | CPL A | ;GET HI TRUE # |
| 0042 | A3 | | MOVP A,@A | ;GET CHANNEL POINTER |
| 0043 | C6 52 | | JZ UPDATE | ;JUMP IF A NOT VALID CH# ;REQUESTED |
| 0045 | A9 | | MOV R1,A | ;PUT # IN R1 |
| 0046 | 19 | | INC R1 | ;POINT TO UPPER BYTE FOR ;CHANNEL # |
| 0047 | F1 | | MOV A,@R1 | ;BYTE IN ACC |
| 0048 | 04 51 | | JMP VADRES | ;GO OUTPUT IT NOW AND RETURN |
| 004A | 37 | LOBYTE: | CPL A | ;GET HI TRUE # |
| 004B | 43 80 | | ORL A,#80H | ;SET BIT #7 |
| 004D | A3 | | MOVP A,@A | ;GET CHANNEL POINTER |
| 004E | C6 52 | | JZ UPDATE | ;JUMP IF AN INVALID CHANNEL ;# WAS SENT |

| Location | Contents | Mnemonic | Comment |
|---|---|---|---|
| 0050 | A9 | MOV R1,A | ;PUT IT INTO R1 |
| 0051 | F1 | MOV A,@R1 | ;GET DATA BYTE INTO ACC |
| 0052 | B5 | VADRES: CPL F1 | ;COMP F1 SO THAT OUTPUT FILE ;WON'T BE UPDATED, F1 IS ;NOW SET |
| 0053 | 90 | UPDATE: MOVX @R0,A | ;OUTPUT BYTE TO OUTPUT FLOP ;AND LET SYS GET IT WHEN IT ;WANTS TO |
| 0054 | C5 | SEL RB0 | ;GET BANK ZERO BACK |
| 0055 | FF | MOV A,R7 | ;GET ACC BACK |
| 0056 | 93 | RETR | ;RETURN FROM INTERRUPT ;ROUTINE |

```
;LOC 080H TO 0FFH ARE FOR LOOKUP
;OF CHANNEL ADDRESS
```

|  |  | ORG 080H |  |
|---|---|---|---|
| 0080 | 20 | DB 20H | ;CHANNEL ONE |
| 0081 | 22 | DB 22H | ;CHANNEL TWO |
| 0082 | 24 | DB 24H | ;CHANNEL THREE |
| 0083 | 00 | 00H |  |
| 0084 | 26 | DB 26H | ;CHANNEL FOUR |
| 0085 |  | 00H |  |
| 0086 |  | 00H |  |
| 0087 |  | 00H |  |
| 0088 | 28 | DB 28H | ;CHANNEL FIVE |
| 0089 |  | 00H |  |
| 0090 | 2A | DB 2AH | ;CHANNEL SIX |
| 00A0 | 2C | DB 2CH | ;CHANNEL SEVEN |
| 00C0 | 2E | DB 2EH | ;CHANNEL EIGHT |

The Main Analog-to-Digital Routine

```
;THE FLAG DEFINITIONS FOLLOW
;
;F0  :BLOCK/SINGLE TRANSFER FLAG.  HIGH=SINGLE
;     TRANSFER
;F1  :UPDATE FLAG.  SET=NO UPDATE (SINGLE
;     TRANSFER ONLY)
```

| Location | Contents | Mnemonic | Comment |
|---|---|---|---|
| 0100 | 27 | START: CLR A | ;RESTART VECTORED HERE ;AT POWER-UP. MEMORY TEST ;FOLLOWS |

```
;   THIS MEMORY TEST TESTS LOC 20H TO 3FH
;BY LOADING ZEROES FIRST, AND ONES NEXT.
;   TEST FAILURE RESULTS IN AN INFINITE LOOP
;WITH THE RESET LINE TOGGLING (PORT 2 BIT 7)
```

| 0101 | 8A 80 | ORL P2,#080H | ;RESET OUTPUT FLOPS ETC. |
|---|---|---|---|
| 0103 | 9A EF | ANL P2,#0EFH | ;RESET MOD ID ENABLE |
| 0105 | 8A 17 | ORL P2,#17H | ;ENABLE MOD ENABLE, ADDRESS ;MUX CHANNEL |
| 0107 | 9A 77 | ANL P2,#77H | ;ONE, RESET START CONVERT |

| Location | Contents | Mnemonic | | Comment |
|---|---|---|---|---|
| 0109 | D5 | | SEL RB1 | ;SET UP A MASK REGISTER FOR |
| 010A | BC 6F | | MOV R4,#6FH | ;THE BLOCK TRANSFER ROUTINE |
| 010C | C5 | | SEL RB0 | ;AT B1R4 |
| 010D | 88 20 | | MOV R0,#20H | ;R0 POINTS TO DATA STORE AREA |
| 010F | BD 20 | | MOV R5,#20H | ;R5 IS THE BYTE COUNTER |
| 0111 | A0 | NXBYTE: | MOV @R0,A | ;LOAD AT R0, ALL ZEROS |
| 0112 | F0 | | MOV A,@R0 | ;GET BYTE AND CHECK IT |
| 0113 | 96 00 | | JNZ START | ;IF NOT ZERO, ERROR FOUND |
| 0115 | 37 | | CPL A | ;GET FFH INTO ACC |
| 0116 | A0 | | MOV @R0,A | ;STORE AT ACC |
| 0117 | F0 | | MOV A,@R0 | ;GET BYTE AND CHECK IT |
| 0118 | 37 | | CPL A | ;COMP ACC, SHOULD NOW=00H |
| 0119 | 96 00 | | JNZ START | ;IF NOT, ERROR |
| 011B | A0 | | MOV @R0,A | ;LOAD ZEROES AT LOC AGAIN |
| 011C | F0 | | MOV A,@R0 | ;CHECK DATA LOC AGAIN |
| 011D | 96 00 | | JNZ START | ;IF NOT ZERO, EXIT |
| 011F | 18 | | INC R0 | ;POINT TO NEXT BYTE |
| 0120 | ED 11 | | DJNZ R5,NXBYTE | ;GO ON TO NEXT TEST BYTE |
| 0122 | 0A | | IN A,P2 | ;CHECK SYSTEM TRANSFER TYPE, |
| 0123 | 92 26 | | JB4 BLKXFR | ;IF BIT 4=1 THIS IS A BLOCK ;TRANSFER SYSTEM |
| 0125 | 95 | | CPL F0 | ;THIS IS A SINGLE TRANSFER ;SYSTEM |
| 0126 | 27 | BLKXFR: | CLR A | ;CLEAR ACC |
| 0127 | 90 | | MOVX @R0,A | ;CLEAR INTERRUPT FLOP |
| 0128 | B6 3F | | JF0 STAR2 | ;JUMP TO ENABLE, INTERRUPTS ;IF IN SINGLE XFER MODE, IF ;IN BLOCK XFER, WAIT FOR ;IMAGE TO OUTPUT FILE XFER ;AFTER FIRST SCAN TO ENABLE ;EXTERNAL INTERRUPTS |
| 012A | 24 43 | | JMP STAR1 | ;JMP TO A/D CONVERSION START ;ROUTINE |
| | | ; RESET ROUTINE. A RESET OCCURS IF CUSTOMER ;POWER IS REMOVED, OR IF ADC FAILS TO CONVERT | | |
| 012C | 8A 07 | RESET: | ORL P2,#07H | ;ADDRESS MUX CHANNEL ONE FOR |
| 012E | 9A F7 | | ANL P2,#0F7H | ;A RESET, GET READY TO TRY ;AGAIN |
| 0130 | 15 | | DIS I | ;DISABLE INTERRUPT TO IGNORE ;PROCESSOR READS AND WRITES ;TIL DATA LOCATIONS ARE ;ZERO'D |
| 0131 | 27 | | CLR A | ;CLEAR ACC |
| 0132 | 90 | | MOVX @R0,A | ;CLEAR INTERRUPT FLOP, ;OUTPUT ZERO |
| 0133 | B8 20 | | MOV R0,#20H | ;POINT TO DATA STORE AREA |
| 0135 | BD 20 | | MOV R5,#20H | ;LOAD R5 W/BYTE COUNTER |
| 0137 | A0 | MOVDAT: | MOV @R0,A | ;LOAD ZEROES IN DATA STORE ;AREA |
| 0138 | 18 | | INC R0 | ;POINT TO NEXT BYTE |
| 0139 | ED 37 | | DJNZ R5,MOVDAT | ;DEC R5 JMP NOT ZERO, ;ZERO NEXT BYTE |
| 013B | B6 3F | | JF0 STAR2 | ;JUMP TO ENABLE INTERRUPTS ;IF IN SINGLE XFER MODE, IF ;IF IN BLOCK XFER, WAIT FOR ;IMAGE TO OUTPUT FILE XFER ;AFTER FIRST SCAN TO ENABLE ;EXTERNAL INTERRUPTS |
| 013D | 24 43 | | JMP STAR1 | ;JMP TO A/D CONVERSION ;START ROUTINE |

| Location | Contents | Mnemonic | | Comment |
|---|---|---|---|---|
| | | ; | THREE DIFFERENT ENTRY POINTS ARE USED: | |
| | | ;STAR1, STAR2 AND STAR3 DEPENDING UPON THE | | |
| | | ;TYPE OF SYSTEM TRANSFER AND THE NUMBER OF | | |
| | | ;TIMES THE MUX CHANNELS HAVE SCANNED SINCE | | |
| | | ;POWER-UP ETC. | | |
| 013F | 80 | STAR2: | MOVX A,@R0 | ;RESET THE INTERRUPT FLIP-FLOP |
| 0140 | 05 | STAR3: | EN I | ;ENABLE INTERRUPTS |
| 0141 | 26 41 | WAIT: | JNT0 WAIT | ;LOOP IF T0=LOW, THIS IS USED |
| | | | | ;FOR THE CALIBRATION OF THE |
| | | | | ;1 TO 5 VOLT RANGE MODULES |
| 0143 | B9 2F | STAR1: | MOV R1,#2FH | ;LOAD R1 WITH DATA IMAGE |
| | | | | ;POINTER |
| 0145 | BE 76 | | MOV R6,#76H | ;STORE P2 MASK FOR MUX |
| | | | | ;ADDRESS IN R6 |
| 0147 | 00 | | NOP | |
| 0149 | BA 08 | | MOV R2,#08H | ;LOAD R2 WITH THE CHANNEL |
| | | | | ;COUNT |
| 014B | 54 93 | COVERT: | CALL D45 | ;WAIT 45US BEFORE CONVERTING |
| 014D | 8A 08 | | ORL P2,#08H | ;RAISE START CONVERT PULSE |
| | | | | ;NEXT CHANNEL |
| 014F | 9A F7 | | ANL P2,#0F7H | ;LOWER IT |
| 0151 | CA | | DEC R2 | ;SET R2 TO PREVIOUS CHANNEL |
| | | | | ;ADDRESS TO FORM THREE BIT |
| | | | | ;CHANNEL CODE |
| 0152 | FA | | MOV A,R2 | ;GET IT IN ACC |
| 0153 | 37 | | CPL A | ;ACC NOW HAS HI TRUE MUX |
| | | | | ;ADDRESS |
| 0154 | 47 | | SWAP A | ;GET INTO BITS 6, 5, & 4 |
| 0155 | 53 70 | | ANL A,#70H | ;MASK TO GET CHANNEL # ONLY |
| 0157 | AC | | MOV R4,A | ;SAVE IN R4 |
| 0158 | FE | | MOV A,R6 | ;LOAD ACC WITH P2 MUX MASK |
| | | | | ;FOR NEXT CHANNEL |
| 0159 | 43 70 | | ORL A,#70H | ;SET UP P2 FOR MUX CHANNEL |
| | | | | ;ADDRESS |
| 015B | 53 77 | | ANL A,#77H | ;OF THE FORM 01110XXX |
| 015D | AE | | MOV R6,A | ;SAVE MUX ADDRESS IN R6 |
| 015E | 0A | | IN A,P2 | ;INPUT PORT #2 STATUS |
| | | | | ;INFORMATION |
| 015F | A8 | | MOV R0,A | ;SAVE P2 DATA IN R0 |
| 0160 | FE | | MOV A,R6 | ;GET MUX ADDRESS INTO ACC |
| 0161 | 3A | | OUT P2,A | ;ADDRESS NEXT MUX CHANNEL |
| 0162 | F8 | | MOV A,R0 | ;GET P2 STATUS DATA AGAIN, |
| 0163 | 37 | | CPL A | ;CHECK EOC BIT TO DETERMINE |
| 0164 | D2 2C | | JB6 RESET | ;IF THE ADC HAS FAILED IF BIT |
| | | | | ;6=1, ADC HAS FAILED |
| 0166 | CE | | DEC R6 | ;SET UP NEXT MUX ADDRESS IN R6 |
| 0167 | 09 | | IN A,P1 | ;GET A/D BINARY # INTO ACC |
| 0168 | AD | | MOV R5,A | ;SAVE THE BINARY # IN R5 |
| 0169 | 37 | | CPL A | ;COMP ACC, CHECK FOR ALL ONES |
| 016A | C6 D6 | | JZ OVRGE | ;JUMP TO OVER-RANGE |
| 016C | 37 | | CPL A | ;IT'S LOW TRUE |
| 016D | 96 D2 | | JNZ NOVRG | ;JUMP IF NOT OVR/UNDR RANGE |

; AT THIS POINT THE ACC HAS ZERO DATA, AND
;IT MUST BE DETERMINED IF THIS IS A TRUE ZERO,
;OR A ROLLOVER OCCURRING DUE TO AN OVER-RANGE
;CONDITION

| 016F | F8 | | MOV A,R0 | ;GET P2 STATUS DATA. CHECK |
| | | | | ;IF VIN 1.5 VOLT |

| Location | Contents | | Mnemonic | | Comment |
|---|---|---|---|---|---|
| 0170 | 37 | | | CPL A | ;IT'S LOW TRUE |
| 0171 | B2 75 | | | JB5 ZERO | ;JUMP IF IT'S A TRUE ZERO |
| 0173 | BD FF | OVRGED: | | MOV R5,#0FFH | ;IT WAS A FALSE ZERO, MAKE IT ;FULL SCALE |
| 0175 | 23 80 | ZERO: | | MOV A,#80H | ;SET UP OVR RANGE BIT IN ACC |
| 0177 | 4C | | | ORL A,R4 | ;SET BIT 7 IN R4 |
| 0178 | AC | | | MOV R4,A | ;SAVE CHANNEL ID # IN R4 ;BITS 6, 5, 4 |
| 0179 | FD | NOVRGD: | | MOV A,R5 | ;GET DATA INTO ACC AGAIN |

```
;    AT THIS POINT, ACC HAS THE DATA BYTE, AND
;R4 IS SETUP WITH THE UPPER BYTE USED FOR CHANNEL
;ADDRESS AND OVER RANGE/UNDER RANGE. NOW CALL THE
;BINARY-TO-BCD ROUTINE
```

| Location | Contents | Mnemonic | | Comment |
|---|---|---|---|---|
| 017A | 19 | | INC R1 | ;POINT TO NEXT CH DATA AREA |
| 017B | 54 64 | | CALL BINBCD | ;CALL THE BIN TO BCD ROUTINE |
| 017D | 1A | | INC R2 | ;RESTORE CHANNEL COUNTER TO ;CORRECT VALUE |
| 017E | EA 4B | | DJNZ R2,COVERT | ;LOOP TIL ALL EIGHT CHANNELS ;CONVERTED |
| 0180 | 15 | | DIS I | ;DISABLE INTERRUPTS, IGNORE ;SYSTEM PROCESSOR READS OR ;WRITES |
| 0181 | 8A 08 | | ORL P2,#08H | ;RAISE START CONVERT, TEST |
| 0183 | 9A F7 | | ANL P2,#0F7H | ;FOR CUSTOMER POWER-UP, AND FOR |
| 0185 | 0A | | IN A,P2 | ;ADC/OPTO OPERATION. IF EOC |
| 0186 | D2 2C | | JB6 RESET | ;(BIT 6, PORT 2) IS HIGH, ADC ;HAS FAILED SO RESET DATA TO ;ZERO |

```
;    PREVIOUS TO CONTINUING, MUST XFER DATA
;INTO THE OUTPUT FILE IF NOT IN SINGLE
;TRANSFER MODE
```

| Location | Contents | Mnemonic | | Comment |
|---|---|---|---|---|
| 0188 | 76 40 | | JF1 STAR3 | ;DON'T UPDATE FILE IF AA ;VALID CHANNEL # WAS WRITTEN ;TO THE MODULE DURING THE ;LAST I/O SCAN OF SYS PROC |
| 018A | B8 2F | XFERDA: | MOV R0,#2FH | ;LOAD R0 WITH CH 8 MSB ;STORAGE LOCATION |
| 018C | F1 | LDBYTE: | MOV A,@R1 | ;LOAD ACC WITH IMAGE BYTE AT ;R1 |
| 018D | A0 | | MOV @R0,A | ;LOAD BYTE INTO OUTPUT FILE |
| 018E | C9 | | DEC R1 | ;POINT TO NEXT IMAGE BYTE |
| 018FF | C8 | | DEC R0 | ;POINT TO NEXT FILE BYTE |
| 0190 | F1 | | MOV A,@R1 | ;LOAD ACC WITH NEXT IMAGE BYTE |
| 0191 | A0 | | MOV @R0,A | ;LOAD BYTE INTO OUTPUT FILE |
| 0192 | C9 | | DEC R1 | ;POINT TO NEXT IMAGE BYTE |
| 0193 | C8 | | DEC R0 | ;POINT TO NEXT FILE BYTE |
| 0194 | F1 | | MOV A,@R1 | ;LOAD ACC WITH NEXT IMAGE BYTE |
| 0195 | A0 | | MOV @R0,A | |
| 0196 | C9 | | DEC R1 | |
| 0197 | C8 | | DEC R0 | |
| 0198 | F1 | | MOV A,@R1 | |
| 0199 | A0 | | MOV @R0,A | |
| 019A | C9 | | DEC R1 | |
| 019B | C8 | | DEC R0 | |
| 019C | F1 | | MOV A,@R1 | |
| 019D | A0 | | MOV @R0,A | |
| 019EE | C9 | | DEC R1 | |
| 019F | C8 | | DEC R0 | |

| Location | Contents | | Mnemonic | | Comment |
|---|---|---|---|---|---|
| 01A0 | F1 | | MOV A,@R1 | | |
| 01A1 | A0 | | MOV @R0,A | | |
| 01A2 | C9 | | DEC R1 | | |
| 01A3 | C8 | | DEC R0 | | |
| 01A4 | F1 | | MOV A,@R1 | | |
| 01A5 | A0 | | MOV @R0,A | | |
| 01A6 | C9 | | DEC R1 | | |
| 01A7 | C8 | | DEC R0 | | |
| 01A8 | F1 | | MOV A,@R1 | | |
| 01A9 | A0 | | MOV @R0,A | | |
| 01AA | C9 | | DEC R1 | | |
| 01AB | C8 | | DEC R0 | | |
| 01AC | F1 | | MOV A,@R1 | | |
| 01AD | A0 | | MOV @R0,A | | |
| 01AE | C9 | | DEC R1 | | |
| 01AF | C8 | | DEC R0 | | |
| 01B0 | F1 | | MOV A,@R1 | | |
| 01B1 | A0 | | MOV @R0,A | | |
| 01B2 | C9 | | DEC R1 | | |
| 01B3 | C8 | | DEC R0 | | |
| 01B4 | F1 | | MOV A,@R1 | | |
| 01B5 | A0 | | MOV @R0,A | | |
| 01B6 | C9 | | DEC R1 | | |
| 01BB7 | C8 | | DEC R0 | | |
| 01B8 | F1 | | MOV A,@R1 | | |
| 01B9 | A0 | | MOV @R0,A | | |
| 01BA | C9 | | DEC R1 | | |
| 01BB | C8 | | DEC R0 | | |
| 01BC | F1 | | MOV A,@R1 | | |
| 01BD | A0 | | MOV @R0,A | | |
| 01BE | C9 | | DEC R1 | | |
| 01BF | C8 | | DEC R0 | | |
| 01C0 | F1 | | MOV A,@R1 | | |
| 01C1 | A0 | | MOV @R0,A | | |
| 01C2 | C9 | | DEC R1 | | |
| 01C3 | C8 | | DEC R0 | | |
| 01C4 | F1 | | MOV A,@R1 | | |
| 01C5 | A0 | | MOV @R0,A | | |
| 01C6 | C9 | | DEC R1 | | |
| 01C7 | C8 | | DEC R0 | | |
| 01C8 | F1 | | MOV A,@R1 | | |
| 01C9 | A0 | | MOV @R0,A | | ;LOAD BYTE INTO OUTPUT FILE |
| 01CA | 00 | | NOP | | |
| 01CB | 00 | | NOP | | |
| 01CC | 00 | | NOP | | |
| 01CD | 00 | | NOP | | |
| 01CE | B6 40 | | JF0 STAR3 | | ;JUMP TO ENABLE INTERRUPTS IF<br>;IN SINGLE XFER |
| 01D0 | 24 3F | | JMP STAR2 | | ;JUMP TO ENABLE INTERRUPTS AND<br>;BEGIN AT CHANNEL ONE AGAIN |
| 01D2 | 54 9C | NOVRG: | CALL D22 | | ;WAIT 22.5US |
| 01D4 | 24 79 | | JMP NOVRGD | | ;JUMP TO NOT OVER-RANGE |
| 01D6 | 54 9F | OVRGE: | CALL D15 | | ;WAIT 15US TO EQUALIZE TIMING |
| 01D8 | 24 73 | | JMP OVRGED | | ;JUMP TO OVER-RANGE |

End of the Main A-to-D Routine

;THE LOWER PART OF PAGE 2 IS A LOOKUP TABLE USED
;FOR BINARY-TO-BCD CONVERSION OF #'S  100

| Location | Contents | Data | |
|---|---|---|---|
| 0200 | 00 | 00H | Numbers 00 to 99 are stored in 100 lines of memory |
| . | . | . | |
| . | . | . | |
| . | . | . | |
| 0263 | 99 | 99H | |

Binary-to-BCD Routine

General Comment

```
;   THE BINARY # TO BE CONVERTED IS IN ACC UPON
;ENTRY, AND R4 MOST SIGNIFICANT NIBBLE CONTAINS
;THE CHANNEL ADDRESS AND OVER/UNDER RANGE BIT.
;   THE BCD LSD IS STORED AT R1 AND THE BCD
;UPPER BYTE IS SAVED AT R1+1, AND R3 (CHECKSUM)
;IS UPDATED.
;   R3, R4, R5, THE CARRY FLAG, AND ACC ARE
;DESTROYED/MODIFIED
;
;   THIS ROUTINE PERFORMS AN EIGHT BIT BINARY TO
;TEN BIT BCD CONVERSION
```

| Location | Contents | Mnemonic | | Comment |
|---|---|---|---|---|
| 0264 | 97 | BINBCD: | CLR C | ;CLEAR CARRY BIT |
| 0265 | AD | | MOV R5,A | ;SAVE ACC IN R5, R5 HAS THE<br>;# NOW FOR TEMP STORAGE |
| 0266 | 03 9C | | ADD A,#9CH | ;SUBTRACT 100 FROM THE BINARY # |
| 0268 | E6 7BB | | JNC LES100 | ;JUMP IF # WAS LESS THAN 100 |
| 026A | 1C | | INC R4 | ;LOAD A ONE INTO THE 100'S DIGIT |
| 026B | 97 | | CLR C | ;CLEAR CARRY BIT, SET-UP FOR<br>;NEXT SUBTRACT ATTEMPT |
| 026C | AD | | MOV R5,A | ;SAVE # IN R5 |
| 026D | 03 9C | | ADD A,#9CH | ;SUBTRACT 100 AGAIN |
| 026F | E6 87 | | JNC LES200 | ;JUMP IF # WAS LESS THAN 100 |
| 0271 | 1C | | INC R4 | ;R4=MSD=2 NOW |
| 0272 | A3 | | MOVP A,@A | ;GET LOOKUP BCD VALUE FOR THE<br>;NUMBER |
| 0273 | A1 | | MOV @R1,A | ;SAVE LSD'S AT R1 |
| 0274 | 6B | | ADD A,R3 | ;ADD LSB TO OLD CHECKSUM |
| 0275 | 2C | | XCH A,R4 | ;R4 NOW HAS CHKSUM, ACC HAS MSB |
| 0276 | 19 | | INC R1 | ;POINT TO MSD STORAGE |
| 0277 | A1 | | MOV @R1,A | ;SAVE MSD AT R1 |
| 0278 | 6C | | ADD A,R4 | ;ADD MSB TO CHKSUM |
| 0279 | AB | | MOV R3,A | ;SAVE CHKSUM IN R3 |
| 027A | 93 | | RETR | ;EXIT |
| 027B | FD | LES100: | MOV A,R5 | ;GET # BACK |
| 027C | A3 | | MOVP A,@A | ;GET LOOKUP BCD VALUE FOR # |
| 027D | A1 | | MOV @R1,A | ;SAVE IT AT R1 |
| 027E | 6B | | MOV A,R4 | ;LOAD MSB INTO ACC |
| 027F | 00 | | NOP | |
| 0280 | 19 | | INC R1 | ;POINT TO MSD STORAGE |
| 0281 | A1 | | MOV @R1,A | ;SAVE MSD AT R1 |
| 0282 | 6C | | ADD A,R4 | ;ADD MSB TO CHKSUM |
| 0283 | AB | | MOV R3,A | ;SAVE CHKSUM IN R3 |
| 0284 | 54 9D | | CALL D20 | ;DELAY 20US TO EQUALIZE TIMING |
| 0286 | 93 | | RETR | ;EXIT |

| Location | Contents | Mnemonic | | Comment |
|---|---|---|---|---|
| 0287 | FD | LES200: | MOV A,R5 | ;GET # BACK |
| 0288 | A3 | | MOVP A,@A | ;GET LOOKUP BCD VALUE FOR # |
| 0289 | A1 | | MOV @R1,A | ;SAVE LSD'S AT R1 |
| 028A | 6B | | MOV A,R4 | ;LOAD MSB INTO ACCUMULATOR |
| 028B | 2C | | NOP | |
| 028C | 19 | | INC R1 | ;POINT TO MSD STORAGE |
| 028D | A1 | | MOV @R1,A | ;SAVE MSD AT R1 |
| 028E | 6C | | ADD A,R4 | ;ADD MSB TO CHKSUM |
| 028F | AB | | MOV R3,A | ;SAVE CHKSUM IN R3 |
| 0290 | 93 | | RETR | ;EXIT |

;THE TIME DELAY SUBROUTINE FOLLOWS

| Location | Contents | Mnemonic | | Comment |
|---|---|---|---|---|
| 0291 | 00 | D50: | NOP | ;50US DELAY |
| 0292 | 00 | D48: | NOP | |
| 0293 | 00 | D45: | NOP | |
| 0294 | 00 | | NOP | |
| 0295 | 00 | D40: | NOP | |
| 0296 | 00 | | NOP | |
| 0297 | 00 | D35: | NOP | |
| 0298 | 00 | D33: | NOP | |
| 0299 | 00 | D30: | NOP | |
| 029A | 00 | | NOP | |
| 029B | 00 | D25: | NOP | |
| 029C | 00 | D22: | NOP | ;22.5US DELAY |
| 029D | 00 | D20: | NOP | |
| 029EE | 00 | D18: | NOP | |
| 029F | 00 | D15: | NOP | |
| 02A0 | 93 | D10: | RETR | ;RETURN |

;THE ENTIRE PAGE THREE IS USED AS A LOOKUP
;TABLE FOR MSW
;
;
;DATA IS USED TO DETERMINE A VALID MSW

| Location | Contents | Mnemonic | | Comment |
|---|---|---|---|---|
| 0300 | 00 | | NOP | |
| 0301 | 00 | | NOP | |
| | | | ORG 377H | |
| 0377 | 88 | | DB 88H | ; |
| 0378 | 87 | | DB 87H | |
| 0379 | 86 | | DB 86H | |
| 037A | 85 | | DB 85H | |
| 037B | 84 | | DB 84H | |
| 037C | 83 | | DB 83H | |
| 037D | 82 | | DB 82H | |
| 037E | 81 | | DB 81H | |
| 037F | 88 | | DB 88H | |
| 0380 | | END | | |

APPENDIX E

COMPONENT APPENDIX

| Component | Reference Number | Description |
|---|---|---|
| Microprocessor | 20 | Z-80A CPU manufactured by Zilog, Inc. |
| RAM | 24 | Four HN3-6514 1,024 X 4-bit random access memories manufactured by Harris Semiconductor, Inc. and one HN3-6504 4,096 X 1-bit random access memory manufactured by Harris Semiconductor, Inc. |
| PROM | 23 | Four 83S181 1K X 8-bit programmable read-only memories manufactured by Signetics. |
| Translator PROM | 47 | SN74S472 512-line X 8-bit programmable read-only memory manufactured by Texas Instruments, Inc. |
| Three-line-to-eight-line decoder | 64 | SN74S138 three-line-to-eight-line decoder manufactured by Texas Instruments, Inc. |
| Two-line-to-four-line decoder | 72 | SN74155 dual two-to-four-line decoder with totem pole outputs manufactured by Texas Instruments, Inc. |
| Buffers | 48, 98 | Two SN74LS244 octal buffers and line drivers manufactured by Texas Instruments, Inc. |
| Buffers | 63 | 8304 octal bidirectional buffers/line drivers manufactured by National Semiconductor, Inc. |
| Four-line-to sixteen-line decoder | 25 | SN74154 four-line-to-sixteen-line decoder manufactured by Texas Instruments, Inc. |
| Parity generator | 88* | SN74LS280 nine-bit odd/even parity generator manufactured by Texas Instruments, Inc. |

*Included in parity checker 88.

| Component | Reference Number | Description |
|---|---|---|
| Gates | 107 | One SN74LS00 quad two-input positive NAND gates, and one SN74LS10 triple three-input positive NAND gates, both manufactured by Texas Instruments, Inc. |
| Flip-flops | 114, 117 | SN7474 dual D-type flip-flops manufactured by Texas Instruments, Inc. |
| Multivibrator | 119 | SN74LS123 dual retriggerable monostable multivibrators manufactured by Texas Instruments, Inc. |
| OR gates | 116, 118 126 | SN7432 quad two-input positive OR gates manufactured by Texas Instruments, Inc. |
| AND gates | 109, 113, 115 | SN7408 quad two-input positive AND gates manufactured by Texas Instruments, Inc. |
| NAND gates | 110, 111 | SN7437 quad two-input positive NAND gates manufactured by Texas Instruments, Inc. |
| AND gates | 74, 76, 77 | Two SN74LS08 quad two-input positive AND gates manufactured by Texas Instruments, Inc. |
| OR gates | 78, 81, 82, 83 | Two SN74LS32 quad two-input positive OR gates manufactured by Texas Instruments, Inc. |
| OR gate | 50a | SN74LS32 quad two-input positive OR gates manufactured by Texas Instruments, Inc. |
| Gates | 84, 85 | SN 74125 quad bus buffer gates manufactured by Texas Instruments, Inc. |
| Drivers | 86, 87 | SN7407 hex buffers/drivers manufactured by Texas Instruments, Inc. |
| Inverters | 79, 80, 50b | SN7404 hex inverters manufactured by Texas Instruments, Inc. |
| Inverter | 67 | SN74LS04 hex inverters manufactured by Texas Instruments, Inc. |

| Component | Reference Number | Description |
| --- | --- | --- |
| Microcomputer | 132 | Intel 8048 Microcomputer manufactured by the Intel Corporation |
| Module ID flip-flop<br>Interrupt flip-flop | 131<br>133 | SN74LS74 dual D-type flip-flops manufactured by Texas Instruments, Inc. |
| Input latch | 134 | SN74LS374 octal D-type flip-flops manufacted by Texas Instruments, Inc. |
| Microbus output latch<br>System output latch | 135<br>136 | Two SN74LS273 octal D-type flip-flops manufactured by Texas Instruments, Inc. |
| Drivers | 137 | SN74S240 octal buffers/line drivers with inverted outputs manufactured by Texas Instruments, Inc. |
| NOR gates | 138, 142, 147 | SN74LS27 triple three-input NOR gates manufactured by Texas Instruments, Inc. |
| NAND gates | 151, 152, 169 | SN74LS38 quad NAND gates - open collectors - manufactured by Texas Instruments, Inc. |
| Inverters | 141, 146, 149, 150, 171, 173 | SN74LS04 hex inverters manufactured by Texas Instruments, Inc. |
| Inverters | 170, 198 | SN7404 hex inverters manufactured by Texas Instruments, Inc. |
| XOR gates | 160, 172 | SN74LS86 quad two-input XOR gates manufactured by Texas Instruments, Inc. |
| Flip-flop | 153 | SN74LS109 dual J-K flip-flops manufactured by Texas Instruments, Inc. |
| EX OR gate | 157 | SN74LS86 quad EX OR gates manufactured by Texas Instruments, Inc. |
| AND gates | 155, 160 | SN74LS08 quad positive AND gates manufactured by Texas Instruments, Inc. |
| Dual optical coupling circuits | 179, 188 | HP5082-4355 dual optical coupling circuits manufactured by Hewlett-Packard Company |

| Component | Reference Number | Description |
|---|---|---|
| Single optical coupling circuits | 185 | HP5082-4360 single optical coupling circuits manufactured by Hewlett-Packard Company |
| NAND gates | 180, 184 | SN74LS38 quad NAND gates - open collectors - manufactured by Texas Instruments, Inc. |
| A/D converter | 182 | ADC80-12 analog-to-digital converter manufactured by Burr-Brown Research Corp. |
| Operational amplifiers | 190, 193, 191*, 194* | Two OP14 dual operational amplifiers manufactured by Precision Microlithics, Inc. |
| Operational amplifier | 197 | OA311 operational amplifier manufactured by Fairchild Semiconductor |
| Multiplexer | 177 | HI508 eight-channel analog multiplexer manufactured by Harris Semiconductor, Inc. |
| Shift register | 175 | SN74LS164 eight-bit parallel out serial shift registers manufactured by Texas Instruments, Inc. |

*Included in elements 191 and 194

We claim:

1. A digital controller for monitoring and controlling I/O devices on a controlled system, wherein the I/O devices include word-oriented I/O device circuits, the controller comprising:
  a bidirectional data port;
  a main processor having:
  (a) main memory means located therein for storing a plurality of instructions, and for storing a plurality of words of I/O status data in a storage area, and
  (b) main processor means located in the main processor, the main processor means being connected to the bidirectional data port and to the main memory means, and the main processor means being operable to sequentially read and execute the instructions stored in the main memory means to couple a plurality of words of I/O status data between the bidirectional data port and the storage area in the main memory means during a main I/O scan; and
  a high density I/O interface module coupled to the main processor of the controller through the bidirectional data port and including:
  (c) high density memory means for storing a plurality of words of I/O status data, for storing a first group of machine instructions for coupling the words of I/O status data between the high density I/O interface module and the I/O device circuits during a peripheral I/O scan, and for storing a second group of machine instructions for inter-processor communication through the data port;
  (d) a module I/O bus;
  (e) sequencing means, connecting a plurality of the word-oriented I/O device circuits to the module I/O bus, for coupling the plurality of words of I/O status data therebetween; and
  (f) high density processor means coupled to the bidirectional data port, connected to the high density memory means, and connected to the sequencing means through the module I/O bus and through sequencing control lines, the high density processor means being operable to sequentially read and execute the second group of machine instructions in the high density memory means to couple words of I/O status data between the high density memory means and the bidirectional data port during the main I/O scan, and being operable to sequentially read and execute the first group of machine instructions in the high density memory means to operate the sequencing means through the sequencing control lines and sequentially couple the plurality of words of I/O status data between the high density memory means and a corresponding plurality of word-oriented I/O device circuits to accomplish the peripheral I/O scan,
  whereby the plurality of words of I/O status data are coupled between the storage area in the main memory means and the word-oriented I/O device circuits through the peripheral I/O scan at the I/O interface to monitor and control the I/O devices on the controlled system.

2. The digital controller of claim 1, wherein:
the sequencing means includes an analog multiplexer coupled to the word-oriented I/O device circuits and to the sequencing control lines and responsive to signals on the sequencing control lines to generate a series of analog input signals and further includes analog-to-digital converter means, coupled to the analog multiplexer to receive the series of analog input signals, for converting the analog input signals to a series of words of digitized input status data that are coupled through the module I/O bus in response to execution of the first group of machine instructions by the high density processor means.

3. The digital controller of claim 1, wherein the data port is located on the high density I/O interface module.

4. In a digital controller for controlling I/O devices on a machine, a method of altering an I/O scan in which individual, multibit words of I/O status data are coupled by a main processor between a main memory and a plurality of I/O modules interfacing a first group of I/O devices, so that the multiple words of I/O status data are coupled between two controller memories, namely the main memory and a memory on a high density I/O module interfacing a second group of I/O devices, the method comprising:
  (a) generating a control signal to the high density I/O module from the main processor when the high density I/O module is addressed during the I/O scan;
  (b) generating a high density ID signal to the main processor in response to the sensing of the control signal at the high density I/O module;
  (c) coupling a first control word of data from the main memory to the memory on the high density I/O module when the high density I/O module is addressed during the I/O scan, the first control word defining a direction for transferring the I/O status data;
  (d) coupling a second control word of data from the memory on the high density I/O module to the main processor in response to the coupling of the first control word of data to the memory on the high density I/O module, the second control word defining a plural number of words of I/O status data to be coupled between the main memory and the memory on the high density I/O module;
  (e) transferring a first word of I/O status data from one of the controller memories to data latching circuitry in response to the coupling of the second control word in step (d);
  (f) transferring the first word of I/O status data from the data latching circuitry to the other of the controller memories in response to the completion of step (e);
  (g) transferring a next word of I/O status data from the controller memory of step (e) to the data latching circuitry in response to the coupling of the first word of I/O status data to the controller memory of step (f); and
  (h) transferring the next word of I/O status data from the data latching circuitry to the controller memory of step (f) in response to the completion of step (g).

5. The method of claim 4, wherein:
the second control word specifies the coupling of more than two words of I/O status data; and
wherein steps (g) and (h) are alternately repeated beginning with step (g) until the number of words of I/O status data in the second control word have been coupled between the controller memories.

6. The method of claim 4, wherein:
the first control word specifies a bidirectional data transfer;
wherein steps (a), (b) and (c) are repeated in order of mention during a second cycle of the main I/O scan; and
wherein step (d) is repeated in response to the completion of step (c) during the second cycle of the main I/O scan to couple a third control word of data between the memory on the high density I/O module and the main processor, the third control word defining the number of words of I/O status data to be transferred in an opposite direction from the direction of data transfer during the first I/O scan.

7. In a digital controller having a main scanning means for executing an I/O scan in which single words of I/O status data are each coupled between an image table location in a main memory and a corresponding address of a plurality of bit-oriented I/O device circuits on a controlled system, wherein the status of the I/O device circuits is represented in the coupled words of I/O status data, an improvement wherein a first control word is substituted for a word of I/O status data at a selected image table location, the improvement further comprising:
  a high density I/O module residing at a single addressable location corresponding to the image table location of the first control word and including
    first means, located on the high density I/O module for storing words of I/O status data and a second control word of data,
    second means, located on the high density I/O module and electrically connected to a plurality of word-oriented I/O device circuits on the controlled system, for periodically coupling words of I/O status data between the first means on the high density I/O module and the word-oriented I/O device circuits,
    third means, located on the high density I/O module and electrically connected to the main scanning means, for generating a high density ID signal to the main scanning means and for interrupting the coupling of I/O status data by the second means, in response to the coupling of the first control word of data to the first means on the high density I/O module from its corresponding image table location in the main memory through the main scanning means, and
    fourth means, located on the high density I/O module and electrically connected to the main scanning means, the fourth means also being responsive to the coupling of the first word of control data from the
  main memory to the first means on the high density I/O module, for coupling the second control word of data to the main scanning means;
  a bulk storage area in the main memory that stores a plurality of words of I/O status data representing the status of the word-oriented I/O device circuits connected to the high density I/O module;

fifth means electrically connected to the main scanning means and to the third and fourth means on the high density I/O module, responsive to the high density ID signal from the third means for modifying the I/O scan of the main scanning means, and responsive to the receipt of the second control word from the fourth means on the high density I/O module, for coupling successive words of I/O status data which are stored in the bulk storage area in the main memory; and sixth means located on the high density I/O module, electrically connected to the fifth means and cooperable therewith to couple successive words of I/O status data between the bulk storage area in the main memory and the first means on the high density I/O module, whereby words of I/O status data are coupled between the word-oriented I/O device circuits and the main memory through a high density module residing at a single addressable location to monitor and control the status of those word-oriented I/O device circuits on the controlled system.

8. The controller of claim 7, wherein:

the first word of control data coupled from the selected location in the main memory to the high density I/O module specifies the direction of data transfer and a number of words to be transferred; and wherein the second control word also specifies the direction of data transfer and the number of words to be transferred; and wherein the fifth means is further responsive to the receipt of the second control word for comparing the direction of data transfer and the number of words to be transferred in the two control words to confirm the number of words to be transferred in each direction.

9. The combination of claim 7, wherein the fifth means for modifying the I/O scan includes:

a high density table in the main memory that stores the location of the high density I/O module and the first location in the bulk storage area, and means responsive to the high density ID signal for searching the high density table to find these locations.

10. A digital controller in which words of I/O status data are transferred between a main memory means and I/O devices that are responsive to such words of I/O status data to monitor and control a controlled system, the controller comprising:

the main memory means, for storing multibit words of I/O status data and a first control word of data that defines the direction of data transfer and the number of words of I/O status data to be transferred.

data latching means for temporarily holding a word of data;

first control means electrically coupled to the main memory means and to the data latching means for periodically transferring the first control word from the main memory means to the data latching means;

second control means electrically coupled to the first control means for periodically generating a write signal contemporaneous with the coupling of the first control word to the data latching means;

third control means for detecting a high density ID signal;

fourth control means, electrically coupled to the data latching means, to the main memory means and to the third control means and responsive to the detection of the high denisty ID signal by the third control means, for transferring a second control word of data from the data latching means to the main memory means;

high density memory means for storing multibit words of I/O status data and the second control word of data, the second control word defining the number of words of I/O status data to be transferred during the I/O scan in which it is coupled to the main memory means;

fifth control means, electrically coupled to the second control means and to the third control means and responsive to the write signal from the second control means, for generating the high density ID signal to the third control means;

sixth control means, electrically coupled between the data latching means and the high density memory means and electrically coupled to the fifth control means and responsive to the write signal from the second control means, for coupling the first control word of data from the data latching means to the high density memory means;

seventh control means, electrically coupled to the sixth control means, to the high density memory means and to the data latching means, and responsive to the receipt of the first control word in the high density memory means, for coupling the second control word from the high density memory means to the data latching means;

first communication means electrically coupled to the fourth control means and responsive to the transfer of the second control word from the data latching means to the main memory means for coupling successive words of I/O status data between the main memory means and the data latching means;

second communication means electrically coupled to the high density memory means, to the data latching means and to the seventh control means, and responsive to the coupling of the second control word of data to the data latching means, for coupling successive words of I/O status data between the high density memory means and the data latching means; and third communication means electrically connected to the high density memory means and to the I/O devices for periodically coupling words of I/O status data between the high density memory means and the I/O devices;

wherein the first and second communication means are responsive to the control words in their associated memory means to couple the number of control words defined in the second control word, in the direction defined in the first control word, between the high density memory means and the main memory means.

11. The digital controller of claim 10, wherein the data latching means includes:

input latch means electrically connected between the first communication means and the second communication means and responsive to signals from the first communication means for receiving and temporarily storing words of data from the main memory means;

first output latch means, connected to the second communication means and responsive to a control signal therefrom for receiving words of data from the second communication means and temporarily storing such words of data; and second output latch means connected between the first output latch means and the first communication means and responsive to a signal from the first communication means for receiving words of data from the first output latch means and temporarily storing such words of data before such words of data are coupled to the main memory means by the first communication means.

12. The digital controller of claim 10, wherein the third communication means includes:

analog sequencing means, having an I/O port, for coupling analog signals between its I/O port and the I/O devices in response to sequencing signals;

analog-to-digital converter means coupled to the I/O port on the analog sequencing means for converting between analog signals thereat and corresponding words of digitized I/O status data, as such analog signals and digitized status data are received by the analog-to-digital converter means; and means electrically connected to the analog sequencing means for periodically generating sequencing signals to couple a series of analog signals to the analog-to-digital converter means; and means electrically connected to the analog-to-digital converter means and to the means for generating sequencing signals, and responsive to the last-mentioned means for periodically coupling successive digitized words of I/O status data between the analog-to-digital converter means and the high density memory means.

13. A programmable controller for sensing and controlling the status of a plurality of I/O devices on a machine through block transfer of multibit words of I/O status data, the controller comprising:

main memory means for storing a plurality of I/O transfer instructions, a plurality of multibit words of I/O status data, and a first control word of data that defines the direction of data transfer;

main processor means coupled to the main memory means, wherein the main processor means sequentially reads and executes the I/O transfer instructions, and is responsive to a selected I/O transfer instruction to output the first control word from the main memory means and to generate a control signal associated therewith, is responsive to another selected I/O transfer instruction to detect a high density ID signal, is responsive to another selected I/O transfer instruction to input a second control word that specifies the number of words of I/O status data to be transferred, and is responsive to other selected I/O transfer instructions to address the main memory means to transfer the number of words of I/O status data specified in the second control word; and a high density I/O module including:

(a) logic circuit means coupled to the main processor means for receiving signals therefrom, and for generating signals in response thereto, the logic circuit means receiving the control signal associated with the first control word and being responsive to generate the high density ID signal to the main processor means;

(b) latching means located on the high density I/O module and coupled to the main processor means for temporarily holding words of data that are output from and input to the main memory means, including the first and second control words of data;

(c) high density memory means located on the high density I/O module for storing a plurality of high density instructions, a plurality of multibit words of I/O status data, and the second control word of data, and (d) high density processor means located on the high density I/O module, coupled to the logic circuit means, coupled to the latching means, coupled to the high density memory means, and coupled to the I/O devices, wherein the high density processor means reads and executes the high density instructions, and (i) is responsive to selected high density instructions to couple words of I/O status data between the I/O devices and the high density memory means, (ii) is responsive to other selected high density instructions to couple the first control word from the latching means to the high density memory means and to couple the second control word to the latching means in response thereto, (iii) is responsive to other selected high density instructions to couple successive words of I/O status data between the high density memory means and the latching means according to the information contained in the control words, and (iv) is responsive to other selected high density instructions to couple successive words of I/O status data between the high density means and the I/O devices, whereby a block of multibit words of I/O status data is transferred between the high density I/O module and the main memory means as part of the transfer of I/O status data between the main memory means and the I/O devices.

* * * * *

UNITED STATES PATENT AND TRADEMARK OFFICE
CERTIFICATE OF CORRECTION

PATENT NO. : 4,293,924
DATED : October 6, 1981
INVENTOR(S) : Odo J. Struger, et al It is certified that error appears in the above—identified patent and that said Letters Patent is hereby corrected as shown below:

In Fig. 8, block 200 change "SINFR" to --SINXFR--.

Column 11, line 35 - after "output" change "is" to --of--.

Column 11, line 42 - after "80" change "of" to --to--.

Column 11, lines 63-64 - "AB1-0" should be --AB10--.

Column 12, line 29 - "line" should be --the--.

Column 12, line 50 - "couples" should be --coupled--.

Column 13, line 29 - "Q" should be --$\bar{Q}$--.

Column 13, line 34 - "Q" should be --$\bar{Q}$--.

Column 13, line 37 - "Q" should be --$\bar{Q}$--.

Column 14, line 53 - "Q" should be --$\bar{Q}$--.

Column 15, line 46 - "To" should be --T0--.

Column 16, line 9 - delete the second appearance of "in".

Column 16, line 45 - after "NOR gate" insert --142--.

UNITED STATES PATENT AND TRADEMARK OFFICE
CERTIFICATE OF CORRECTION

PATENT NO. : 4,293,924

DATED : October 6, 1981

INVENTOR(S) : Odo J. Struger, et al

It is certified that error appears in the above—identified patent and that said Letters Patent is hereby corrected as shown below:

Column 23, line 16 - after "I/O" insert --slots--.

Column 23, line 16 - "circits" should be --circuits--.

Column 84, lines 62-64 (claim 7) the words "main memory to the first means on the high density I/O module, for coupling the second control word of data to the main scanning means;" are part of the subparagraph beginning "fourth means" and should be indented accordingly.

Column 86, line 4 (claim 10) "denisty" should be --density--.

Column 87, line 4 (claim 11) "and" should appear in line 3 after the semicolon.

Column 87, line 24 (claim 12) "and" should appear in line 24 after the semicolon.

Column 87, lines 54-58 (claim 13) the words "is responsive to another selected I/O transfer instruction to input a second control word that specifies the number of words of I/O status data to be transferred, and" should form a sub-subparagraph of claim 13 and be properly indented as such.

UNITED STATES PATENT AND TRADEMARK OFFICE
CERTIFICATE OF CORRECTION

PATENT NO. : 4,293,924

DATED : October 6, 1981

INVENTOR(S) : Odo J. Struger, et al

It is certified that error appears in the above—identified patent and that said Letters Patent is hereby corrected as shown below:

Column 88, lines 1-4 (claim 13) the words "is responsive to other selected I/O transfer instructions to address the main memory means to transfer the number of words of I/O status data specified in the second control word; and" should be indented as a sub-subparagraph rather than as a subparagraph.

Column 88, line 25, the word "and" should appear in line 24 after the comma.

Signed and Sealed this

Sixteenth Day of March 1982

[SEAL]

Attest:

GERALD J. MOSSINGHOFF

Attesting Officer     Commissioner of Patents and Trademarks